US012655162B2

(12) United States Patent
Chen et al.

(10) Patent No.: US 12,655,162 B2
(45) Date of Patent: Jun. 16, 2026

(54) HIGHLY EFFICIENT MYELOPEROXIDASE ACTIVATABLE IMAGING AGENTS

(71) Applicant: The General Hospital Corporation, Boston, MA (US)

(72) Inventors: John W. Chen, Newton, MA (US); Cuihua Wang, Cambridge, MA (US)

(73) Assignee: The General Hospital Corporation, Boston, MA (US)

(*) Notice: Subject to any disclaimer, the term of this patent is extended or adjusted under 35 U.S.C. 154(b) by 951 days.

(21) Appl. No.: 17/785,760

(22) PCT Filed: Dec. 16, 2020

(86) PCT No.: PCT/US2020/065362
§ 371 (c)(1),
(2) Date: Jun. 15, 2022

(87) PCT Pub. No.: WO2021/127013
PCT Pub. Date: Jun. 24, 2021

(65) Prior Publication Data
US 2023/0124429 A1 Apr. 20, 2023

Related U.S. Application Data

(60) Provisional application No. 62/949,336, filed on Dec. 17, 2019.

(51) Int. Cl.
*C07F 5/00* (2006.01)

(52) U.S. Cl.
CPC .................................. *C07F 5/003* (2013.01)

(58) Field of Classification Search
CPC ....................................................... C07F 5/003
See application file for complete search history.

(56) References Cited

U.S. PATENT DOCUMENTS

2008/0044827 A1 2/2008 Bogdanov et al.

FOREIGN PATENT DOCUMENTS

| | | |
|---|---|---|
| CN | 103582492 | 2/2014 |
| CN | 108136053 | 6/2018 |
| CN | 110177581 | 8/2019 |
| WO | WO 2005/122682 | 12/2005 |
| WO | WO 2006/014530 | 2/2006 |
| WO | WO 2012/120124 | 9/2012 |
| WO | WO 2017/027834 | 2/2017 |
| WO | WO 2018/094005 | 5/2018 |

OTHER PUBLICATIONS

Wang "Highly Efficient Activatable MRI Probe to Sense Myeloperoxidase Activity" J. Med. Chem. 2021, 64, 5874-5885.*

Rodriguez "Activatable Magnetic Resonance Imaging Agents for Myeloperoxidase Sensing: Mechanism of Activation, Stability, and Toxicity" J. Amer. Chem Soc, 2010, 132, 168-177.*

Ospina, Jimena "Stereoselective synthesis of highly branched chiral cyclobutane-cored triamines and their conjugation to Gd-DOTA." Tetrahedron, 2015, 71(42), 8085-8095.*

Extended European Search Report in European Appln. No. 20901068.5, dated Jul. 3, 2024, 11 pages.

Querol et al., "A paramagnetic contrast agent with myeloperoxidase-sensing properties," Org Biomol Chem., May 2006, 4(10):1887-95.

Wahsner et al., "Chemistry of MRI Contrast Agents: Current Challenges and New Frontiers," Chem Rev., Jan. 2019, 119(2):957-1057.

Zhang et al., "PET imaging detection of macrophages with a formyl peptide receptor antagonist," Nuclear Medicine and Biology, Apr. 2015, 42(4):381-386.

Ali et al., "Myeloperoxidase inhibition improves ventricular function and remodeling after experimental myocardial infarction," JACC: Basic to Translational Science, 2016, 1(7):633-643.

Barone et al., "Time-related changes in myeloperoxidase activity and leukotriene $B_4$ receptor binding reflect leukocyte influx in cerebral focal stroke," Mol. Chem. Neuropathol., Jan. 1995, 24(1):13-30.

Blair-Johnson et al., "Human Myeloperoxidase: Structure of a Cyanide Complex and Its Interaction with Bromide and Thiocyanate Substrates at 1.9 Å Resolution," Biochemistry, Oct. 2001, 40(46):13990-7.

Bradley et al., "Cellular and extracellular myeloperoxidase in pyogenic inflammation," Blood, Sep. 1982, 60(3):618-622.

Breckwoldt et al., "Tracking the inflammatory response in stroke in vivo by sensing the enzyme myeloperoxidase," Proc. Natl. Acad Sci.USA, Nov. 2008, 105(47):18584-18589.

Chen et al., "A novel mouse model of atherosclerotic plaque instability for drug testing and mechanistic/therapeutic discoveries using gene and microRNA expression profiling," Circ. Res., Jul. 2013, 113(3):252-265, 34 pages.

Chen et al., "Myeloperoxidase-targeted imaging of active inflammatory lesions in murine experimental autoimmune encephalomyelitis," Brain, May 2008, 131(Pt 4):1123-1133, 11 pages.

Choi et al., "Ablation of the Inflammatory Enzyme Myeloperoxidase Mitigates Features of Parkinson's Disease in Mice," J. Neurosci., Jul. 2005, 25(28):6594-6600.

Cojocaru et al., "Plasma myeloperoxidase levels in patients with acute ischemic stroke," Rom. J. Intern. Med., 2010, 48(1):101-104.

EMA.Europa.eu [online], "PRAC concludes assessment of gadolinium agents used in body scans and recommends regulatory actions, including suspension for some marketing authorisations," Oct. 2017, retrieved on Jan. 11, 2023, retrieved from URL<https://www.ema.europa.eu/en/news/prac-concludes-assessment-gadolinium-agents-used-body-scans-recommends-regulatory-actions-including#:~:text=EMA%27s%20Pharmacovigilance%20and%20Risk%20Assessment%20Committee%20%28PRAC%29%20has,gadolinium%20they%20contain%20are%20deposited%20in%20the%20brain.>, 4 pages.

Fernandes et al., "Increased myeloperoxidase plasma levels in rheumatoid arthritis," Rheumatol Int., Jun. 2012, 32(6):1605-9.

(Continued)

*Primary Examiner* — David K O'Dell
(74) *Attorney, Agent, or Firm* — Fish & Richardson P.C.

(57) ABSTRACT

Provided herein are compounds useful as imaging agents. Exemplary compounds provided herein are useful as myeloperoxidase imaging agents using magnetic resonance or nuclear imaging techniques. Methods for preparing the compounds provided herein and diagnostic methods using the compounds are also provided.

32 Claims, 7 Drawing Sheets

(56) References Cited

OTHER PUBLICATIONS

Forghani et al., "Demyelinating diseases: myeloperoxidase as an imaging biomarker and therapeutic target," Radiology, May 2012, 263(2):451-460.
Forghani et al., "Myeloperoxidase propagates damage and is a potential therapeutic target for subacute stroke," J. Cereb. Blood Flow Metab., Mar. 2015, 35(3):485-493, 9 pages.
Gellhaar et al., "Myeloperoxidase-immunoreactive cells are significantly increased in brain areas affected by neurodegeneration in Parkinson's and Alzheimer's disease," Cell Tissue Res., Sep. 2017, 369(3):445-454.
Gray et al., "Elevated activity and microglial expression of myeloperoxidase in demyelinated cerebral cortex in multiple sclerosis," Brain Pathol., Jan. 2008, 18(1):86-95.
Gray et al., "Elevated myeloperoxidase activity in white matter in multiple sclerosis," Neurosci. Lett., Oct. 2008, 444(2):195-198.
Green et al., "Neuronal expression of myeloperoxidase is increased in Alzheimer's disease," J. Neurochem., Aug. 2004, 90(3):724-733.
Grobner, "Gadolinium—a specific trigger for the development of nephrogenic fibrosing dermopathy and nephrogenic systemic fibrosis?," Nephrol. Dial. Transplant., Apr. 2006, 21(4):1104-1108.
Hallingbäck et al., "Comparison of the binding and reactivity of plant and mammalian peroxidases to indole derivatives by computational docking," Biochemistry, Mar. 2006, 45(9):2940-50, 12 pages.
Hoy et al., "Myeloperoxidase polymorphisms in brain infarction: association with infarct size and functional outcome," Atherosclerosis, Apr. 2003, 167(2):223-230.
International Preliminary Report on Patentability in International Appln. No. PCT/US2020/065362, mailed on Jun. 30, 2022, 9 pages.
International Search Report and Written Opinion in International Appln. No. PCT/US2020/065362, mailed on May 27, 2021, 12 pages.
Invitation to Pay Additional Fees And, Where Applicable, Protest Fee in International Appln. No. PCT/US2020/065362, mailed on Feb. 22, 2021, 2 pages.
Jucaite et al., "Effect of the myeloperoxidase inhibitor AZD3241 on microglia: a PET study in Parkinson's disease," Brain, Sep. 2015, 138(9):2687-2700.
Kamanna et al., "Myeloperoxidase and atherosclerosis," Curr. Cardiovasc. Risk Rep., 2013, 7(2):102-107.
Kanda et al., "Gadolinium-based Contrast Agent Accumulates in the Brain Even in Subjects without Severe Renal Dysfunction: Evaluation of Autopsy Brain Specimens with Inductively Coupled Plasma Mass Spectroscopy" Radiology, Jul. 2015, 276(1):228-232.
Kanda et al., "High Signal Intensity in Dentate Nucleus on Unenhanced T1-weighted MR Images: Association with Linear versus Macrocyclic Gadolinium Chelate Administration," Radiology, Jun. 2015, 275(3):803-809.
Kanda, "The New Restrictions on the Use of Linear Gadolinium-based Contrast Agents in Japan," Magn Reson Med Sci, 2019, 18:1-3.
Karakas and Koenig, "Myeloperoxidase production by macrophage and risk of atherosclerosis," Curr. Atheroscler. Rep., Jun. 2012, 14(3):277-283.
Kielar et al., "Large Relaxivity Enhancement of Paramagnetic Lipid Nanoparticles by Restricting the Local Motions of the $Gd^{III}$ Chelates," J Am. Chem. Soc., 2010, 132(23):7836-7837.
Krasowska and Konat, "Vulnerability of brain tissue to inflammatory oxidant, hypochlorous acid," Brain Res., Feb. 2004, 997(2):176-184.
Laurent et al., "Comparative study of the physicochemical properties of six clinical low molecular weight gadolinium contrast agents," Contrast Media Mol. Imaging, May-Jun. 2006, 1(3):128-137.
Laurent et al., "Stability of MRI paramagnetic contrast media: a proton relaxometric protocol for transmetallation assessment," Invest. Radiol., Feb. 2001, 36(2):115-122.
Maki et al., "Aberrant expression of myeloperoxidase in astrocytes promotes phospholipid oxidation and memory deficits in a mouse model of Alzheimer disease," J. Biol. Chem., Jan. 2009, 284(5):3158-3169.
Malle et al., "Myeloperoxidase: a target for new drug development?," Br. J. Pharmacol., Nov. 2007, 152(6):838-854.
Marckmann et al., "Nephrogenic systemic fibrosis: suspected causative role of gadodiamide used for contrast-enhanced magnetic resonance imaging," J. Am. Soc. Nephrol., Sep. 2006, 17(9):2359-2362.
Matsuo et al., "Correlation between myeloperoxidase-quantified neutrophil accumulation and ischemic brain injury in the rat—effects of neutrophil depletion," Stroke, Jul. 1994, 25(7):1469-1475.
McDonald et al., "Intracranial Gadolinium Deposition after Contrast-enhanced MR Imaging," Radiology, Jun. 2015, 275(3):772-782, 11 pages.
McMillen et al., "Expression of human myeloperoxidase by macrophages promotes atherosclerosis in mice," Circulation, May 2005, 111(21):2798-2804.
Meuwese et al., "Serum myeloperoxidase levels are associated with the future risk of coronary artery disease in apparently healthy individuals: the EPIC-Norfolk Prospective Population Study," J. Am. Coll. Cardiol., Jul. 2007, 50(2):159-165.
Mocatta et al., "Plasma concentrations of myeloperoxidase predict mortality after myocardial infarction," J. Am. Coll. Cardiol., May 2007, 49(20):1993-2000.
Moumne et al., "Efficient Synthesis of $\beta^2$-Amino Acid by Homologation of $\alpha$-Amino Acids Involving the Reformatsky Reaction and Mannich-Type Imminium Electrophile," J Org. Chem., Mar. 2006, 71(8):3332-3334.
Muthukumar et al., "$Zn(OTf)_2$-catalyzed access to symmetrical and unsymmetrical bisindoles from alpha-keto amides," Org. Biomol. Chem., 2019, 17:3921-3933.
Nagra et al., "Immunohistochemical and genetic evidence of myeloperoxidase involvement in multiple sclerosis," J. Neuroimmunol., Sep. 1997, 78(1-2):97-107.
Nahrendorf et al., "Activatable magnetic resonance imaging agent reports myeloperoxidase activity in healing infarcts and noninvasively detects the antiinflammatory effects of atorvastatin on ischemia-reperfusion injury," Circulation, Mar. 2008, 117(9):1153-1160.
Nicholls and Hazen, "Myeloperoxidase, modified lipoproteins, and atherogenesis," J. Lipid Res., Apr. 2009, 50(Suppl):S346-S351.
Nussbaum et al., "Myeloperoxidase: a leukocyte-derived protagonist of inflammation and cardiovascular disease," Antioxid. Redox Signal., Feb. 2013, 18(6):692-713.
Port et al., "Efficiency, thermodynamic and kinetic stability of marketed gadolinium chelates and their possible clinical consequences: a critical review," Biometals, Aug. 2008, 21(4):469-490.
Pulli et al., "Molecular MR imaging of myeloperoxidase distinguishes steatosis from steatohepatitis in nonalcoholic fatty liver disease," Radiology, Aug. 2017, 284(2):390-400.
Querol et al., "DTPA-bisamide-based MR sensor agents for peroxidase imaging," Org Lett, Apr. 2005, 7(9):1719-1722.
Radbruch et al., "Gadolinium retention in the dentate nucleus and globus pallidus is dependent on the class of contrast agent," Radiology, Jun. 2015, 275(3):783-791.
Rashid et al., "Myeloperoxidase is a potential molecular imaging and therapeutic target for the identification and stabilization of high-risk atherosclerotic plaque," Eur. Heart J., Sep. 2018, 39(35):3301-3310, 10 pages.
Robert et al., "T1-Weighted Hypersignal in the Deep Cerebellar Nuclei After Repeated Administrations of Gadolinium-Based Contrast Agents in Healthy Rats: Difference Between Linear and Macrocyclic Agents," Invest. Radiol., Aug. 2015, 50(8):473-480.
Rodriguez et al., "Activatable magnetic resonance imaging agents for myeloperoxidase sensing: mechanism of activation, stability, and toxicity," J. Am. Chem. Soc., 2010, 132(1):168-177, 21 pages.
Rodríguez-Rodríguez et al., "Peroxidase Sensitive Amplifiable Probe for Molecular Magnetic Resonance Imaging of Pulmonary Inflammation," ACS Sens., Sep. 2019, 4(9):2412-2419, 17 pages.
Rohrer et al., "Comparison of magnetic properties of MRI contrast media solutions at different magnetic field strengths," Invest. Radiol., Nov. 2005, 40(11):715-724.

(56) References Cited

OTHER PUBLICATIONS

Ronald et al., "Enzyme-sensitive magnetic resonance imaging targeting myeloperoxidase identifies active inflammation in experimental rabbit atherosclerotic plaques," Circulation, Aug. 2009, 120:592-599, 14 pages.

Rudolph et al., "Diagnostic value of MPO plasma levels in patients admitted for suspected myocardial infarction," Int. J. Cardiol., Dec. 2011, 153(3):267-271.

Ruggeri et al., "Discovery of 2-(6-(5-Chloro-2-methoxyphenyl)-4-oxo-2-thioxo-3,4-dihydropyrimidin-1(2H)-yl)acetamide (PF-06282999): A Highly Selective Mechanism-Based Myeloperoxidase Inhibitor for the Treatment of Cardiovascular Diseases," J. Med Chem., Nov. 2015, 58(21):8513-8528.

Sajad et al., "Hippocampal neurodegeneration in experimental autoimmune encephalomyelitis (EAE): potential role of inflammation activated myeloperoxidase," Mol. Cell. Biochem., Aug. 2009, 328(1-2):183-188.

Scholz et al., "Initial human myeloid/dendritic cell progenitors identified by absence of myeloperoxidase protein expression," Exp. Hematol., 2004, 32:270-276.

Schreitmüller et al., "P1-224: Increased myeloperoxidase (MPO) plasma levels in patients with Alzheimer's disease," Alzheimers Dement., Jul. 2013, 4(9):P235.

Stamp et al., "Myeloperoxidase and oxidative stress in rheumatoid arthritis," Rheumatology (Oxford), Oct. 2012, 51(10):1796-803.

Strzepa et al., "Myeloperoxidase: a new player in autoimmunity," Cell Immunol., Jul. 2017, 317:1-8, 19 pages.

Su et al., "Vasculitis: molecular imaging by targeting the inflammatory enzyme myeloperoxidase," Radiology, Jan. 2012, 262(1):181-190.

Swirski et al., "Myeloperoxidase-rich Ly-6C+ myeloid cells infiltrate allografts and contribute to an imaging signature of organ rejection in mice," J Clin. Invest., Jul. 2010, 120(7):2627-2634.

Tay et al., "Serum myeloperoxidase levels in predicting the severity of stroke and mortality in acute ischemic stroke patients," Eur. Rev. Med. Pharmacol. Sci., 2015, 19(11):1983-1988.

Teismann, "Myeloperoxidase in the neurodegenerative process of Parkinson's disease," Dtsch. Med. Wochenschr., 2013, 139(3):99-102, 7 pages (with English abstract).

Teng et al., "The roles of myeloperoxidase in coronary artery disease and its potential implication in plaque rupture," Redox. Rep., Mar. 2017, 22(2):51-73.

Trott et al., "AutoDock Vina: improving the speed and accuracy of docking with a new scoring function, efficient optimization, and multithreading," J Comput. Chem., Jan. 2010, 31(2):455-61.

Tzikas et al., "Increased myeloperoxidase plasma levels in patients with Alzheimer's disease," J. Alzheimers Dis., 2014, 39(3):557-564.

Wang et al., "A versatile imaging platform with fluorescence and CT imaging capabilities that detects myeloperoxidase activity and inflammation at different scales," Theranostics, 2019, 9(25):7525-7536.

Weston et al., "Inflammatory cell infiltration after endothelin-1-induced cerebral ischemia: histochemical and myeloperoxidase correlation with temporal changes in brain injury," J. Cereb. Blood Flow Metab., Jan. 2007, 27(1):100-114.

Wu et al., "Fullerenes and their derivatives as inhibitors of tumor necrosis factor-α with highly promoted affinities," J Mol. Model, Jun. 2016, 22(7):161, 7 pages.

Yap et al., "Hypochlorous acid induces apoptosis of cultured cortical neurons through activation of calpains and rupture of lysosomes," J. Neurochem., Sep. 2006, 98(5):1597-1609.

Zhang et al., "Myeloperoxidase functions as a major enzymatic catalyst for initiation of lipid peroxidation at sites of inflammation," J. Biol. Chem., Nov. 2002, 277(48):46116-46122.

Office Action in Chinese Appln. No. 202080086172.9, mailed on Oct. 19, 2024, 10 pages (with English translation).

Office Action in Japanese Appln. No. 2022-537264, mailed on Jan. 21, 2025, 9 pages (with English machine translation).

Office Action in Chinese Appln. No. 202080086172.9, mailed on Apr. 30, 2025, 13 pages (with English translation).

Office Action in Chinese Appln. No. 202080086172.9, dated Apr. 30, 2024, 14 pages (with English translation).

* cited by examiner mcMPO-Gd

MPO-Gd mcMPO-Gd docking

| mode | affinity | dist from best mode | |
|---|---|---|---|
| | (kcal/mol) | rmsd l.b. | rmsd u.b. |
| 1 | -11.7 | 0.000 | 0.000 |
| 2 | -11.3 | 1.215 | 3.203 |
| 3 | -11.1 | 1.571 | 3.064 |
| 4 | -10.7 | 2.015 | 5.157 |
| 5 | -10.5 | 2.542 | 7.954 |
| 6 | -10.3 | 2.320 | 8.861 |
| 7 | -10.2 | 2.559 | 8.257 |
| 8 | -10.1 | 2.165 | 4.971 |
| 9 | -10.1 | 2.593 | 3.876 |
| 10 | -10.0 | 2.236 | 6.007 |
| 11 | -10.0 | 1.654 | 2.296 |
| 12 | -9.9 | 2.127 | 5.143 |
| 13 | -9.9 | 2.599 | 8.839 |
| 14 | -9.8 | 2.655 | 8.893 |
| 15 | -9.8 | 2.579 | 9.616 |
| 16 | -9.6 | 2.334 | 5.601 |
| 17 | -9.6 | 2.588 | 9.639 |
| 18 | -9.6 | 2.325 | 3.946 |
| 19 | -9.6 | 2.538 | 8.793 |
| 20 | -9.5 | 2.688 | 9.549 |

MPO-Gd docking

| mode | affinity | dist from | best mode |
|---|---|---|---|
| | (kcal/mol) | rmsd l.b. | rmsd u.b. |
| 1 | -9.9 | 0.000 | 0.000 |
| 2 | -9.1 | 1.925 | 6.931 |
| 3 | -9.0 | 2.324 | 7.314 |
| 4 | -8.9 | 2.324 | 6.325 |
| 5 | -8.9 | 2.323 | 7.596 |
| 6 | -8.8 | 2.608 | 6.328 |
| 7 | -8.7 | 2.120 | 6.526 |
| 8 | -8.6 | 2.293 | 6.052 |
| 9 | -8.6 | 2.793 | 6.341 |
| 10 | -8.5 | 2.605 | 7.560 |
| 11 | -8.4 | 2.485 | 7.223 |
| 12 | -8.2 | 1.752 | 7.308 |
| 13 | -8.1 | 2.759 | 7.069 |
| 14 | -8.1 | 2.909 | 7.147 |
| 15 | -8.0 | 2.538 | 8.363 |
| 16 | -8.0 | 2.236 | 7.729 |
| 17 | -8.0 | 2.455 | 7.173 |
| 18 | -7.9 | 2.787 | 7.132 |
| 19 | -7.9 | 2.324 | 8.133 |
| 20 | -7.9 | 2.410 | 4.775 |

FIG. 8

HIGHLY EFFICIENT MYELOPEROXIDASE ACTIVATABLE IMAGING AGENTS

CROSS-REFERENCE TO RELATED APPLICATIONS

This application is a national stage application of International Application No. PCT/US2020/065362 (published as WO2021/127013), filed on Dec. 16, 2020, which claims the benefit of U.S. Provisional Application Ser. No. 62/949,336, filed Dec. 17, 2019, the disclosure of which is incorporated herein by reference in its entirety.

FEDERALLY SPONSORED RESEARCH OR DEVELOPMENT

This invention was made with Government support under Grant Nos. NS103998, NS070835, NS072167 and HL150305 awarded by the National Institutes of Health. The Government has certain rights in the invention.

TECHNICAL FIELD

This invention relates to compounds useful as imaging agents and more particularly to compounds useful as myeloperoxidase imaging agents.

BACKGROUND

Myeloperoxidase (MPO) is a pro-inflammatory enzyme expressed in neutrophils and M1-type microglia and macrophages, but not by anti-inflammatory M2-type microglia and macrophages (see e.g., Swirski et al, *J. Clin. Invest.,* 2010, 120:2627-2634; Bradley et al, *Blood,* 1982, 60:618-622; and Scholz et al. *Exp. Hematol.,* 2004, 32:270-276). While MPO is a component of innate immunity, it can also damage tissues when secreted abnormally.

SUMMARY

The present application provides, inter alia, a compound of Formula I:

I

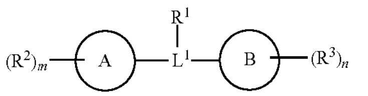

or a pharmaceutically acceptable salt thereof, wherein:

Ring A is selected from the group consisting of $C_{6-10}$ aryl, 4-16 membered heterocycloalkyl, and 5-16 membered heteroaryl;

Ring B is selected from the group consisting of $C_{6-10}$ aryl, 4-16 membered heterocycloalkyl, and 5-16 membered heteroaryl;

$L^1$ is selected from the group consisting of $NHC(O)L^2$, $NHC(O)-L^2-C(O)NH$, $L^2-NHC(O)-L^2$, $L^2-NHC(O)-L^2-NHC(O)$, and $L^2-NHC(O)-L^2-NHC(O)-L^2-$;

each $L^2$ is independently selected from the group consisting of $C_{1-4}$ alkylene, $C_{1-4}$ alkyleneoxy, and $C_{1-4}$ alkenylene;

$R^1$ comprises a chelating group and a metal;

$R^2$ are $R^3$ are each independently selected from the group consisting of $OR^a$, $C(O)R^a$, and $OC(O)R^a$;

each $R^a$ is independently selected from the group consisting of H and $C_{1-4}$ alkyl;

m is 0, 1, 2, 3, or 4; and n is 0, 1, 2, 3, or 4.

In some embodiments, Ring A is selected from the group consisting of phenyl, bicyclic 8-16 membered heterocycloalkyl, tricyclic 8-16 membered heterocycloalkyl, bicyclic 8-16 membered heteroaryl, and tricyclic 8-16 membered heteroaryl. In some embodiments, Ring A is selected from the group consisting of:

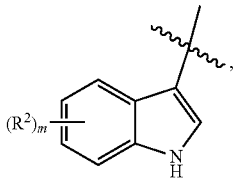
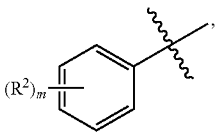
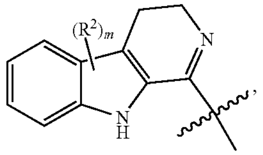
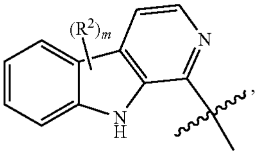
and
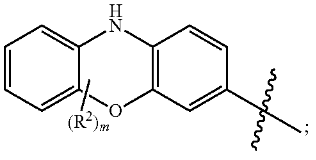

wherein indicates the bond between Ring A and $L^1$.

In some embodiments, m is 1 or 2. In some embodiments, m is 1.

In some embodiments, each $R^2$ is independently selected from the group consisting of OH, $OCH_3$, $C(O)CH_3$, and $OC(O)CH_3$. In some embodiments, each $R^2$ is OH.

In some embodiments, Ring A is selected from the group consisting of:

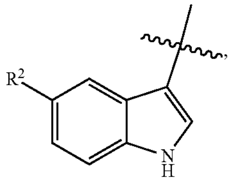
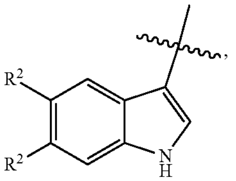
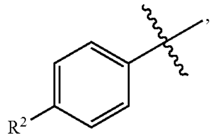
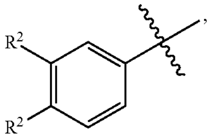
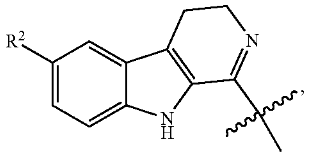
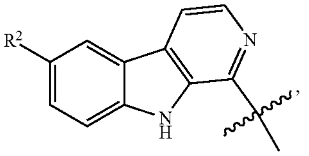
and

-continued

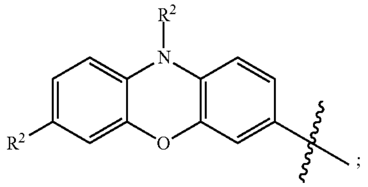

wherein indicates the bond between Ring A and L[1]

In some embodiments, Ring A is selected from the group consisting of:

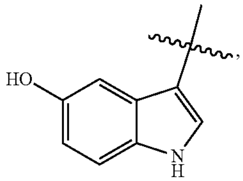

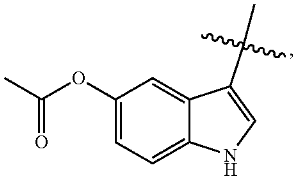

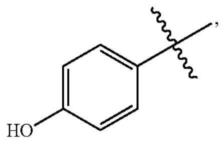

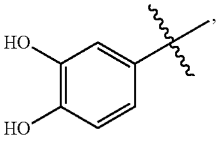

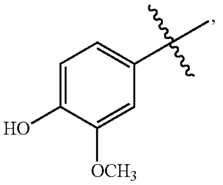

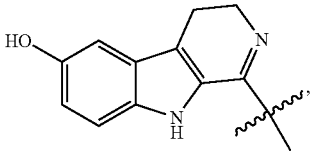

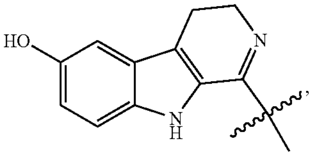

and

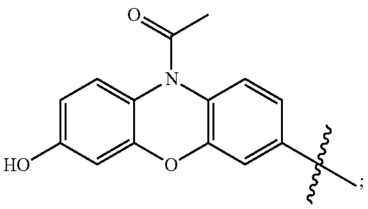

wherein indicates the bond between Ring A and $L^1$.

In some embodiments, Ring B is selected from the group consisting of phenyl, bicyclic 8-16 membered heterocycloalkyl, tricyclic 8-16 membered heterocycloalkyl, bicyclic 8-16 membered heteroaryl, and tricyclic 8-16 membered heteroaryl. In some embodiments, Ring B is selected from the group consisting of:

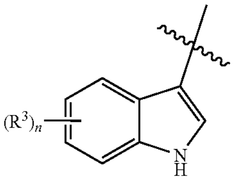

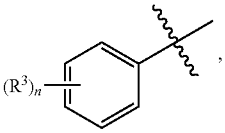

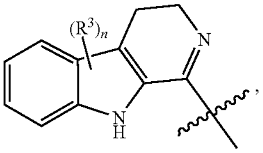

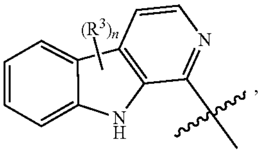

and

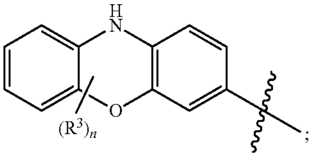

wherein indicates the bond between Ring B and $L^1$.

In some embodiments, n is 1 or 2. In some embodiments, n is 1.

In some embodiments, each $R^3$ is independently selected from the group consisting of OH, $OCH_3$, $C(O)CH_3$, and $OC(O)CH_3$. In some embodiments, each $R^3$ is OH.

In some embodiments, Ring B is selected from the group consisting of:

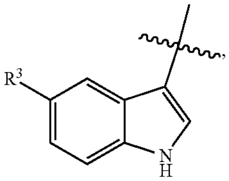

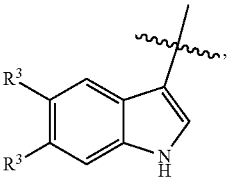

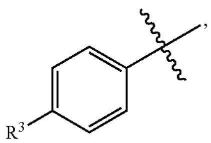

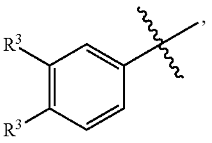

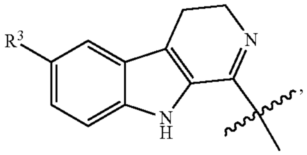

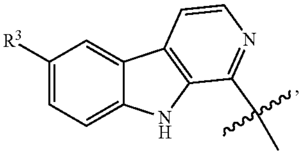

and

-continued

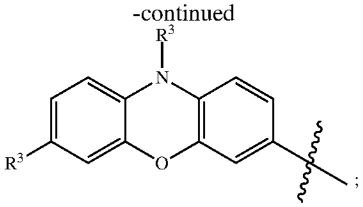

;

wherein ~~~~~ indicates the bond between Ring B and $L^1$.

In some embodiments, Ring B is selected from the group consisting of:

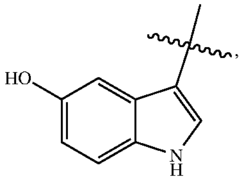

,

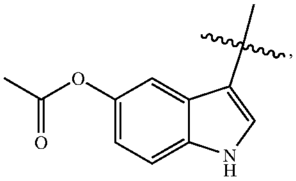

,

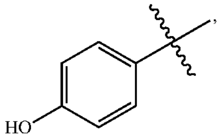

,

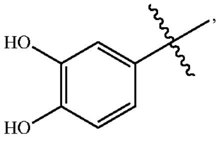

,

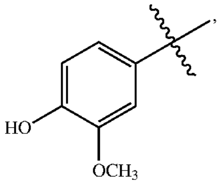

,

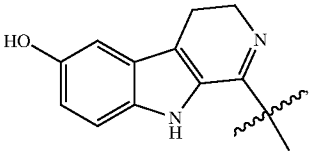

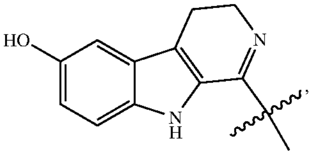

, and

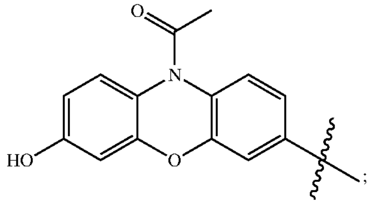

;

wherein ~~~~~ indicates the bond between Ring B and $L^1$.

In some embodiments, Ring A and Ring B are the same. In some embodiments, Ring A and Ring B are different.

In some embodiments, Ring A and Ring B are each

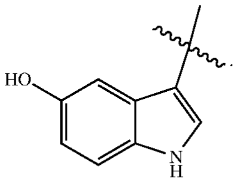

.

In some embodiments, $L^1$ is $L^2$-NHC(O)-$L^2$-NHC(O)-$L^2$-, and each $L^2$ is an independently selected $C_{1-4}$ alkylene.

In some embodiments, $L^1$ is:

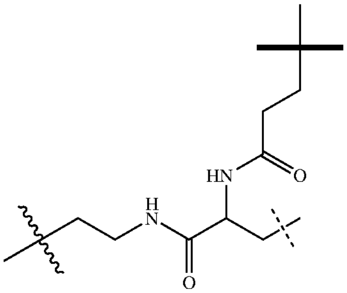

wherein:

~~~~~ indicates the bond between $L^1$ and Ring A;

- - - - - indicates the bond between $L^1$ and Ring B; and

——— indicates the bond between $L^1$ and $R^1$.

In some embodiments, the metal of $R^1$ is selected from the group consisting of $Gd^{3+}$, $Mn^{2+}$, $^{68}Ga$, $^{64}Cu$, and $^{111}In$. In some embodiments, the metal of $R^1$ is $Gd^{3+}$. In some embodiments, the chelating group of $R^1$ is selected from the group consisting of:

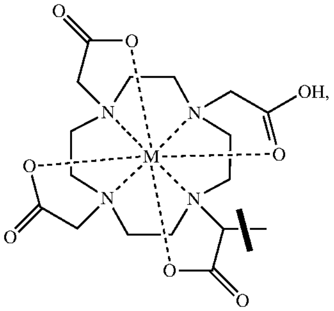

,

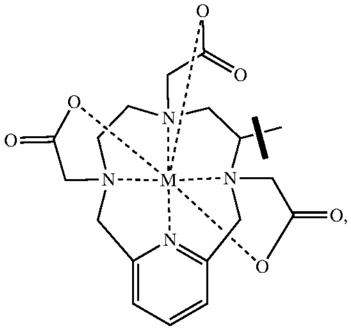

,

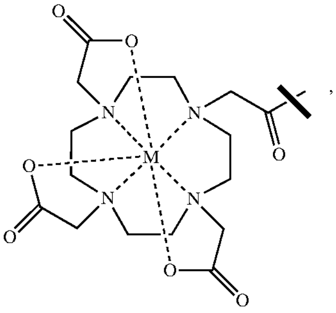

,
~~~~~

-continued

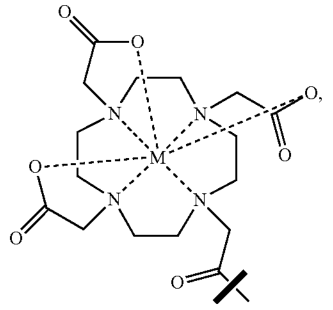

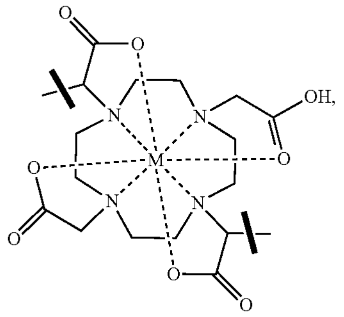

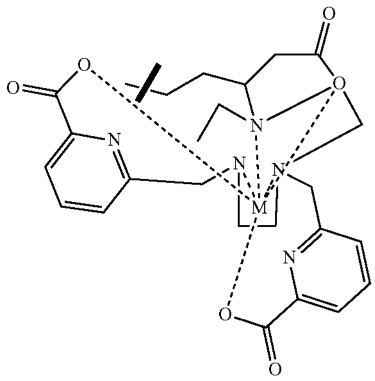

, and

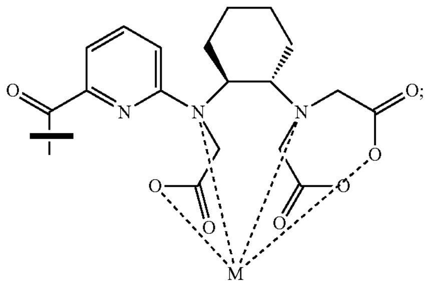

wherein M is the metal and ▬ indicates the bond between $R^1$ and $L^1$.

In some embodiments, $R^1$ is:

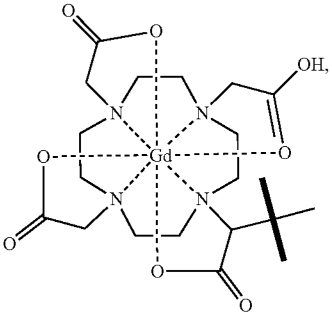

wherein ▬ indicates the bond between $R^1$ and $L^1$.

In some embodiments, the compound of Formula I, or a pharmaceutically acceptable salt thereof, is a compound of Formula II:

II

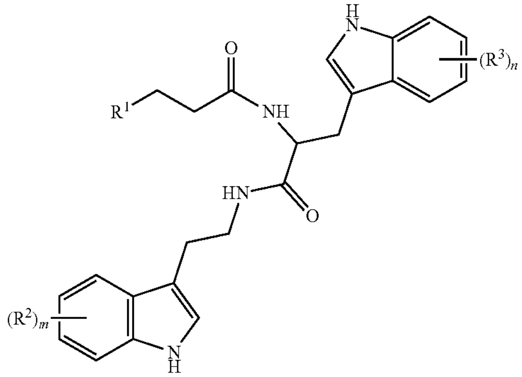

or a pharmaceutically acceptable salt thereof.

In some embodiments, the compound of Formula I, or a pharmaceutically acceptable salt thereof, is a compound of Formula III:

III

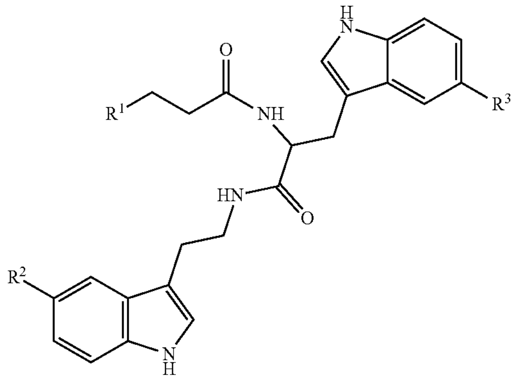

or a pharmaceutically acceptable salt thereof.

In some embodiments, the compound of Formula I, or a pharmaceutically acceptable salt thereof, is a compound of Formula IV:

IV

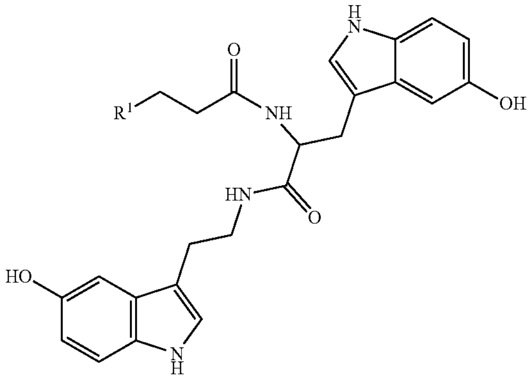

or a pharmaceutically acceptable salt thereof.

In some embodiments, the compound of Formula I, or a pharmaceutically acceptable salt thereof, is a compound of Formula Vb:

Vb

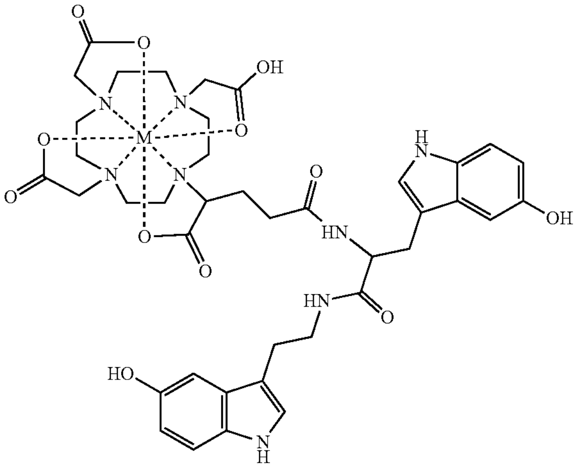

or a pharmaceutically acceptable salt thereof, wherein M is the metal.

In some embodiments, the compound of Formula I is:

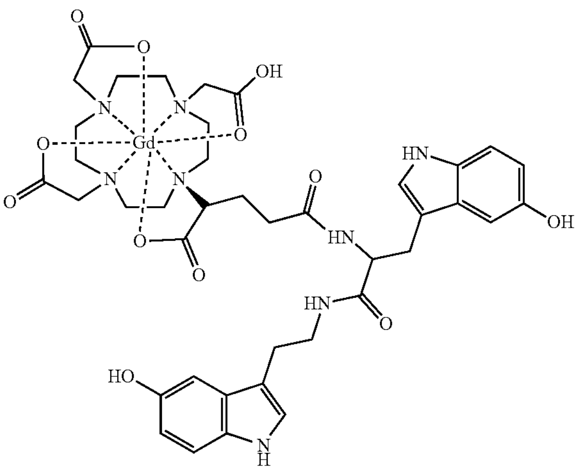

or a pharmaceutically acceptable salt thereof.

The present application further provides a pharmaceutical composition comprising a compound provided herein, or a pharmaceutically acceptable salt thereof, and at least one pharmaceutically acceptable carrier.

The present application further provides a method of imaging a cell or tissue sample, the method comprising:

i) administering to the subject a compound provided herein, or a pharmaceutically acceptable salt thereof;
ii) waiting a time sufficient to allow the compound to accumulate at the cell or tissue sample; and
iii) imaging the cell or tissue sample with an imaging technique.

The present application further provides a method of imaging the liver of a subject, the method comprising:

i) administering to the subject a compound provided herein, or a pharmaceutically acceptable salt thereof;
ii) waiting a time sufficient to allow the compound to accumulate at the liver; and
iii) imaging the cell or tissue sample with an imaging technique.

In some embodiments, the subject has been identified as having nonalcoholic steatohepatitis.

The present application further provides a method of diagnosing a disease or disorder associated with abnormal myeloperoxidase activity in a subject, comprising:

i) administering to the subject a compound provided herein, or a pharmaceutically acceptable salt thereof;
ii) waiting a time sufficient to allow the compound to accumulate at a cell or tissue site associated with the disease; and
iii) imaging the cell or tissue with an imaging technique.

In some embodiments, the method further comprises imaging the subject prior to step i).

The present application further provides a method of imaging myeloperoxidase activity in a cell, the method comprising:

i) contacting the cell with a compound provided herein, or a pharmaceutically acceptable salt thereof; and
ii) imaging the cell with an imaging technique.

The present application further provides a method of detecting myeloperoxidase activity in a cell or tissue sample, the method comprising:

i) contacting the cell or tissue sample with a compound provided herein, or a pharmaceutically acceptable salt thereof; and
ii) imaging the cell or tissue sample with an imaging technique.

The present application further provides a method of detecting myeloperoxidase activity in a subject, the method comprising:

i) administering to the subject a compound provided herein, or a pharmaceutically acceptable salt thereof; and
ii) imaging the subject with an imaging technique.

The present application further provides a method of monitoring treatment of a disease or disorder associated with abnormal myeloperoxidase activity in a subject, the method comprising:

i) administering to the subject a compound provided herein, or a pharmaceutically acceptable salt thereof;
ii) imaging the subject with an imaging technique;
iii) administering to the subject a therapeutically effective amount of a therapeutic compound to treat the disease or disorder;
iv) imaging the cell or tissue in the subject with an imaging technique; and v) comparing the image of step i) and the image of step iv).

In some embodiments, the method further comprises administering to the subject a compound provided herein, or a pharmaceutically acceptable salt thereof, after the administering of step iii) and prior to the imaging of step iv).

In some embodiments, the imaging technique is selected from the group consisting of magnetic resonance imaging and nuclear imaging.

In some embodiments, the disease or disorder associated with abnormal myeloperoxidase activity is selected from the group consisting of nonalcoholic steatohepatitis, a cancer, a rheumatic disease, an infectious disease, a disease of the central nervous system, a cardiovascular disorder, an autoimmune disorder, and inflammation associated with one or more of a cancer, a rheumatic disease, an infectious disease, disease of the central nervous system, cardiovascular disorder, and autoimmune disorder.

In some embodiments, the disease of the central nervous system is selected from the group consisting of Alzheimer's disease, stroke, epilepsy, Parkinson's disease, a neurodegenerative disease, and inflammation associated with one or more of Alzheimer's disease, stroke, epilepsy, Parkinson's disease, and neurodegenerative disease.

In some embodiments, the cardiovascular disorder is selected from the group consisting of atherosclerosis, myocardial infarction, atrial fibrillation, vasculitis, and inflammation associated with one or more of atherosclerosis, myocardial infarction, atrial fibrillation, and vasculitis.

In some embodiments, the autoimmune disorder is selected from the group consisting of multiple sclerosis, meningitis, encephalitis, and inflammation associated with one or more of multiple sclerosis, meningitis, and encephalitis.

In some embodiments, the cancer is selected from the group consisting of bladder cancer, breast cancer, carcinoma, cervical cancer, colorectal cancer, endometrial cancer, glioma, cancer of the head and neck, liver cancer, lung cancer, melanoma, ovarian cancer, pancreatic cancer, prostate cancer, renal cancer, skin cancer, stomach cancer, testicular cancer, leukemia, and thyroid cancer. In some embodiments, the cancer is a solid tumor.

In some embodiments, the rheumatic disease is selected from the group consisting of rheumatoid arthritis, osteoarthritis, and inflammatory arthritis.

In some embodiments, the inflammatory arthritis is selected from the group consisting of gout and calcium pyrophosphate deposition disease (CPPD).

In some embodiments, the infectious disease is selected from the group consisting of a fungal disease and a bacterial disease.

In some embodiments, the disease or disorder associated with abnormal myeloperoxidase activity is nonalcoholic steatohepatitis (NASH).

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

DESCRIPTION OF DRAWINGS

FIG. 8 shows binding affinities for mcMPO-Gd (left) and MPO-Gd (right) from the docking experiments described in Example 13.

DETAILED DESCRIPTION

Figure 1:
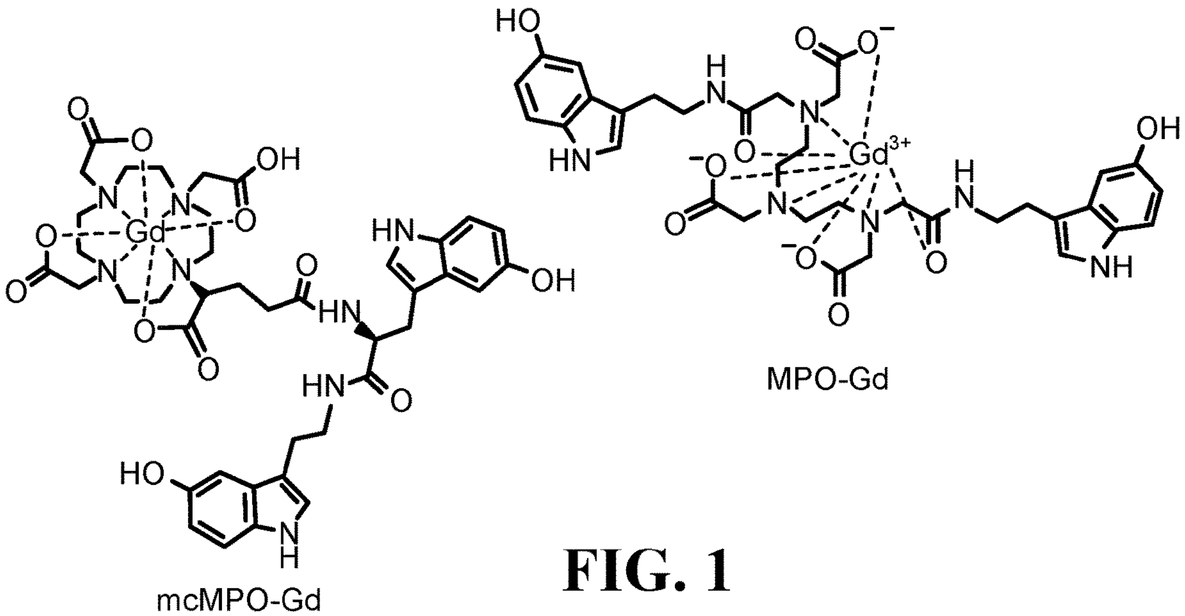
FIG. 1 shows chemical structures of a representative compound of Formula I, mcMPO-Gd, and previously reported compound, MPO-Gd.

MPO is a factor in many diseases including atherosclerosis (see e.g., Teng et al, *Redox. Rep.* 2017, 22: 51-73), vasculitis (see e.g., Su et al, *Radiology,* 2012, 262:181-190), stroke (see e.g., Forghani et al, *J. Cereb. Blood Flow Metab.* 2015, 35:485-493), Parkinson's disease (see e.g., Choi et al, *J. Neurosci.* 2005, 25:6594-6600), Alzheimer's disease (see e.g., Maki et al, *J. Biol. Chem.* 2009, 284:3158-3169; and Tzikas et al, *J. Alzheimers Dis.* 2014, 39:557-564), and multiple sclerosis (see e.g., Gray et al, *Neurosci. Lett.* 2008, 444:195-198), and the enzyme is emerging as a diagnostic and therapeutic target (see e.g., Ruggeri et al, *J. Med. Chem.* 2015, 58:8513-8528; Jucaite et al, *Brain,* 2015, 138:2687-2700; Malle et al, *Br. J. Pharmacol.* 2007, 152:838-854; and Rashid et al, *Eur. Heart J.* 2018, 39:3301-3310. Previous reports have described an activatable MPO-specific gadolinium-based MRI agent, bis-5-HT-Gd-DTPA (i.e., MPO-Gd; structure shown in FIG. 1) (see e.g., Rodriguez et al, *J. Am. Chem. Soc.* 2010, 132:168-177), and demonstrated that MPO-Gd imaging was able to detect inflammation in experimental models of autoimmune encephalomyelitis (EAE) (see e.g., Chen et al, *Brain,* 2008, 131:1123-1133), atherosclerosis (see e.g., Rashid et al, *Eur. Heart J.* 2018, 39:3301-3310; and Ronald et al, *Circulation,* 2009, 120:592-599), stroke (see e.g., Breckwoldt et al, *Proc. Natl. Acad. Sci. USA,* 2008, 105:18584-18589), myocardial infarction (see e.g., Nahrendorf et al, *Circulation,* 2008, 117:1153-1160), and vasculitis (see e.g., Su et al, *Radiology,* 2012, 262:181-190). MPO-Gd imaging was also able to track treatment effects in mouse models of stroke (see e.g., Forghani et al, *J. Cereb. Blood Flow Metab.* 2015, 35:485-493), unstable atherosclerotic plaque (see e.g., Rashid et al, *Eur. Heart J.* 2018, 39:3301-3310; and Ronald et al, *Circulation,* 2009, 120:592-599), myocardial infarction (see e.g., Nahrendorf et al, *Circulation,* 2008, 117:1153-1160; and Ali et al, *JACC: Basic to Translational Science,* 2016, 1:633-643) and EAE (see e.g., Forghani et al, *Radiology,* 2012, 263:451-460), and to differentiate steatohepatitis from nonalcoholic fatty steatohepatitis (NASH) (see e.g., Pulli et al, *Radiology,* 2017, 284:390-400).

However, the literature has reported concerns over gadolinium deposition in magnetic resonance (MR) imaging using gadolinium-based contrast agents (GBCAs), particularly linear GBCAs, based on the association between the administration of GBCAs and the development of nephrogenic systemic fibrosis in renal failure patients (see e.g., Grobner, T. *Nephrol. Dial. Transplant.* 2006, 21:1104-1108; and Marckmann et al, *J. Am. Soc. Nephrol.* 2006, 17:2359-2362). Exemplary cases in nephrogenic systemic fibrosis and gadolinium accumulation in neural tissues were associated with the use of linear GBCAs such as gadodiamide (Omniscan), gadopentetate dimeglumine (Gd-DTPA or Magnevist), and OptiMARK. Recent studies described that gadolinium deposition following administration of linear GBCAs was also found in neural tissues in patients with normal renal function, as well as in animals (see e.g., McDonald et al, *Radiology,* 2015, 275:772-782; Kanda et al, *Radiology,* 2015, 276:228-232; and Robert et al, *Invest. Radiol.* 2015, 50:473-480).

Compared with linear GBCAs, macrocyclic GBCAs bind gadolinium tighter, thereby decreasing the likelihood of the gadolinium ion dissociating from the chelating molecule. Consistent with this, administration of macrocyclic GBCAs such as gadoterate meglumine (Dotarem) (see e.g., Robert et al, *Invest. Radiol.* 2015, 50:473-480; and Radbruch et al, *Radiology,* 2015, 275:783-791) and gadoteridol (Prohance) (see e.g., Kanda et al, *Radiology,* 2015, 275:803-809) have little to no observed tissue deposition of gadolinium. Thus, there is a need for new imaging agents for improving safety and advantages of MR imaging while minimizing the risks. Accordingly, the present application provides macrocyclic-based activatable MRI imaging agents for the detection of MPO activity.

Compounds

The present application provides compounds of Formula I:

I

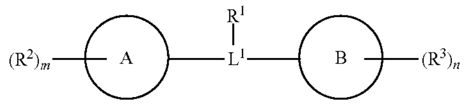

or a pharmaceutically acceptable salt thereof, wherein:

Ring A is selected from the group consisting of $C_{6-10}$ aryl, 4-16 membered heterocycloalkyl, and 5-16 membered heteroaryl;

Ring B is selected from the group consisting of $C_{6-10}$ aryl, 4-16 membered heterocycloalkyl, and 5-16 membered heteroaryl;

$L^1$ is selected from the group consisting of NHC(O)$L^2$, NHC(O)-$L^2$-C(O)NH, $L^2$-NHC(O)-$L^2$, $L^2$-NHC(O)-$L^2$-NHC(O), and $L^2$-NHC(O)-$L^2$-NHC(O)-$L^2$-;

each $L^2$ is independently selected from the group consisting of $C_{1-4}$ alkylene, $C_{1-4}$ alkylene, $C_{1-4}$ alkyleneoxy, and $C_{1-4}$ alkenylene;

$R^1$ comprises: (i) a chelating group; or (ii) a chelating group and a metal;

$R^2$ are $R^3$ are each independently selected from the group consisting of $OR^a$, $C(O)R^a$, and $OC(O)R^a$;

each $R^a$ is independently selected from the group consisting of H and $C_{1-4}$ alkyl;

m is 0, 1, 2, 3, or 4; and n is 0, 1, 2, 3, or 4.

In some embodiments, Ring A is selected from the group consisting of $C_{6-10}$ aryl, bicyclic 8-16 membered heterocycloalkyl, tricyclic 8-16 membered heterocycloalkyl, bicyclic 8-16 membered heteroaryl, and tricyclic 8-16 membered heteroaryl. In some embodiments, Ring A is selected from the group consisting of phenyl, bicyclic 8-16 membered heterocycloalkyl, tricyclic 8-16 membered heterocycloalkyl, bicyclic 8-16 membered heteroaryl, and tricyclic 8-16 membered heteroaryl. In some embodiments, Ring A is phenyl. In some embodiments, Ring A is a bicyclic 8-16 membered heterocycloalkyl. In some embodiments, Ring A is a tricyclic 8-16 membered heterocycloalkyl. In some embodiments, Ring A is a bicyclic 8-16 membered heteroaryl. In some embodiments, Ring A is a tricyclic 8-16 membered heteroaryl.

In some embodiments, Ring A is selected from the group consisting of:

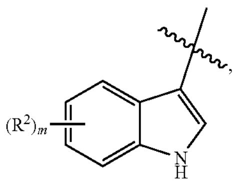,
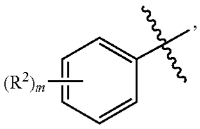,
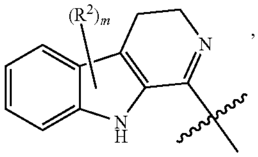,
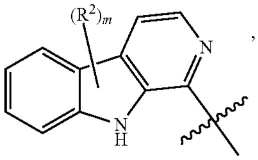, and
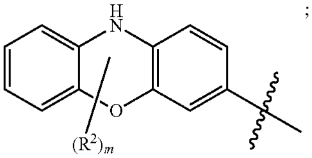;

wherein  indicates the bond between Ring A and $L^1$.

In some embodiments, Ring A is

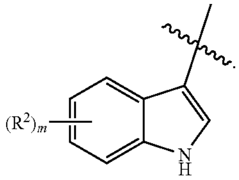

In some embodiments, m is 0, 1, 2, 3. In some embodiments, m is 1 or 2. In some embodiments, m is 1. In some embodiments, m is 2. In some embodiments, m is 3. In some embodiments, m is 4.

In some embodiments, Ring A is selected from the group consisting of:

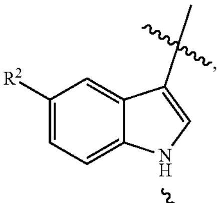,
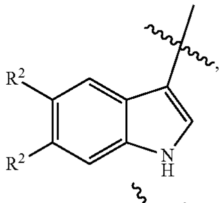,
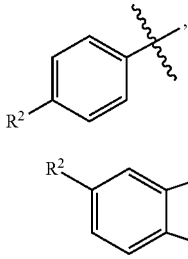,
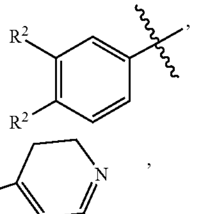,
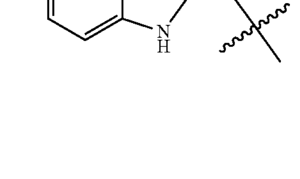,

-continued

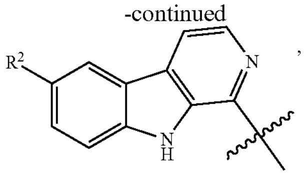, and
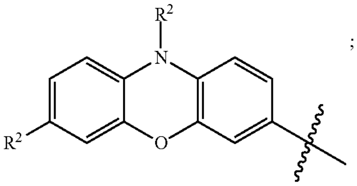;

wherein  indicates the bond between Ring A and $L^1$.

In some embodiments, Ring A is

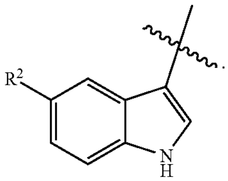

In some embodiments, each $R^2$ is independently selected from the group consisting of $OR^a$, $C(O)R^a$, and $OC(O)R^a$, and each $R^a$ is independently selected from the group consisting of H and $CH_3$. In some embodiments, each $R^2$ is independently selected from the group consisting of OH, $OCH_3$, $C(O)CH_3$, and $OC(O)CH_3$. In some embodiments, each $R^2$ is OH. In some embodiments, each $R^2$ is $OCH_3$. In some embodiments, each $R^2$ is $C(O)CH_3$. In some embodiments, each $R^2$ is $OC(O)CH_3$.

In some embodiments, Ring A is selected from the group consisting of:

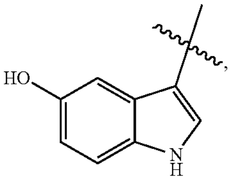,
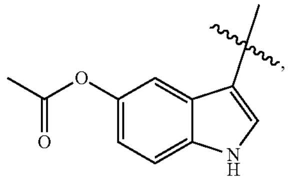,
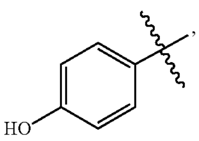,
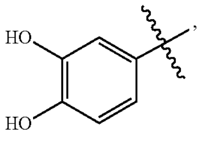,
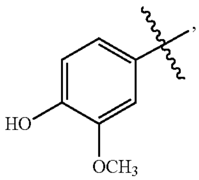,
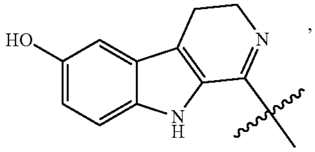,
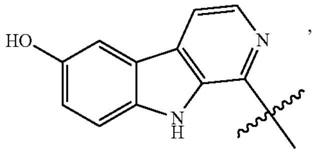, and -continued

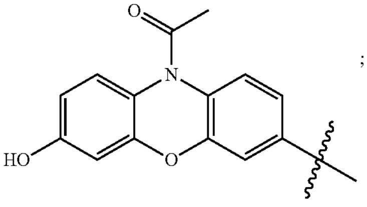

;

wherein ∿∿∿ indicates the bond between Ring A and $L^1$.

In some embodiments, Ring B is selected from the group consisting of $C_{6-10}$ aryl, bicyclic 8-16 membered heterocycloalkyl, tricyclic 8-16 membered heterocycloalkyl, bicyclic 8-16 membered heteroaryl, and tricyclic 8-16 membered heteroaryl. In some embodiments, Ring B is selected from the group consisting of phenyl, bicyclic 8-16 membered heterocycloalkyl, tricyclic 8-16 membered heterocycloalkyl, bicyclic 8-16 membered heteroaryl, and tricyclic 8-16 membered heteroaryl. In some embodiments, Ring B is phenyl. In some embodiments, Ring B is a bicyclic 8-16 membered heterocycloalkyl. In some embodiments, Ring B is a tricyclic 8-16 membered heterocycloalkyl. In some embodiments, Ring B is a bicyclic 8-16 membered heteroaryl. In some embodiments, Ring B is a tricyclic 8-16 membered heteroaryl.

In some embodiments, Ring B is selected from the group consisting of:

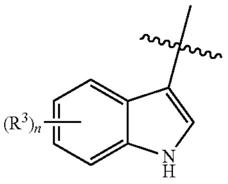

,

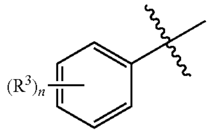

,

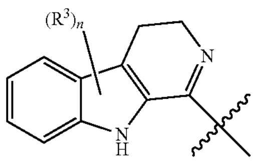

,

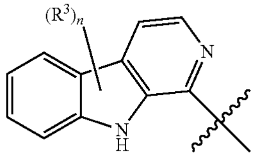

, and

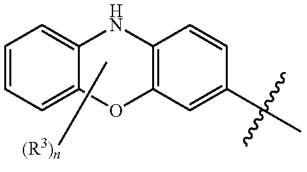

;

wherein ∿∿∿ indicates the bond between Ring B and $L^1$.

In some embodiments, Ring B is

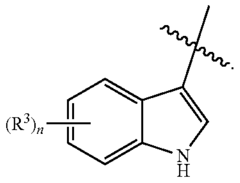

In some embodiments, n is 0, 1, 2, 3. In some embodiments, n is 1 or 2. In some embodiments, n is 1. In some embodiments, n is 2. In some embodiments, n is 3. In some embodiments, n is 4.

In some embodiments, Ring B is selected from the group consisting of:

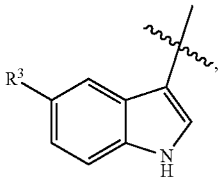

,

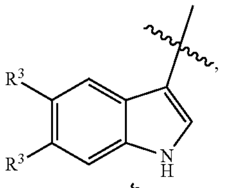

,

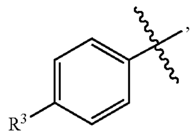

,

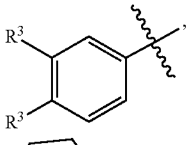

,

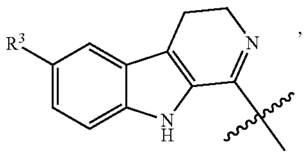

,

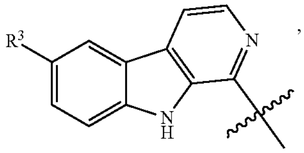

, and

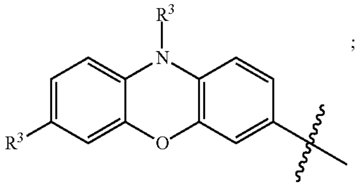

;

wherein ∿∿∿ indicates the bond between Ring B and $L^1$.

In some embodiments, Ring B is

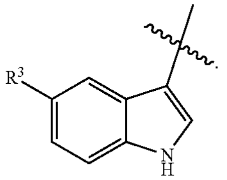

In some embodiments, each $R^3$ is independently selected from the group consisting of $OR^a$, $C(O)R^a$, and $OC(O)R^a$, and each $R^a$ is independently selected from the group consisting of H and $CH_3$. In some embodiments, each $R^3$ is independently selected from the group consisting of OH, $OCH_3$, $C(O)CH_3$, and $OC(O)CH_3$. In some embodiments, each $R^3$ is OH. In some embodiments, each $R^3$ is $OCH_3$. In some embodiments, each $R^3$ is $C(O)CH_3$. In some embodiments, each $R^3$ is $OC(O)CH_3$.

In some embodiments, Ring B is selected from the group consisting of:

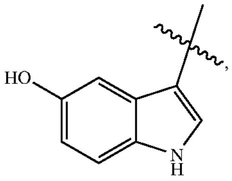,
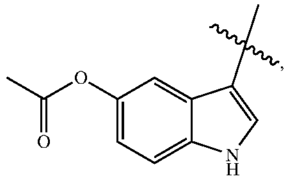,
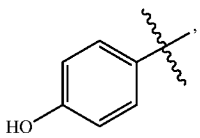,
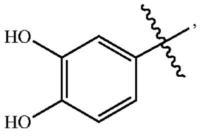,
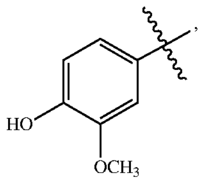,
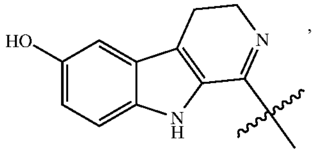,
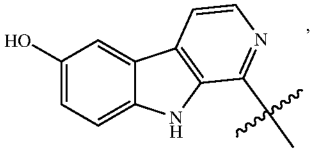, and
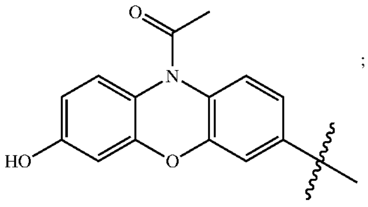;

wherein  indicates the bond between Ring B and $L^1$.

In some embodiments, Ring B is

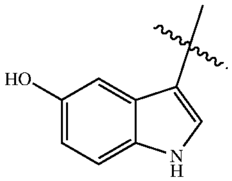

In some embodiments, Ring A and Ring B are the same. In some embodiments, Ring A and Ring B are different. In some embodiments, Ring A and Ring B are each

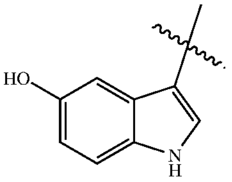

In some embodiments, $L^1$ is $NHC(O)L^2$. In some embodiments, $L^1$ is $NHC(O)-L^2-C(O)NH$. In some embodiments, $L^1$ is $L^2-NHC(O)-L^2$. In some embodiments, $L^1$ is $L^2-NHC(O)-L^2-NHC(O)$. In some embodiments, $L^1$ is $L^2-NHC(O)-L^2-NHC(O)-L^2-$.

In some embodiments, each $L^2$ is independently selected from the group consisting of $C_{1-4}$ alkylene and $C_{1-4}$ alkenylene. In some embodiments, each $L^2$ is an independently selected $C_{1-4}$ alkylene. In some embodiments, each $L^2$ is an independently selected $C_{1-4}$ alkyleneoxy. In some embodiments, each $L^2$ is an independently selected $C_{1-4}$ alkenylene.

In some embodiments, $L^1$ is $L^2-NHC(O)-L^2-NHC(O)-L^2-$, and each $L^2$ is an independently selected $C_{1-4}$ alkylene.

In some embodiments, $L^1$ is:

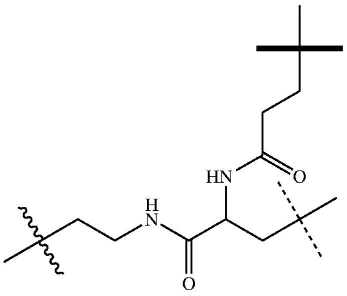

wherein indicates the bond between $L^1$ and Ring A;

indicates the bond between $L^1$ and Ring B; and indicates the bond between $L^1$ and $R^1$.

In some embodiments, $R^1$ comprises a chelating group. In some embodiments, $R^1$ comprises a chelating group and a metal. In some embodiments, $R^1$ comprises a chelating group and a metal suitable for imaging with an imaging technique (e.g., magnetic resonance imaging, nuclear imaging, and the like). In some embodiments, $R^1$ comprises a chelating group and a metal suitable for magnetic resonance imaging. In some embodiments, $R^1$ comprises a chelating group and a metal suitable for nuclear imaging.

In some embodiments, the metal of $R^1$ is selected from the group consisting of $Gd^{3+}$, $Mn^{2+}$, $^{68}Ga$, $^{64}Cu$, and $^{111}In$. In some embodiments, the metal of $R^1$ is $Gd^{3+}$.

In some embodiments, the chelating group of $R^1$ is selected from the group consisting of 1,4,7-triazacyclononanetriacetic acid (NOTA), 1,4,7,10-tetraazacyclododecane-1,4,7,10-tetraacetic acid (DOTA), 1,4,7-triazacyclononane-1-glutaric acid-4,7-diacetic acid (NODAGA), and ethylene diamine tetra-acetic acid (EDTA).

In some embodiments, $R^1$ is selected from the group consisting of:

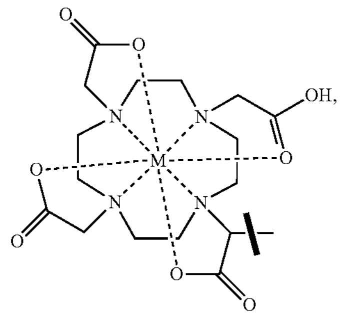
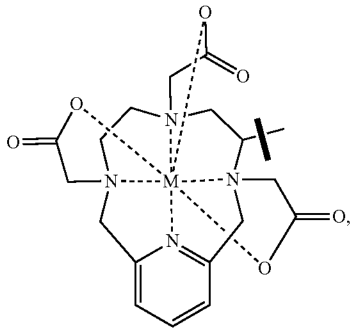
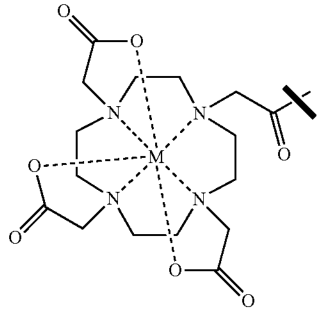
,
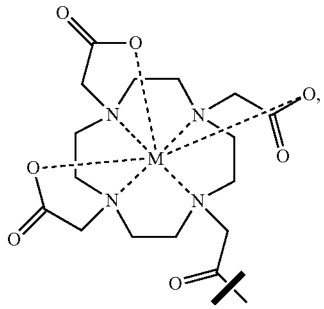
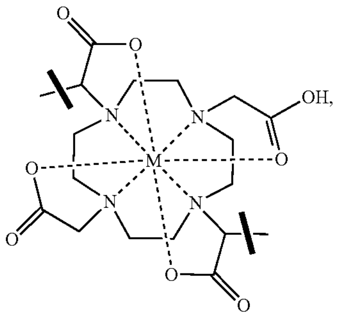
-continued
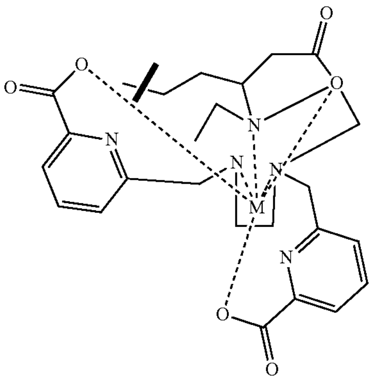
,
and
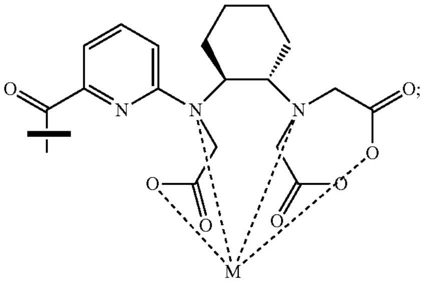
wherein is the metal and ▬ indicates the bond between $R^1$ and $L^1$.
In some embodiments, $R^1$ is selected from the group consisting of:
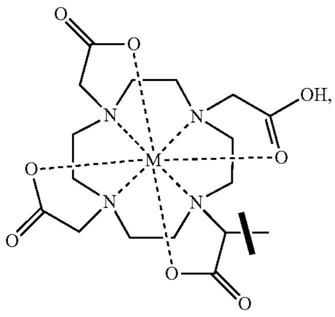
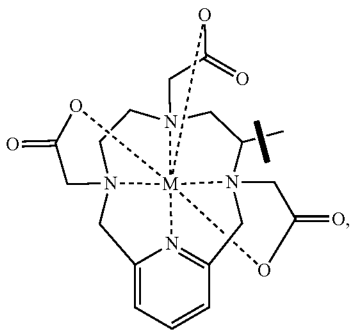

-continued

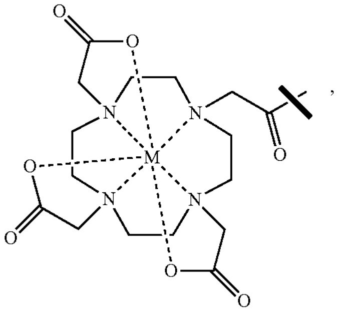

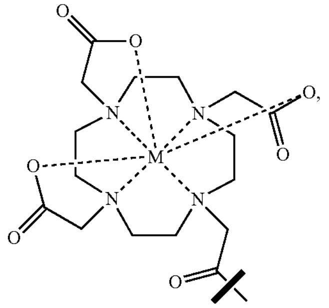

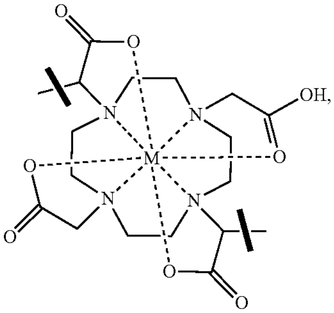

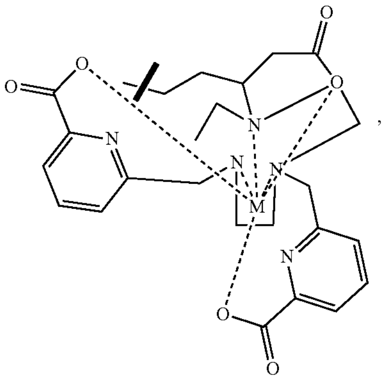

and

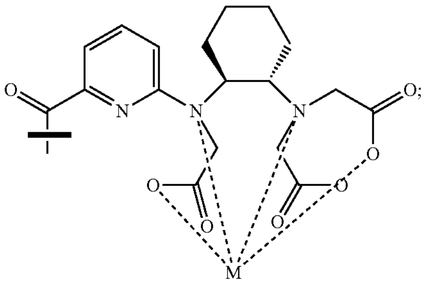

wherein M is a metal selected from the group consisting of $Gd^{3+}$, $Mn^{2+}$, $^{68}Ga$ $^{64}Cu$, an $^{111}In$ and ▬ indicates the bond between $R^1$ and $L^1$.

In some embodiments, $R^1$ is:

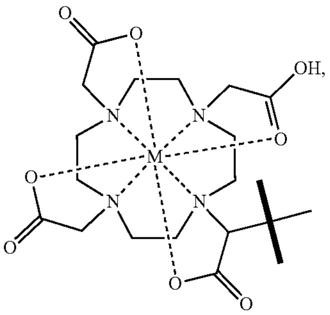

wherein M is the metal and ▬ indicates the bond between $R^1$ and $L^1$.

In some embodiments, $R^1$ is:

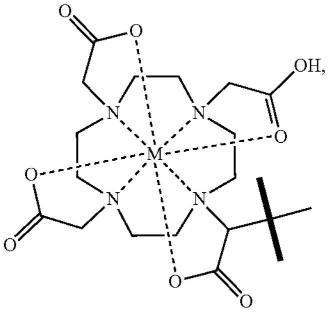

wherein M is a metal selected from the group consisting of $Gd^{3+}$, $Mn^{2+}$, $^{68}Ga$ $^{64}Cu$, and $^{111}In$, and ▬ indicates the bond between $R^1$ and $L^1$.

In some embodiments, $R^1$ is:

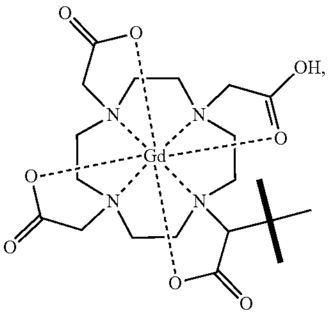

wherein ▬ indicates the bond between $R^1$ and $L^1$.

In some embodiments:

Ring A is selected from the group consisting of phenyl, bicyclic 8-16 membered heterocycloalkyl, tricyclic 8-16 membered heterocycloalkyl, bicyclic 8-16 membered heteroaryl, and tricyclic 8-16 membered heteroaryl;

Ring B is selected from the group consisting of phenyl, bicyclic 8-16 membered heterocycloalkyl, tricyclic 8-16 membered heterocycloalkyl, bicyclic 8-16 membered heteroaryl, and tricyclic 8-16 membered heteroaryl;

$L^1$ is $L^2$-NHC(O)-$L^2$-NHC(O)-$L^2$-;

each $L^2$ is an independently selected $C_{1-4}$ alkylene;

$R^1$ comprises a chelating group and a metal;

$R^2$ are $R^3$ are each independently selected from the group consisting of $OR^a$, $C(O)R^a$, and $OC(O)R^a$;

each $R^a$ is independently selected from the group consisting of H and $C_{1-4}$ alkyl;

m is 0, 1, or 2; and n is 0, 1, or 2.

In some embodiments:

Ring A is selected from the group consisting of:

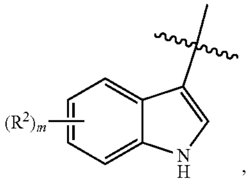
,
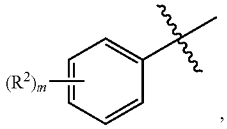
,
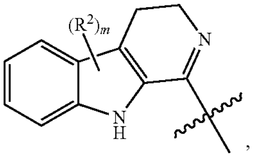
,
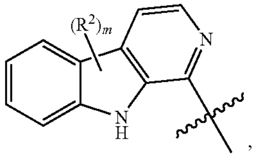
, and
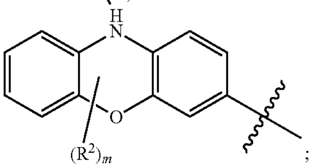
;

Ring B is selected from the group consisting of:

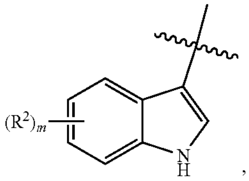
,
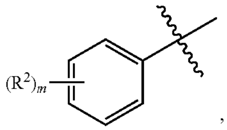
,
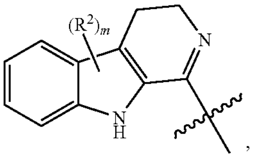
,
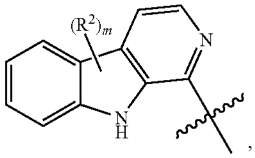
, and
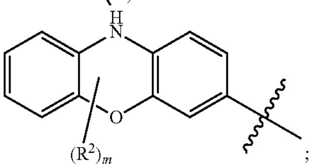
;

$L^1$ is $L^2$-NHC(O)-$L^2$-NHC(O)-$L^2$-;

each $L^2$ is an independently selected $C_{1-4}$ alkylene;

$R^1$ comprises a chelating group and a metal;

$R^2$ are $R^3$ are each $OR^a$;

each $R^a$ is independently selected from the group consisting of H and $C_{1-4}$ alkyl;

m is 0, 1, or 2; and n is 0, 1, or 2.

In some embodiments:

Ring A is selected from the group consisting of:

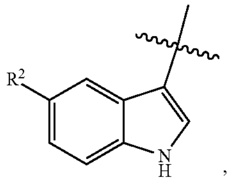
,
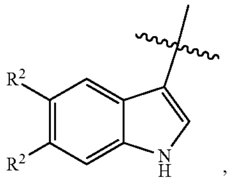
,
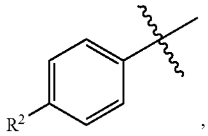
,
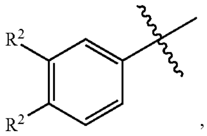
,
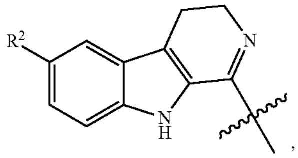
,
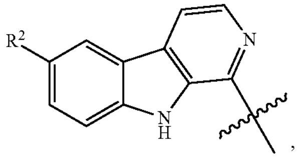
, and
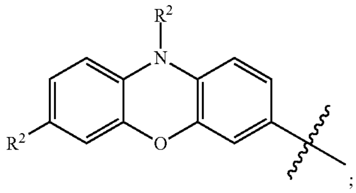
;

Ring B is selected from the group consisting of:

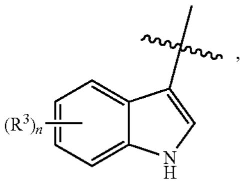
,
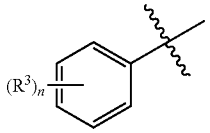
,
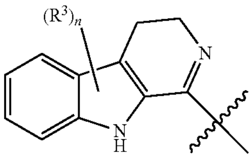
,
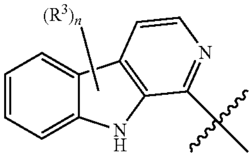
,

-continued and 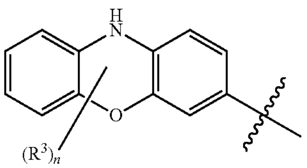 ;

$L^1$ is $L^2$-NHC(O)-$L^2$-NHC(O)-$L^2$-;

each $L^2$ is an independently selected $C_{1-4}$ alkylene;

$R^1$ comprises a chelating group and a metal;

$R^2$ are $R^3$ are each $OR^a$;

each $R^a$ is independently selected from the group consisting of H and $C_{1-4}$ alkyl;

m is 0, 1, or 2; and n is 0, 1, or 2.

In some embodiments:

Ring A and Ring B are each independently selected from the group consisting of:

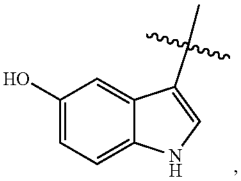 [SMILES: *c1c[nH]c2ccc(O)cc12] , 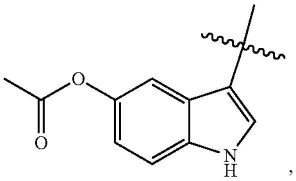 ,

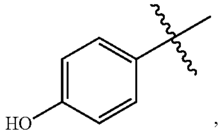 , 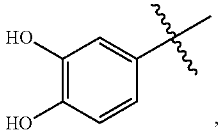 ,

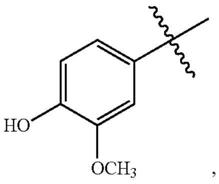 , 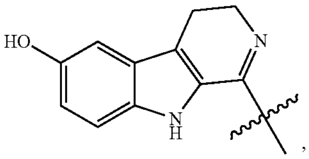 ,

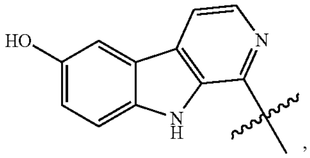 , and

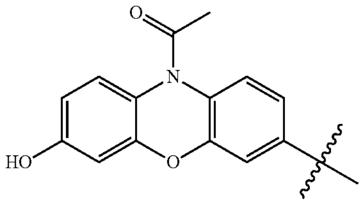 ;

$L^1$ is $L^2$-NHC(O)-$L^2$-NHC(O)-$L^2$-;

each $L^2$ is an independently selected $C_{1-4}$ alkylene; and $R^1$ is selected from the group consisting of:

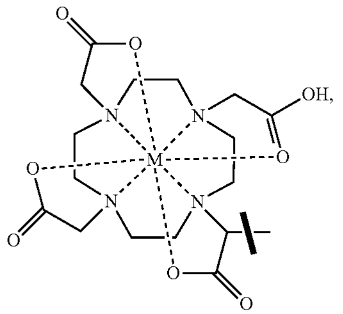

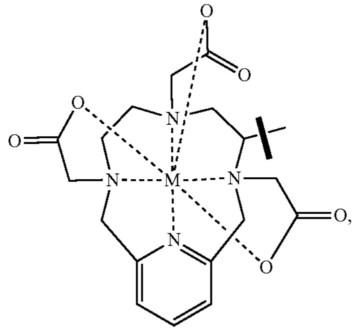

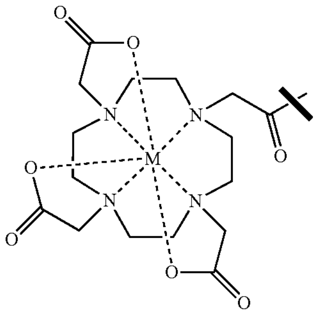 ,

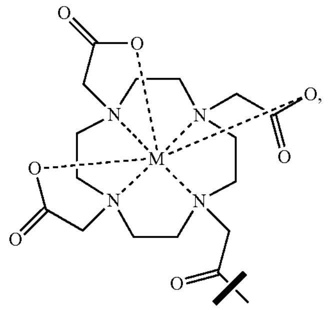

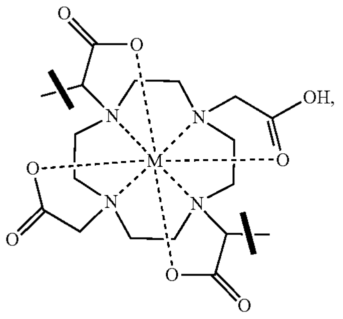

-continued

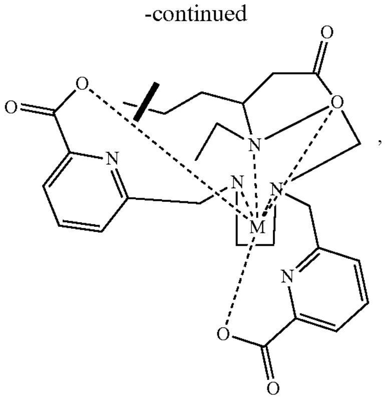

and

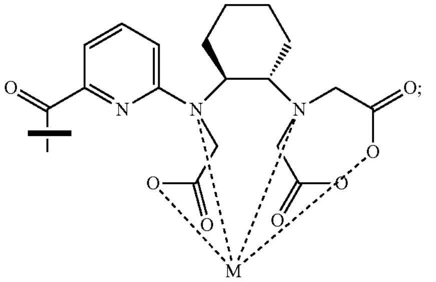

wherein M is a metal selected from the group consisting of $Gd^{3+}$, $Mn^{2+}$, $^{68}Ga$, $^{64}Cu$, and $^{111}In$.

In some embodiments:

Ring A and Ring B are each

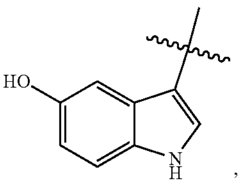

$L^1$ is $L^2$-NHC(O)-$L^2$-NHC(O)-$L^2$-;

each $L^2$ is an independently selected $C_{1-4}$ alkylene; and $R^1$ is

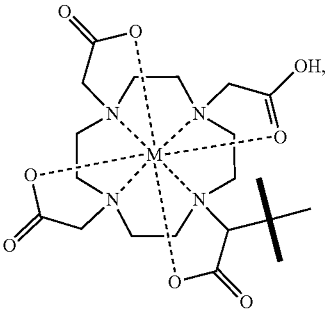

wherein M is a metal selected from the group consisting of $Gd^{3+}$, $Mn^{2+}$, $^{68}Ga$, $^{64}Cu$, and $^{111}In$.

In some embodiments, the compound of Formula I, or a pharmaceutically acceptable salt thereof, is a compound of Formula II:

II

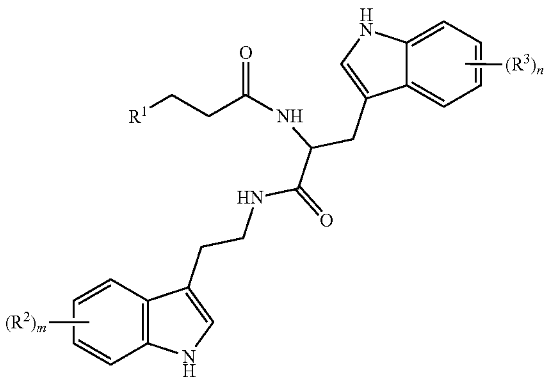

or a pharmaceutically acceptable salt thereof, wherein variables $R^1$, $R^2$, $R^3$, m, and n are defined according to the definitions provided herein for compounds of Formula I.

In some embodiments, the compound of Formula I, or a pharmaceutically acceptable salt thereof, is a compound of Formula III:

III

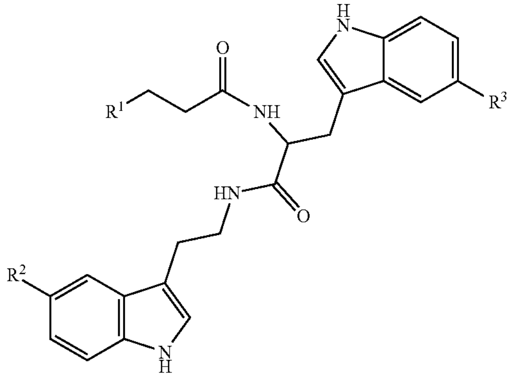

or a pharmaceutically acceptable salt thereof, wherein variables $R^1$, $R^2$, and $R^3$ are defined according to the definitions provided herein for compounds of Formula I In some embodiments, the compound of Formula I, or a pharmaceutically acceptable salt thereof, is a compound of Formula IV:

IV

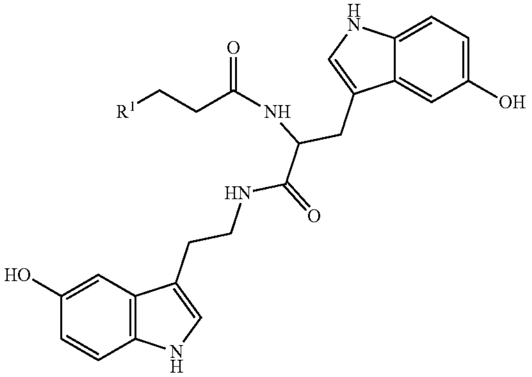

or a pharmaceutically acceptable salt thereof, wherein variable $R^1$ is defined according to the definition provided herein for compounds of Formula I.

In some embodiments, the compound of Formula I, or a pharmaceutically acceptable salt thereof, is a compound of Formula V:

V

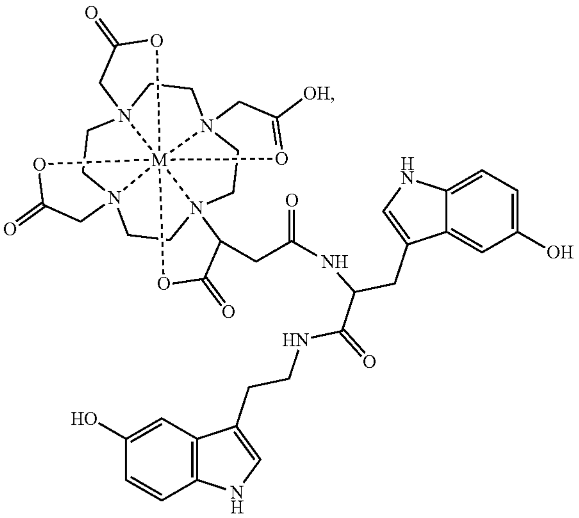

or a pharmaceutically acceptable salt thereof, wherein M is the metal and is defined according to the definitions provided herein for compounds of Formula I.

In some embodiments, the compound of Formula I, or a pharmaceutically acceptable salt thereof, is a compound of Formula Va:

Va

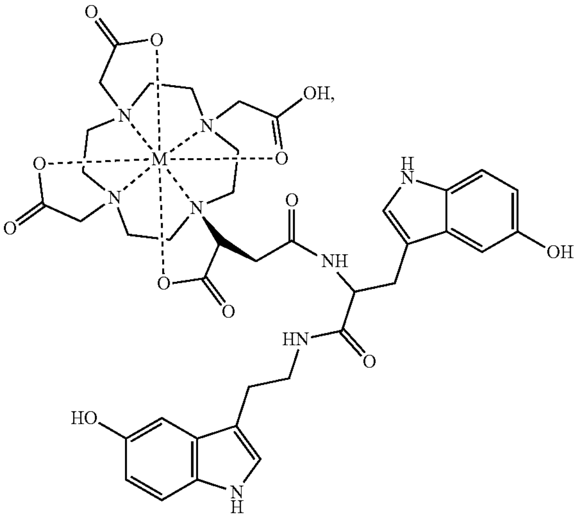

or a pharmaceutically acceptable salt thereof, wherein M is the metal and is defined according to the definitions provided herein for compounds of Formula I.

In some embodiments, the compound of Formula I, or a pharmaceutically acceptable salt thereof, is a compound of Formula Vb:

Vb

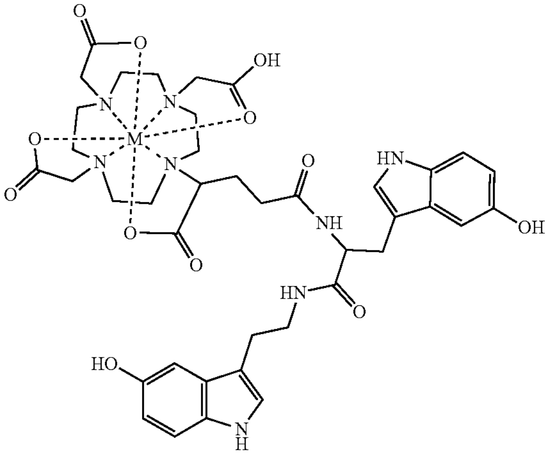

or a pharmaceutically acceptable salt thereof, wherein M is the metal and is defined according to the definitions provided herein for compounds of Formula I.

In some embodiments, the compound of Formula I, or a pharmaceutically acceptable salt thereof, is a compound of Formula Vc:

Vc

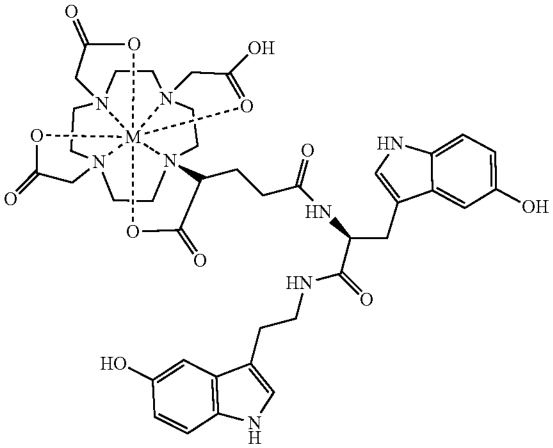

or a pharmaceutically acceptable salt thereof, wherein M is the metal and is defined according to the definitions provided herein for compounds of Formula I.

In some embodiments, the compound of Formula I is:

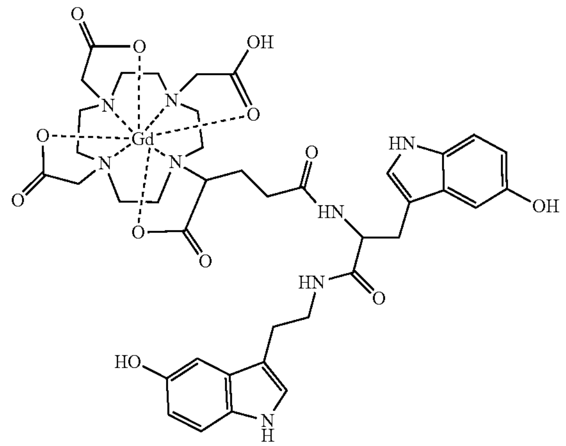

or a pharmaceutically acceptable salt thereof.

In some embodiments, the compound of Formula I is:

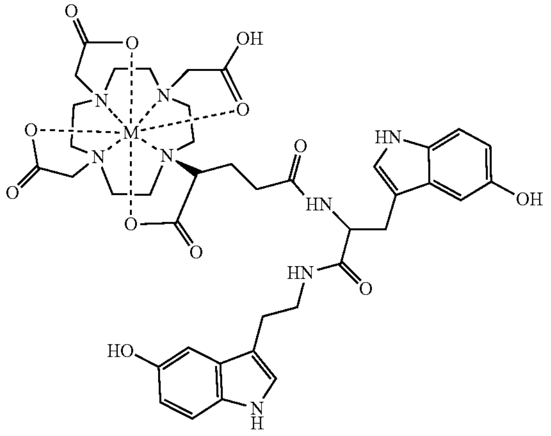

or a pharmaceutically acceptable salt thereof.

Synthesis

The synthesis of a representative compound of Formula I, mcMPO-Gd, is shown in Schemes 1A-1B, using the following general reaction conditions: (a) $NaNO_2$, NaBr, 0.75 M HBr, −15° C.; (b) $MgSO_4$, $H_2SO_4$, t-BuOH, rt, 45% for two steps; (c) $Boc_2O$, $K_2CO_3$, $THF/H_2O$ (¼), rt; (d) EDC.HCl, HOBt, DMF, rt, 82% for two steps; (e) TFA/DCM (½), 63%; f) $K_2CO_3$, $CH_3CN$, reflux, 78%; g) TFA/DCM, rt; h) $GdCl_3$, pH 5.5, rt, then 50° C. overnight; i) EDC·HCl, HOBt, $NEt_3$, DMSO, 25%.

Scheme 1A.

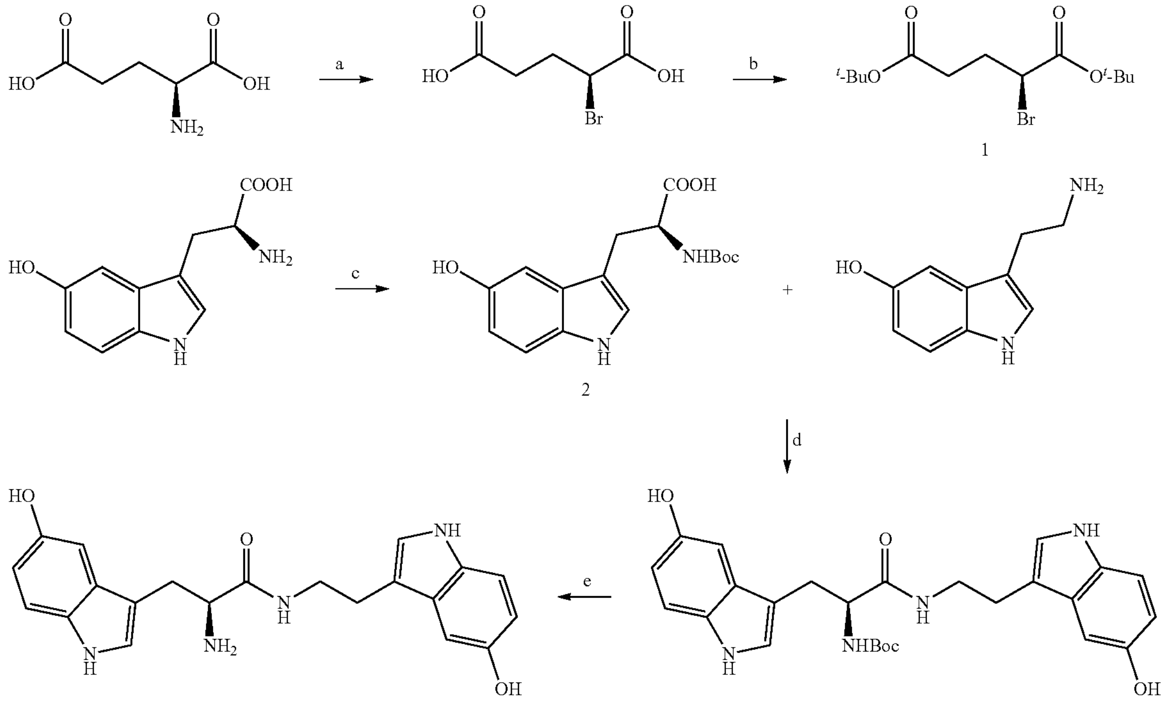

1 2 3 4

Scheme 1B.

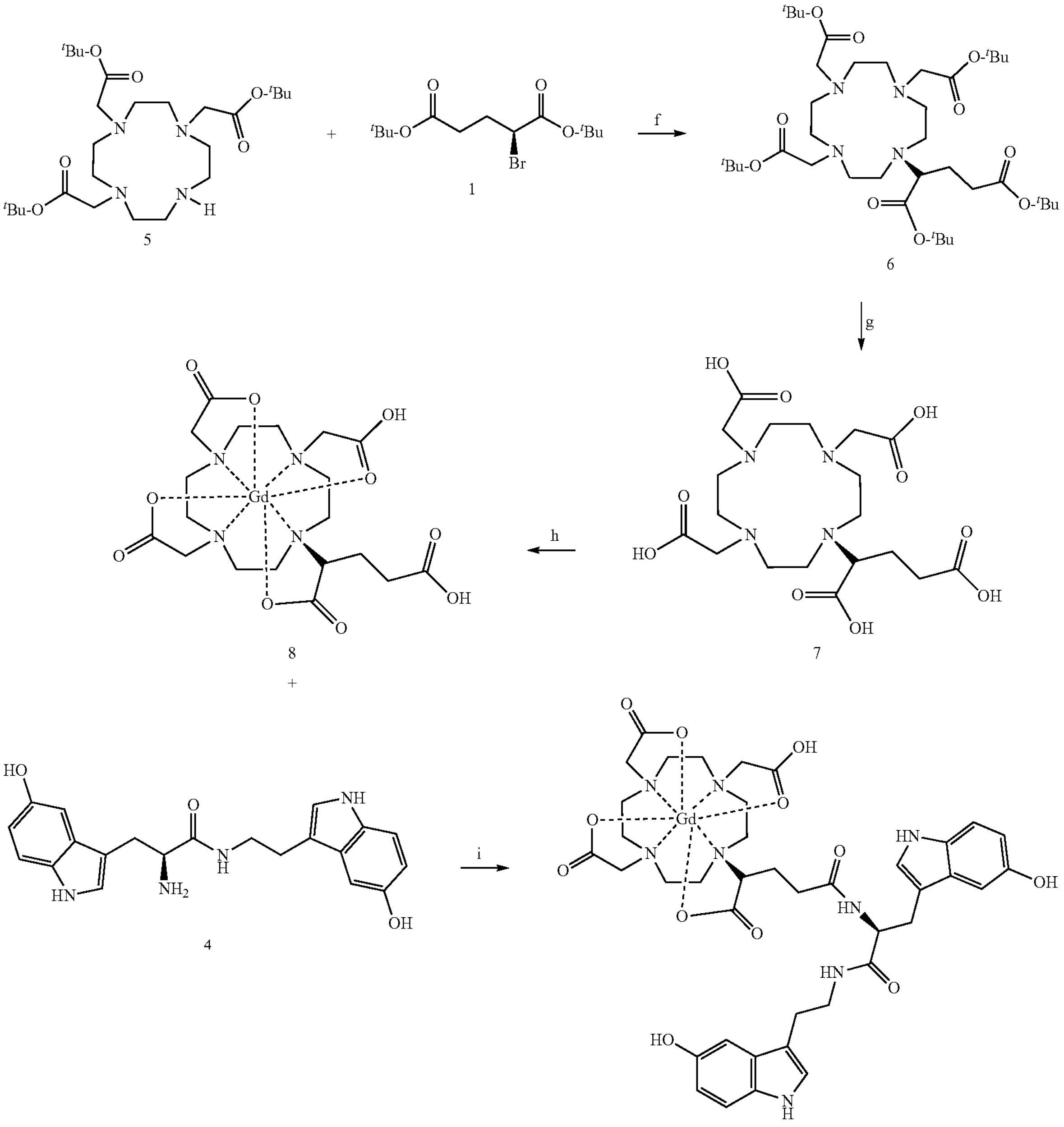

5 + 1 → 6 → 7 → 8 + 4 → mcMPO-Gd

Compound 1 was synthesized according to published procedures in two steps (see e.g., International Patent Application No.: WO 2005/122682; and Moumne et al, *J. Org. Chem.*, 2006, 71:3332-3334). Intermediate 4 was synthesized through three steps starting from Boc-protection of 5-hydroxytryptophan, followed by coupling with 5-hydroxyindole acetic acid using 1-ethyl-3-(3-dimethylamino-propyl)carbodiimide (EDC) to give compound 3, which underwent Boc deprotection to provide Intermediate 4. The synthesis of Intermediate 8 started from macrocyclic compound 5 and compound 1 under basic conditions to give compound 6. Compound 6 was hydrolyzed under acidic conditions followed by chelation with $GdCl_3$ (see e.g., Kielar et al, *J. Am. Chem. Soc.* 2010, 132:7836-7837) to provide Intermediate 8. Intermediate 8 was then coupled with Intermediate 4 using EDC hydrochloride and hydroxybenzotriazole (HOBt) to provide the final product mcMPO-Gd. The structure of mcMPO-Gd was confirmed by high resolution mass spectrometry.

DOTA was selected as a representative chelating group due to its thermodynamic and kinetic stability compared to the linear chelates and other macrocyclic-based chelates (see e.g., Port et al, *Biometals,* 2008, 21:469-490). Two 5-hydroxyindole units were selected as MPO activatable moieties to enhance retention, as previously reported (see e.g., Rodriguez et al, *J. Am. Chem. Soc.* 2010, 132:168-177). As shown in FIG. 1, mcMPO-Gd differs from previously reported compound "MPO-Gd" in that the two 5-hydroxyindole moieties (5-hydroxytryptophan and 5-hydroxyindoleacetic acid) are offset and away from the chelate to the side via a short linker rather than on opposite sides of the chelate. The two amide bonds formed via the linker of mcMPO-Gd increased rigidity of the agent compared to MPO-Gd. Without being bound by theory, it was hypothesized that the rigid structure of mcMPO-Gd would result in a more effective agent compared to MPO-Gd, by 1) decreasing segmental motion to increase relaxivity and 2) creating better protein-binding efficiency to improve sensitivity to MPO activity.

The reactions for preparing compounds and salts described herein can be carried out in suitable solvents which can be readily selected by one of skill in the art of organic synthesis. Suitable solvents can be substantially non-reactive with the starting materials (reactants), the intermediates, or products at the temperatures at which the reactions are carried out, (e.g., temperatures which can range from the solvent's freezing temperature to the solvent's boiling temperature). A given reaction can be carried out in one solvent or a mixture of more than one solvent. Depending on the particular reaction step, suitable solvents for a particular reaction step can be selected by the skilled artisan. Preparation of compounds and salts described herein can involve the protection and deprotection of various chemical groups. The need for protection and deprotection, and the selection of appropriate protecting groups, can be readily determined by one skilled in the art. The chemistry of protecting groups can be found, for example, in T. W. Greene and P. G. M. Wuts, *Protective Groups in Organic Synthesis*, 3rd Ed., Wiley & Sons, Inc., New York (1999).

Reactions can be monitored according to any suitable method known in the art. For example, product formation can be monitored by spectroscopic means, such as nuclear magnetic resonance spectroscopy (e.g., $^1H$ or $^{13}C$), infrared spectroscopy, spectrophotometry (e.g., UV-visible), mass spectrometry, or by chromatographic methods such as high performance liquid chromatography (HPLC), liquid chromatography-mass spectroscopy (LCMS), or thin layer chromatography (TLC). Compounds can be purified by those skilled in the art by a variety of methods, including high performance liquid chromatography (HPLC) and normal phase silica chromatography.

At various places in the present specification, divalent linking substituents are described. It is specifically intended that each divalent linking substituent include both the forward and backward forms of the linking substituent. For example, $—NR(CR'R'')_n$- includes both $—NR(CR'R'')_n—$ and $—(CR'R'')_nNR—$; and $NHC(O)L^2$ includes both $—NHC(O)L^2$- and -$L^2C(O)NH—$. Where the structure clearly requires a linking group, the Markush variables listed for that group are understood to be linking groups.

The term "n-membered" where n is an integer typically describes the number of ring-forming atoms in a moiety where the number of ring-forming atoms is n. For example, phenyl is an example of a 6-membered aryl ring, pyrazolyl is an example of a 5-membered heteroaryl ring, and pyridyl is an example of a 6-membered heteroaryl ring.

Throughout the definitions, the term "$C_{n-m}$" indicates a range which includes the endpoints, wherein n and m are integers and indicate the number of carbons. Examples include $C_{1-4}$, $C_{1-6}$, and the like.

As used herein, the term "$C_{n-m}$ alkyl" refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl, and the like. In some embodiments, the alkyl group contains from 1 to 6 carbon atoms, from 1 to 4 carbon atoms, from 1 to 3 carbon atoms, or 1 to 2 carbon atoms.

As used herein, the term "$C_{n-m}$ alkylene" refers to a divalent alkyl linking group having n to m carbons (e.g., $—CH_2—$, ethan-1,2-diyl, propan-1,3-diyl, and the like). In some embodiments, the alkylene moiety contains 2 to 6, 2 to 4, 2 to 3, 1 to 6, 1 to 4, or 1 to 2 carbon atoms.

As used herein, the term "$C_{n-m}$ alkenylene" refers to a divalent alkene linking group having n to m carbons. In some embodiments, the alkenylene moiety contains 2 to 6, 2 to 4, or 2 to 3, carbon atoms.

As used herein, the term "$C_{n-m}$ alkyleneoxy" refers to a divalent alkoxy linking group having n to m carbons (i.e., "$—O—C_{n-m}$ alkylene-"). In some embodiments, the alkyleneoxy moiety contains 1 to 2 to 6, 2 to 4, 2 to 3, 1 to 6, 1 to 4, or 1 to 2 carbon atoms.

As used herein, the term "aryl" refers to an aromatic hydrocarbon group, which may be monocyclic or polycyclic (e.g., having 2, 3 or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In some embodiments, aryl groups have from 6 to about 20 carbon atoms, from 6 to about 15 carbon atoms, or from 6 to about 10 carbon atoms. In some embodiments, the aryl group is phenyl.

As used herein, "heteroaryl" refers to a monocyclic or polycyclic aromatic heterocycle having at least one heteroatom ring member selected from sulfur, oxygen, and nitrogen. In some embodiments, the heteroaryl ring has 1, 2, 3, or 4 heteroatom ring members independently selected from nitrogen, sulfur and oxygen. In some embodiments, any ring-forming N in a heteroaryl moiety can be an N-oxide. In some embodiments, the heteroaryl has 5-20 ring atoms and 1, 2, 3 or 4 heteroatom ring members independently selected from nitrogen, sulfur and oxygen. In some embodiments, the heteroaryl has 5-16 ring atoms and 1, 2, 3 or 4 heteroatom ring members independently selected from nitrogen, sulfur and oxygen. In some embodiments, the heteroaryl is a bicyclic heteroaryl (e.g., a fused bicyclic heteroaryl) having 5-16 ring atoms and 1, 2, 3 or 4 heteroatom ring members independently selected from nitrogen, sulfur and oxygen. In some embodiments, the heteroaryl is a tricyclic heteroaryl (e.g., a fused tricyclic heteroaryl) having 5-16 ring atoms and 1, 2, 3 or 4 heteroatom ring members independently selected from nitrogen, sulfur and oxygen.

As used herein, "heterocycloalkyl" refers to non-aromatic monocyclic or polycyclic heterocycles having one or more ring-forming heteroatoms selected from O, N, or S. Ring-forming carbon atoms and heteroatoms of a heterocycloalkyl group can be optionally substituted by oxo or sulfido (e.g., C(O), S(O), C(S), or $S(O)_2$, etc.). The heterocycloalkyl group can be attached through a ring-forming carbon atom or a ring-forming heteroatom. In some embodiments, the heterocycloalkyl group contains 0 to 3 double bonds or 0 to 2 double bonds. A heterocycloalkyl group containing a fused aromatic ring can be attached through any ring-forming atom including a ring-forming atom of the fused aromatic ring. In some embodiments, the heterocycloalkyl has 4-20, 4-16, 8-20, or 8-16 ring atoms with 1 or 2 heteroatoms independently selected from nitrogen, oxygen, or sulfur, and optionally having one or more oxidized ring members. In some embodiments, the heterocycloalkyl is a bicyclic heterocycloalkyl (e.g., a fused bicyclic heterocycloalkyl) having 4-16 ring atoms and 1, 2, 3 or 4 heteroatom ring members independently selected from nitrogen, sulfur and oxygen, and optionally having one or more oxidized ring members. In some embodiments, the heterocycloalkyl is a tricyclic heterocycloalkyl (e.g., a fused tricyclic heterocycloalkyl) having 4-16 ring atoms and 1, 2, 3 or 4 heteroatom ring members independently selected from nitrogen, sulfur and oxygen, and optionally having one or more oxidized ring members.

At certain places, the definitions or embodiments refer to specific rings (e.g., an azetidine ring, a pyridine ring, etc.). Unless otherwise indicated, these rings can be attached to any ring member provided that the valency of the atom is not exceeded. For example, a pyridinyl ring may be attached at any position of the ring, whereas a pyridin-3-yl ring is attached at the 3-position.

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

Compounds provided herein also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Example prototropic tautomers include ketone-enol pairs, amide-imidic acid pairs, lactam-lactim pairs, enamine-imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

Unless specifically defined, compounds provided herein can also include all isotopes of atoms occurring in the intermediates or final compounds. Isotopes include those atoms having the same atomic number but different mass numbers. Unless otherwise stated, when an atom is designated as an isotope or radioisotope, the atom is understood to comprise the isotope or radioisotope in an amount at least greater than the natural abundance of the isotope or radioisotope. For example, when an atom is designated as "D" or "deuterium", the position is understood to have deuterium at an abundance that is at least 3000 times greater than the natural abundance of deuterium, which is 0.015% (i.e., at least 45% incorporation of deuterium).

All compounds, and pharmaceutically acceptable salts thereof, can be found together with other substances such as water and solvents (e.g. hydrates and solvates) or can be isolated.

In some embodiments, preparation of compounds can involve the addition of acids or bases to affect, for example, catalysis of a desired reaction or formation of salt forms such as acid addition salts.

Example acids can be inorganic or organic acids and include, but are not limited to, strong and weak acids. Some example acids include hydrochloric acid, hydrobromic acid, sulfuric acid, phosphoric acid, p-toluenesulfonic acid, 4-nitrobenzoic acid, methanesulfonic acid, benzenesulfonic acid, trifluoroacetic acid, and nitric acid. Some weak acids include, but are not limited to acetic acid, propionic acid, butanoic acid, benzoic acid, tartaric acid, pentanoic acid, hexanoic acid, heptanoic acid, octanoic acid, nonanoic acid, and decanoic acid.

Example bases include lithium hydroxide, sodium hydroxide, potassium hydroxide, lithium carbonate, sodium carbonate, potassium carbonate, and sodium bicarbonate. Some example strong bases include, but are not limited to, hydroxide, alkoxides, metal amides, metal hydrides, metal dialkylamides and arylamines, wherein; alkoxides include lithium, sodium and potassium salts of methyl, ethyl and t-butyl oxides; metal amides include sodium amide, potassium amide and lithium amide; metal hydrides include sodium hydride, potassium hydride and lithium hydride; and metal dialkylamides include lithium, sodium, and potassium salts of methyl, ethyl, n-propyl, iso-propyl, n-butyl, tert-butyl, trimethylsilyl and cyclohexyl substituted amides.

In some embodiments, the compounds provided herein, or salts thereof, are substantially isolated. By "substantially isolated" is meant that the compound is at least partially or substantially separated from the environment in which it was formed or detected. Partial separation can include, for example, a composition enriched in the compounds provided herein. Substantial separation can include compositions containing at least about 50%, at least about 60%, at least about 70%, at least about 80%, at least about 90%, at least about 95%, at least about 97%, or at least about 99% by weight of the compounds provided herein, or salt thereof. Methods for isolating compounds and their salts are routine in the art.

As used herein, the term "room temperature" or "rt" is understood in the art, and refers generally to a temperature, e.g., a reaction temperature, that is about the temperature of the room in which the reaction is carried out, for example, a temperature from about 20° C. to about 30° C.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The present application also includes pharmaceutically acceptable salts of the compounds described herein. As used herein, "pharmaceutically acceptable salts" refers to derivatives of the disclosed compounds wherein the parent compound is modified by converting an existing acid or base moiety to its salt form. Examples of pharmaceutically acceptable salts include, but are not limited to, mineral or organic acid salts of basic residues such as amines; alkali or organic salts of acidic residues such as carboxylic acids; and the like. The pharmaceutically acceptable salts of the present application include the conventional non-toxic salts of the parent compound formed, for example, from non-toxic inorganic or organic acids. The pharmaceutically acceptable salts of the present application can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, non-aqueous media like ether, ethyl acetate, alcohols (e.g., methanol, ethanol, iso-propanol, or butanol) or acetonitrile (MeCN) are preferred. Lists of suitable salts are found in *Remington's Pharmaceutical Sciences,* 17th ed., Mack Publishing Company, Easton, Pa., 1985, p. 1418 and *Journal of Pharmaceutical Science,* 66, 2 (1977). Conventional methods for preparing salt forms are described, for example, in *Handbook of Pharmaceutical Salts: Properties, Selection, and Use*, Wiley-VCH, 2002.

Methods of Use

The present application further provides a method of imaging a cell or tissue sample. As used herein, the term "subject," refers to any animal, including mammals. For example, mice, rats, other rodents, rabbits, dogs, cats, swine, cattle, sheep, horses, primates, and humans. In some embodiments, the subject is a human.

In some embodiments, the method comprises:

i) administering to the subject a compound provided herein (e.g., a compound of any of Formulas I-Vc, or a pharmaceutically acceptable salt thereof);

ii) waiting a time sufficient to allow the compound to accumulate at the cell or tissue sample; and iii) imaging the cell or tissue sample with an imaging technique. In some embodiments, the method further comprises imaging the cell or tissue sample prior to step i). In some embodiments, the method is an in vitro method. In some embodiments, the method is an in vivo method.

The present application further provides a method of diagnosing a disease or disorder associated with abnormal myeloperoxidase (MPO) activity in a subject. In some embodiments, the method comprises:

i) administering to the subject a compound provided herein (e.g., a compound of any of Formulas I-Vc, or a pharmaceutically acceptable salt thereof);

ii) waiting a time sufficient to allow the compound to accumulate at a cell or tissue site associated with the disease; and iii) imaging the cell or tissue with an imaging technique. In some embodiments, the method further comprises imaging the subject prior to step i). In some embodiments, the method is an in vitro method. In some embodiments, the method is an in vivo method.

In some embodiments, the time sufficient is from about 5 minutes to about 6 hours, for example, from about 5 minutes to about 6 hours, about 5 minutes to about 4 hours, about 5 minutes to about 2 hours, about 5 minutes to about 1 hour, about 5 minutes to about 30 minutes, about 30 minutes to about 6 hours, about 30 minutes to about 4 hours, about 30 minutes to about 2 hours, about 30 minutes to about 1 hour, about 1 hour to about 6 hours, about 1 hour to about 4 hours, about 1 hour to about 2 hours, about 2 hours to about 6 hours, about 2 hours to about 4 hours, or from about 4 hours to about 6 hours.

The present application further provides a method of imaging myeloperoxidase (MPO) activity in a cell. In some embodiments, the method comprises:

i) contacting the cell with a compound provided herein (e.g., a compound of any of Formulas I-Vc, or a pharmaceutically acceptable salt thereof); and ii) imaging the cell with an imaging technique.

The present application further provides a method of imaging myeloperoxidase (MPO) activity in a tissue sample. In some embodiments, the method comprises:

i) contacting the tissue sample with a compound provided herein (e.g., a compound of any of Formulas I-Vc, or a pharmaceutically acceptable salt thereof); and ii) imaging the tissue sample with an imaging technique.

The present application further provides a method of detecting myeloperoxidase (MPO) activity in a cell or tissue sample. In some embodiments, the method comprises:

i) contacting the cell or tissue sample with a compound provided herein (e.g., a compound of any of Formulas I-Vc, or a pharmaceutically acceptable salt thereof); and ii) imaging the cell or tissue sample with an imaging technique.

The present application further provides a method of detecting myeloperoxidase activity in a subject. In some embodiments, the method comprises:

i) administering to the subject a compound provided herein (e.g., a compound of any of Formulas I-Vc, or a pharmaceutically acceptable salt thereof); and ii) imaging the subject with an imaging technique.

The present application further provides a method of monitoring treatment of a disease or disorder associated with abnormal myeloperoxidase (MPO) activity in a subject, the method comprising:

i) administering to the subject a compound provided herein (e.g., a compound of any of Formulas I-Vc, or a pharmaceutically acceptable salt thereof);

ii) imaging the subject with an imaging technique;

iii) administering to the subject a therapeutically effective amount of a therapeutic compound to treat the disease or disorder;

iv) imaging the cell or tissue in the subject with an imaging technique; and v) comparing the image of step i) and the image of step iv).

In some embodiments, the method further comprises administering to the subject a compound provided herein (e.g., a compound of any of Formulas I-Vc, or a pharmaceutically acceptable salt thereof) after the administering of step iii) and prior to the imaging of step iv). In some embodiment, the therapeutic compound is useful in the treatment of a disease or disorder associated with abnormal myeloperoxidase (MPO) activity. In some embodiments, the therapeutic compound is a therapeutic compound provided herein.

In some embodiments, the imaging technique is selected from the group consisting of magnetic resonance imaging and nuclear imaging. In some embodiments the imaging technique is magnetic resonance imaging. In some embodiments the imaging technique is nuclear imaging.

In some embodiments, the compound of Formula I is:

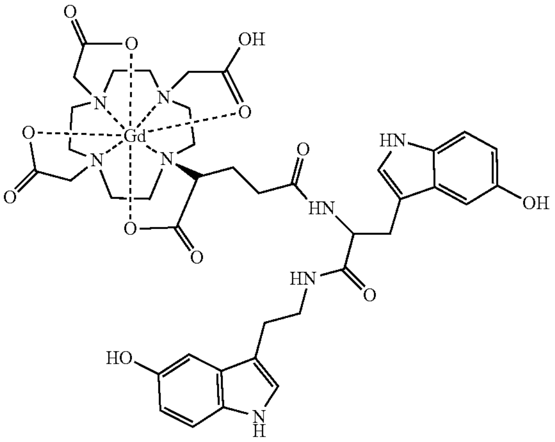

or a pharmaceutically acceptable salt thereof, and the imaging technique is selected from the group consisting of magnetic resonance imaging and nuclear imaging. In some embodiments the imaging technique is magnetic resonance imaging. In some embodiments the imaging technique is nuclear imaging.

In some embodiments, the disease or disorder associated with abnormal myeloperoxidase activity is selected from the group consisting of nonalcoholic steatohepatitis (NASH), cancer, a rheumatic disease, an infectious disease, a disease of the central nervous system, a cardiovascular disorder, an autoimmune disorder, and inflammation associated with one or more of a cancer, a rheumatic disease, an infectious disease, a disease of the central nervous system, a cardiovascular disorder, and an autoimmune disorder. In some embodiments, the disease or disorder associated with abnormal myeloperoxidase activity is selected from the group consisting of cancer, a rheumatic disease, an infectious disease, a disease of the central nervous system, a cardiovascular disorder, and an autoimmune disorder. In some embodiments, the disease or disorder associated with abnormal myeloperoxidase activity is selected from the group consisting of inflammation associated with one or more of a cancer, a rheumatic disease, an infectious disease, a disease of the central nervous system, a cardiovascular disorder, and an autoimmune disorder.

In some embodiments, the disease or disorder associated with abnormal myeloperoxidase activity is nonalcoholic steatohepatitis (NASH).

In some embodiments, the disease or disorder associated with abnormal myeloperoxidase activity is a cancer. In some embodiments, the cancer comprises a solid tumor. In some embodiments, the cancer is a solid tumor. In some embodiments, the cancer is selected from the group consisting of bladder cancer, breast cancer, carcinoma, cervical cancer, colorectal cancer, endometrial cancer, glioma, cancer of the head and neck, liver cancer, lung cancer, melanoma, ovarian cancer, pancreatic cancer, prostate cancer, renal cancer, skin cancer, stomach cancer, testicular cancer, leukemia, and thyroid cancer. In some embodiments, the cancer is a solid tumor associated with one or more of bladder cancer, breast cancer, carcinoma, cervical cancer, colorectal cancer, endometrial cancer, glioma, cancer of the head and neck, liver cancer, lung cancer, melanoma, ovarian cancer, pancreatic cancer, prostate cancer, renal cancer, skin cancer, stomach cancer, testicular cancer, thyroid cancer, or any combination thereof. In some embodiments, the disease or disorder associated with abnormal myeloperoxidase activity is inflammation associated with one or more cancers selected from the group consisting of bladder cancer, breast cancer, carcinoma, cervical cancer, colorectal cancer, endometrial cancer, glioma, cancer of the head and neck, liver cancer, lung cancer, melanoma, ovarian cancer, pancreatic cancer, prostate cancer, renal cancer, skin cancer, stomach cancer, testicular cancer, thyroid cancer, leukemia, or any combination thereof.

In some embodiments, the disease or disorder associated with abnormal myeloperoxidase activity is a disease of the central nervous system. In some embodiments, the disease of the central nervous system is selected from the group consisting of Alzheimer's disease, stroke, epilepsy, Parkinson's disease, and inflammation associated with Alzheimer's disease, stroke, epilepsy, and Parkinson's disease. In some embodiments, the disease of the central nervous system is selected from the group consisting of Alzheimer's disease, stroke, epilepsy, and Parkinson's disease. In some embodiments, the disease of the central nervous system is inflammation associated with one or more of Alzheimer's disease, and stroke, epilepsy, and Parkinson's disease.

In some embodiments, the disease or disorder associated with abnormal myeloperoxidase activity is a cardiovascular disorder. In some embodiments, the cardiovascular disorder is selected from the group consisting of atherosclerosis, myocardial infarction, atrial fibrillation, vasculitis, and inflammation associated with one or more of atherosclerosis, myocardial infarction, atrial fibrillation, and vasculitis. In some embodiments, the cardiovascular disorder is selected from the group consisting of atherosclerosis, myocardial infarction, atrial fibrillation, and vasculitis. In some embodiments, the cardiovascular disorder is inflammation associated with one or more of atherosclerosis, myocardial infarction, atrial fibrillation, and vasculitis.

In some embodiments, the disease or disorder associated with abnormal myeloperoxidase activity is an autoimmune disorder. In some embodiments, the autoimmune disorder is selected from the group consisting of multiple sclerosis, meningitis, encephalitis, and inflammation associated with one or more of multiple sclerosis, meningitis, and encephalitis. In some embodiments, the autoimmune disorder is inflammation associated with one or more of multiple sclerosis, meningitis, and encephalitis.

In some embodiments, the disease or disorder associated with abnormal myeloperoxidase activity is a rheumatic disease. In some embodiments, the rheumatic disease is selected from the group consisting of rheumatoid arthritis, osteoarthritis, and inflammatory arthritis. In some embodiments, the rheumatic disease is inflammatory arthritis. In some embodiments, the inflammatory arthritis is selected from the group consisting of gout and calcium pyrophosphate deposition disease (CPPD). In some embodiments, the disease or disorder associated with abnormal myeloperoxidase activity is inflammation associated with one or more of rheumatoid arthritis, osteoarthritis, and inflammatory arthritis.

In some embodiments, the disease or disorder associated with abnormal myeloperoxidase activity is an infectious disease. In some embodiments, the infectious disease is a fungal disease or a bacterial disease. In some embodiments, the fungal disease is a disease associated with *C. albicans*. In some embodiments, the infectious disease comprises a yeast infection. In some embodiments, the yeast infection is an infection associated with *C. tropicalis*. In some embodiments, the disease or disorder associated with abnormal myeloperoxidase activity is inflammation associated with an infectious disease or a bacterial disease.

As used herein, the phrase "therapeutically effective amount" refers to the amount of active compound or pharmaceutical agent that elicits the biological or medicinal response that is being sought in a tissue, system, animal, individual or human by a researcher, veterinarian, medical doctor or other clinician. In some embodiments, the dosage of the compound, or a pharmaceutically acceptable salt thereof, administered to a subject or individual is about 1 mg to about 2 g, about 1 mg to about 1000 mg, about 1 mg to about 500 mg, about 1 mg to about 100 mg, about 1 mg to 50 mg, or about 50 mg to about 500 mg.

As used herein, the term "treating" or "treatment" refers to one or more of (1) inhibiting the disease; for example, inhibiting a disease, condition or disorder in an individual who is experiencing or displaying the pathology or symptomatology of the disease, condition or disorder (i.e., arresting further development of the pathology and/or symptomatology); and (2) ameliorating the disease; for example, ameliorating a disease, condition or disorder in an individual who is experiencing or displaying the pathology or symptomatology of the disease, condition or disorder (i.e., reversing the pathology and/or symptomatology) such as decreasing the severity of disease or reducing or alleviating one or more symptoms of the disease.

Combination Therapies

One or more additional therapeutic agents such as, for example, anti-inflammatory agents, steroids, immunosuppressants, chemotherapeutic agents, or other agents such as therapeutic antibodies, can be used in combination with the compounds and salts of the present application for treatment of the diseases provided herein.

Example antibodies for use in combination therapy include but are not limited to trastuzumab (e.g. anti-HER2), ranibizumab (e.g. anti-VEGF-A), bevacizumab (e.g. anti-VEGF), panitumumab (e.g. anti-EGFR), cetuximab (e.g. anti-EGFR), rituxan (anti-CD20) and antibodies directed to c-MET.

Example steroids include corticosteroids such as cortisone, dexamethasone, hydrocortisone, methylprednisolone, prednisolone, and prednisone.

Example anti-inflammatory compounds include aspirin, choline salicylates, celecoxib, diclofenac potassium, diclofenac sodium, diclofenac sodium with misoprostol, diflunisal, etodolac, fenoprofen, flurbiprofen, ibuprofen, ketoprofen, meclofenamate sodium, mefenamic acid, nabumetone, naproxen, naproxen sodium, oxaprozin, piroxican, rofecoxib, salsalate, sodium salicylate, sulindac, tolmetin sodium, and valdecoxib.

Example immunosuppressants include azathioprine, chlorambucil, cyclophosphamide, cyclosporine, daclizumab, infliximab, methotrexate, and tacrolimus.

One or more of the following agents may be used in combination with the compounds provided herein and are presented as a non-limiting list: a cytostatic agent, cisplatin, doxorubicin, taxol, etoposide, irinotecan, topotecan, paclitaxel, docetaxel, epothilones, tamoxifen, 5-fluorouracil, methotrexate, temozolomide, cyclophosphamide, tipifarnib, gefitinib, erlotinib hydrochloride, antibodies to EGFR, imatinib mesylate, gemcitabine, uracil mustard, chlormethine, ifosfamide, melphalan, chlorambucil, pipobroman, triethylenemelamine, triethylenethiophosphoramine, busulfan, carmustine, lomustine, streptozocin, dacarbazine, floxuridine, cytarabine, 6-mercaptopurine, 6-thioguanine, fludarabine phosphate, oxaliplatin, folinic acid, pentostatin, vinblastine, vincristine, vindesine, bleomycin, dactinomycin, daunorubicin, epirubicin, idarubicin, mithramycin, deoxycoformycin, mitomycin-C, L-asparaginase, teniposide, 17α-ethinylestradiol, diethylstilbestrol, testosterone, prednisone, fluoxymesterone, dromostanolone propionate, testolactone, megestrol acetate, methylprednisolone, methyltestosterone, prednisolone, triamcinolone, chlorotrianisene, hydroxyprogesterone, aminoglutethimide, estramustine, medroxyprogesteroneacetate, leuprolide, flutamide, toremifene, goserelin, carboplatin, hydroxyurea, amsacrine, procarbazine, mitotane, mitoxantrone, levamisole, vinorelbine, anastrazole, letrozole, capecitabine, reloxafine, hexamethylmelamine, bevacizumab, bexxar, velcade, zevalin, trisenox, xeloda, porfimer, erbitux, thiotepa, altretamine, trastuzumab, fulvestrant, exemestane, rituximab, alemtuzumab, clofarabine, cladribine, aphidicolin, sunitinib, dasatinib, tezacitabine, triapine, didox, trimidox, amidox, bendamustine, ofatumumab, and idelalisib.

In some embodiments, the additional therapeutic agent is useful for the treatment of multiple sclerosis. In some embodiments, the additional therapeutic agent is selected from the group consisting of interferon beta-1a, interferon beta-1b, peginterferon beta-1a, glatiramer acetate, teriflunomide, fingolimod, mitoxantrone, dimethyl fumarate, natalizumab, ozanimod, laquinimod, alemtuzumab, daclizumab, rituximab, ocrelizumab, and ofatumumab.

Pharmaceutical Formulations

When employed as pharmaceuticals, the compounds and salts provided herein can be administered in the form of pharmaceutical compositions. These compositions can be prepared as described herein or elsewhere, and can be administered by a variety of routes, depending upon whether local or systemic treatment is desired and upon the area to be treated. Administration may be topical (including transdermal, epidermal, ophthalmic and to mucous membranes including intranasal, vaginal and rectal delivery), pulmonary (e.g., by inhalation or insufflation of powders or aerosols, including by nebulizer; intratracheal or intranasal), oral or parenteral. Parenteral administration includes intravenous, intraarterial, subcutaneous, intraperitoneal intramuscular or injection or infusion; or intracranial, (e.g., intrathecal or intraventricular, administration). Parenteral administration can be in the form of a single bolus dose, or may be, for example, by a continuous perfusion pump. In some embodiments, the compounds provided herein are suitable for parenteral administration. In some embodiments, the compounds provided herein are suitable for intravenous administration. Pharmaceutical compositions and formulations for topical administration may include transdermal patches, ointments, lotions, creams, gels, drops, suppositories, sprays, liquids and powders. Conventional pharmaceutical carriers, aqueous, powder or oily bases, thickeners and the like may be necessary or desirable. In some embodiments, the pharmaceutical compositions provided herein are suitable for parenteral administration. In some embodiments, the compositions provided herein are suitable for intravenous administration.

Also provided are pharmaceutical compositions which contain, as the active ingredient, a compound provided herein (e.g., a compound of any of Formulas I-Vc, or a pharmaceutically acceptable salt thereof), in combination with one or more pharmaceutically acceptable carriers (excipients). In making the compositions provided herein, the active ingredient is typically mixed with an excipient, diluted by an excipient or enclosed within such a carrier in the form of, for example, a capsule, sachet, paper, or other container. When the excipient serves as a diluent, it can be a solid, semi-solid, or liquid material, which acts as a vehicle, carrier or medium for the active ingredient. Thus, the compositions can be in the form of tablets, pills, powders, lozenges, sachets, cachets, elixirs, suspensions, emulsions, solutions, syrups, aerosols (as a solid or in a liquid medium), ointments, soft and hard gelatin capsules, suppositories, sterile injectable solutions, and sterile packaged powders.

Some examples of suitable excipients include, without limitation, lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, water, syrup, and methyl cellulose. The formulations can additionally include, without limitation, lubricating agents such as talc, magnesium stearate, and mineral oil; wetting agents; emulsifying and suspending agents; preserving agents such as methyl- and propylhydroxy-benzoates; sweetening agents; flavoring agents, or combinations thereof.

The active compound can be effective over a wide dosage range and is generally administered in a pharmaceutically effective amount. It will be understood, however, that the amount of the compound actually administered will usually be determined by a physician, according to the relevant circumstances, including the chosen route of administration, the actual compound administered, the age, weight, and response of the individual subject, the severity of the subject's symptoms, and the like.

EXAMPLES

The invention will be described in greater detail by way of specific examples. The following examples are offered for illustrative purposes, and are not intended to limit the invention in any manner.

General Methods and Materials

All chemicals were obtained from Sigma Chemical Co. unless otherwise stated. 5-Hydroxy-L-tryptophan was obtained from Chem-Impex International Inc. (Wood Dale, IL). DO3A-tert-butyl ester was purchased from Macrocyclics Inc. (Plano, TX), and serotonin was purchased from TCI America (Portland, OR). Glucose oxidase was obtained from Affymetrix (Santa Clara, CA). Complete Freund's Adjuvant was purchased from Sigma-Aldrich. Myeloperoxidase was obtained from Lee Biosolutions (St. Louis, MO). High resolution mass spectrometry was performed with Thermo Scientific™ Q-Exactive Plus Ultimate 3000 HPLC flow injection analysis. $^1$H-NMR and $^{13}$C-NMR were conducted with Bruker Ascend™ 400. Liquid chromatography mass spectrometry was conducted with Waters 2545 Binary Gradient Module with 2777 Sample Manager.

All numeric data were first analyzed for normality using the Shapiro-Wilk normality test, with significance determined subsequently using the appropriate parametric or non-parametric test. Differences in ΔCNR between TS Apoe$^{-/-}$ and Mpo$^{-/-}$Apoe$^{-/-}$, or between TS Apoe$^{-/-}$ fed WD±AZM198 were assessed using the Kruskal-Wallis test followed by Dunn's multiple comparisons, Mann-Whitney rank sum test, or unpaired t-test where appropriate. All statistical analyses were performed with GraphPad Prism version 8.01 for Mac (GraphPad Software, La Jolla Calif. USA) and individual data shown with mean±SEM. P-values<0.05 were considered significant.

Example 1. Synthesis of di-tert-butyl (S)-2-bromopentanedioate (Compound 1)

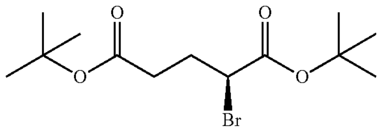 [SMILES: CC(C)(C)OC(=O)CC[C@H](Br)C(=O)OC(C)(C)C]

Compound 1 was prepared according to previously reported procedures (see e.g., International Patent Application No.: WO 2005/122682; and Moumne et al, *J. Org. Chem.* 2006, 71:3332-3334).

Step 1. (S)-2-bromopentanedioic acid

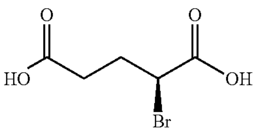

A solution of $NaNO_2$ (0.9 g, 13 mmol) in water (5 mL) was added dropwise to a mixture of L-glutamic acid (1.47 g, 10 mmol) and NaBr (3.8 g, 37 mmol) in 0.75M HBr (30 mL) at −15° C. over 30 min. The reaction was stirred for another 2 h at the same temperature, then conc. $H_2SO_4$ (1 mL) was slowly added to the solution followed by extraction with $Et_2O$ (30 mL×3). The combined organic phase was washed with brine, dried over $Na_2SO_4$ and evaporated to afford (S)-2-bromopentanedioic acid, which was used to the next step without further purification.

Step 2. di-tert-butyl (S)-2-bromopentanedioate (Compound 1)

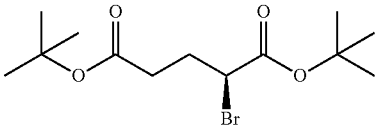 [SMILES: CC(C)(C)OC(=O)CC[C@H](Br)C(=O)OC(C)(C)C]

A mixture of $MgSO_4$ (5 g) and conc. $H_2SO_4$ (0.5 mL) in DCM (5 mL) was stirred at room temperature for 2 h, then the above compound and t-BuOH (3 g, 40 mmol) were added and stirred for another 20 h. The reaction was filtered to remove the salt and extracted with DCM (20 mL×3). The combined organic layer was washed with brine, dried over $Na_2SO_4$, evaporated and subjected to flash chromatography (5:1 of hexane:ethyl acetate) to give Compound 1 as a yellow oil (45% for two steps). $^1$H NMR (500 MHz, $CDCl_3$) δ 4.23 (dd, 1H), 2.51 (m, 2H), 2.29 (m, 2H), 1.48 (s, 9H), 1.43 (s, 9H); $^{13}$C NMR (125 MHz, $CDCl_3$) δ 172.7, 168.4, 82.8, 82.6, 46.8, 32.9, 30.0, 28.1, 27.9. LCMS found m/z (ES+): 325.3 (M+H).

Example 2. Synthesis of (S)-2-amino-3-(5-hydroxy-1H-indol-3-yl)-N-(2-(5-hydroxy-1H-indol-3-yl)ethyl)propanamide (Intermediate 4)

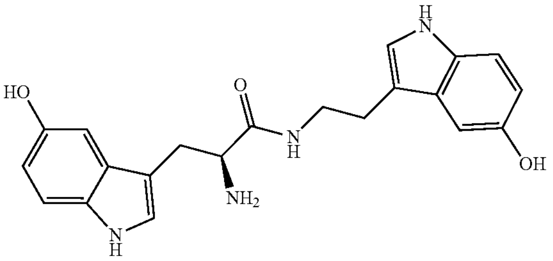 [SMILES: N[C@@H](Cc1c[nH]c2ccc(O)cc12)C(=O)NCCc1c[nH]c2ccc(O)cc12]

Step 1. (S)-2-((tert-butoxycarbonyl)amino)-3-(5-hydroxy-1H-indol-3-yl)propanoic acid (Compound 2)

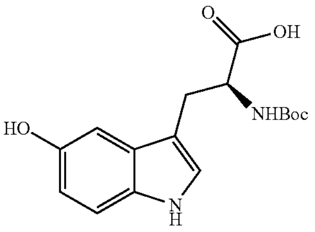 [SMILES: CC(C)(C)OC(=O)N[C@@H](Cc1c[nH]c2ccc(O)cc12)C(=O)O]

A solution of di-t-butyl dicarbonate (784 mg, 3.6 mmol) in THE (4 mL) was added to a solution of L-5-hydroxy-tryptophan (5-HTP, 660 mg, 3.0 mmol) and $K_2CO_3$ (880 mg, 6.4 mmol) in water (8 mL). The reaction was stirred at room temperature for 2 h and then neutralized to pH 2-3 by addition of 1M HCl. After evaporating to remove THF, the solution was extracted by ethyl acetate (20 mL×3), the organic phase washed by brine (10 mL×3), dried over anhydrous $Na_2CO_3$, and evaporated to afford Compound 2, which was used in the next step without further purification.

Step 2. tert-butyl (S)-(3-(5-hydroxy-1H-indol-3-yl)-1-((2-(5-hydroxy-1H-indol-3-yl)ethyl)amino)-1-oxopropan-2-yl)carbamate (Compound 3)

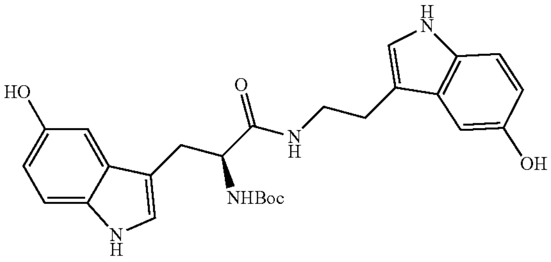 [SMILES: CC(C)(C)OC(=O)N[C@@H](Cc1c[nH]c2ccc(O)cc12)C(=O)NCCc1c[nH]c2ccc(O)cc12]

To a solution of Compound 2 (385 mg, 1.2 mmol) in DMF (5 mL), EDC·HCl (280 mg, 1.4 mmol) was added, followed by HOBt (216 mg, 1.4 mmol), and the resulting mixture was stirred for 10 min. Next, a solution of free-based serotonin (220 mg, 1.0 mmol), prepared in advance in DMF (4 mL), was added to the reaction mixture. The resulting mixture was then stirred for an additional 2 h. The reaction mixture was extracted with ethyl acetate (10 mL×3), the organic layer washed by brine (10 mL×3), dried over anhydrous $Na_2CO_3$, and evaporated. The residue was purified via flash chromatography (ethyl acetate as eluent) to afford Compound 3 as a white solid (390 mg) with a yield of 82%. $^1$H NMR (500 MHz, DMSO) δ 10.45 (s, 2H), 8.56 (s, 1H), 8.54 (s, 1H), 7.89 (t, 1H), 7.10 (d, 1H), 7.09 (d, 1H), 7.0 (m, 2H), 6.88 (d, 1H), 6.83 (d, 1H), 6.67 (d, 1H), 6.57 (m, 2H), 4.12 (m, 1H), 3.26 (m, 2H), 2.96 (dd, 1H), 2.79 (dd, 1H), 2.66 (m, 2H), 1.32 (s, 9H); $^{13}$C NMR (125 MHz, DMSO) δ 171.8, 155.1, 150.15, 150.13, 130.8, 130.6, 128.1, 127.8, 123.9, 123.0, 111.6, 111.4, 111.2, 111.1, 110.7, 109.3, 102.5, 102.2, 77.9, 55.0, 40.1, 28.2, 28.0, 25.2; LCMS found m/z: 479.4 (M+H).

Step 3. (S)-2-amino-3-(5-hydroxy-1H-indol-3-yl)-N-(2-(5-hydroxy-1H-indol-3-yl)ethyl)propanamide (Intermediate 4)

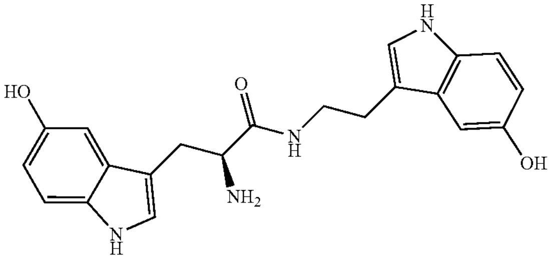 [SMILES: N[C@@H](Cc1c[nH]c2ccc(O)cc12)C(=O)NCCc1c[nH]c2ccc(O)cc12]

Compound 3 (300 mg) was added to a solution of 10% trifluoroacetic acid (TFA) in dichloromethane (DCM; 4 mL) and the reaction mixture was stirred for 5 h at room temperature. The reaction mixture was then evaporated under reduced pressure to remove the solvent and subjected to preparative HPLC to afford the desired Intermediate 4 (63% yield). $^1$H NMR (500 MHz, DMSO) δ 10.70 (d, 1H), 10.50 (d, 1H), 8.57 (m, 3H), 8.05 (m, 2H), 7.14 (dd, 2H), 7.09 (d, 1H), 6.98 (dd, 2H), 6.81 (d, 1H), 6.62 (dd, 2H), 3.87 (dt, 1H), 3.34 (m, 2H), 3.10 (dd, 1H), 2.98 (dd, 1H), 2.68 (m, 2H); $^{13}$C NMR (125 MHz, DMSO) δ 168.3, 150.4, 150.2, 130.9, 130.8, 127.8, 127.7, 125.2, 123.2, 111.7, 111.5, 111.2, 110.4, 106.0, 102.6, 102.1, 94.8, 52.8, 39.9, 27.6, 25.0. LCMS found m/z: 379.5 (M+H).

Example 3. Synthesis of di-tert-butyl (R)-2-(4,7,10-tris(2-(tert-butoxy)-2-oxoethyl)-1,4,7,10-tetraazacyclododecan-1-yl)pentanedioate (Compound 6)

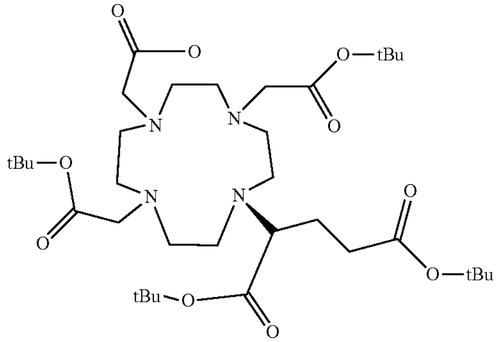

Potassium carbonate (210 mg, 1.5 mmol) was added to a solution of tri-tert-butyl 2,2',2"-(1,4,7,10-tetraazacyclododecane-1,4,7-triyl)triacetate ($DO_3A$-tBu-ester; Compound 5; 770 mg, 1.5 mmol) and Compound 1 (480 mg, 1.5 mmol) in acetonitrile (5 mL) and the reaction mixture was heated under reflux for 24 h. After removing the solvent under reduced pressure, the residue was dissolved in DCM and filtered. The flash chromatography column with gradient elution of DCM to 5% MeOH in DCM afford Compound 6 as a pale yellow solid with a yield of 78%. $^1$H NMR (500 MHz, DMSO) δ 3.48-1.90 (m, 27H), 1.40 (s, 45H)$^{13}$C NMR (125 MHz, DMSO) 174.8, 173.1, 173.0, 172.3, 82.5, 82.0, 81.9, 80.6, 60.0, 55.9 (2), 55.6, 52.7, 52.5, 48.6, 48.1, 47.3, 44.3, 32.8, 28.2, 28.0, 27.9. δ LCMS found m/z: 757.7 (M+H), 779.6 (M−H+Na).

Example 4. Synthesis of Compound 8

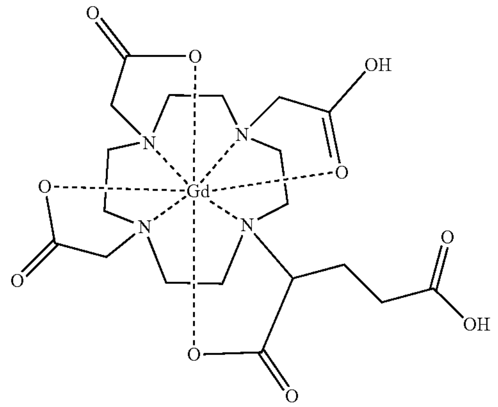

Compound 8 was prepared according to previously reported procedures (see e.g., Kielar et al, *J. Am. Chem. Soc.* 2010, 132:7836-7837), as describe below.

Step 1. (R)-2-(4,7,10-tris(carboxymethyl)-1,4,7,10-tetraazacyclododecan-1-yl)pentanedioic acid (Compound 7)

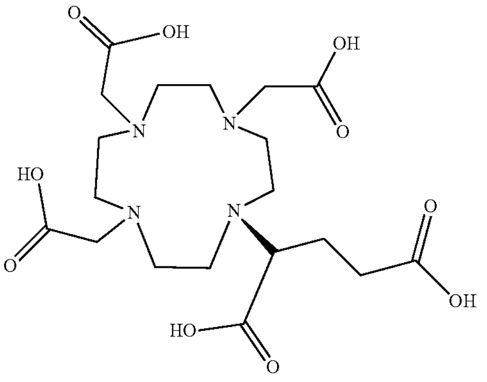

A solution of Compound 6 (250 mg, 0.33 mmol) in TFA/DCM (4 mL/2 mL) was stirred for 18 h. The solvent was removed under reduced pressure and the above process was repeated until the deprotection was complete to afford Compound 7 (monitored by LCMS, m/z (ES+): 477.4 (M+H)), which was used in the next step without further purification.

Step 2. Synthesis of Compound 8

$GdCl_3.6H_2O$ (135 mg, 0.36 mmol) was added to a solution of Compound 7 in water (10 mL). The pH of the solution was adjusted to 5.5-6.0 by adding 1 M of NaOH solution until the pH was steady. The reaction was heated at 50° C. overnight. After cooling, the reaction was adjusted to pH~10.9 by adding 1 M of HCl, stirred for 40 min, and then centrifuged. The supernatant was adjusted to pH 6.5 and lyophilized to afford Compound 8 as a white solid. LCMS found m/z (ES−): 630.2 (M), 652.1 (M−H+Na).

Example 5. Synthesis of mcMPO-Gd

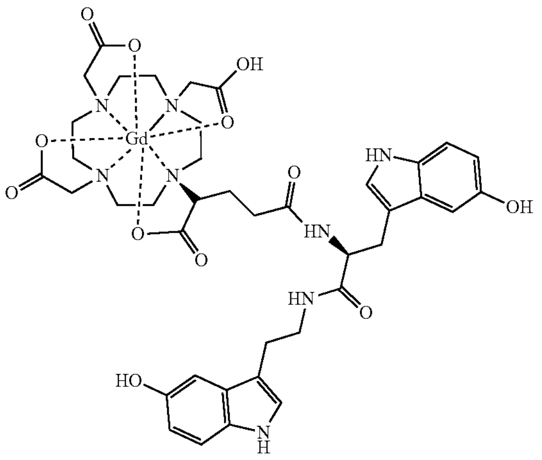

To a solution of Compound 8 (125 mg, 0.2 mmol) and triethylamine (56 μL, 0.4 mmol) in DMSO (3 mL) was added EDC·HCl (57 mg, 0.3 mmol) and HOBt (40 mg, 0.3 mmol). After 20 min, a solution of intermediate 4 (76 mg, 0.2 mmol) in DMSO was added to the above reaction. The reaction mixture was stirred for 1 h at room temperature and then subjected to preparative HPLC to give the desired mcMPO-Gd (25%) as a white powder. LCMS found m/z (ES+): 992.5 (M+H); HRMS: 992.2795 (M+H, cal. $C_{40}H_{49}GdN_8O_{12}$, 992.2793)

Example 6. Stability of mcMPO-Gd: Transmetallation with $Zn^{2+}$

The kinetic stability of mcMPO-Gd in the presence of $Zn^{2+}$ was compared with the kinetic stability of other agents, as $Zn^{2+}$ is a major competing ion for gadolinium and is present at high concentration in blood (see e.g., Rodriguez et al, *J. Am. Chem. Soc.,* 2010, 132:168-177; and Laurent et al, *Invest. Radiol.,* 2001, 36:115-122).

mcMPO-Gd or MPO-Gd (1 mM) was incubated with $ZnCl_2$ (2.5 mM) in PBS at 40° C., and the relaxation rates (R1) were measured for 95 h using an inversion-recovery pulse sequence on the Bruker Minispec (Bruker Analytics, North Billerica, MA) at 0.47 T (20 MHz) at 40° C. The stability of mcMPO-Gd was evaluated by kinetic index ($R1_{(t)}/R1_{(t=0)}=0.8$) and thermodynamic index ($R1_{(72\ h)}/R1_{(t=0)}$) and compared with MPO-Gd (see e.g., Rodriguez et al, *J. Am. Chem. Soc.,* 2010, 132:168-177) and BMA-Gd-DTPA (see e.g., Moumne et al, *J. Org. Chem.,* 2006, 71:3332-3334).

Transmetallation between $Zn^{2+}$ and $Gd^{3+}$ will result in relaxation change due to formation of $GdPO_4$ precipitate. T1 relaxation time was measured as previously described at different time points (see e.g., Rodriguez et al, *J. Am. Chem. Soc.,* 2010, 132:168-177). As shown in Table 1, there was no T1 change over 95 h for mcMPO-Gd and the long-term index, defined as $R1_{(t)}/R1_{(t=0)}$, was >0.97 (t=72-95 h), with a ratio index >5,000 min. This long-term index is substantially higher than that of MPO-Gd (0.76) and BMA-Gd-DTPA (0.09) (see e.g., Laurent et al, *Invest. Radiol.,* 2001, 36:115-122) indicating high stability of mcMPO-Gd, consistent with a previous report on the kinetic stability of the macrocyclic GBCAs (see e.g., Laurent et al, *Contrast Media Mol. Imaging* 2006, 1:128-137).

TABLE 1

| | $R1_{(t=72\ h)}/R1_{(t=0)}$ | t (min) for $R1_{(t)}/R1_{(t=0)}$ = 0.8 |
|---|---|---|
| mcMPO—Gd | >0.97 | >5000 |
| MPO—Gd | 0.76 | 2866 |
| BMA—DTPA—Gd | 0.09 | 50-60 |

Example 7. Relaxivity of mcMPO-Gd

Figures 2A, 2B:
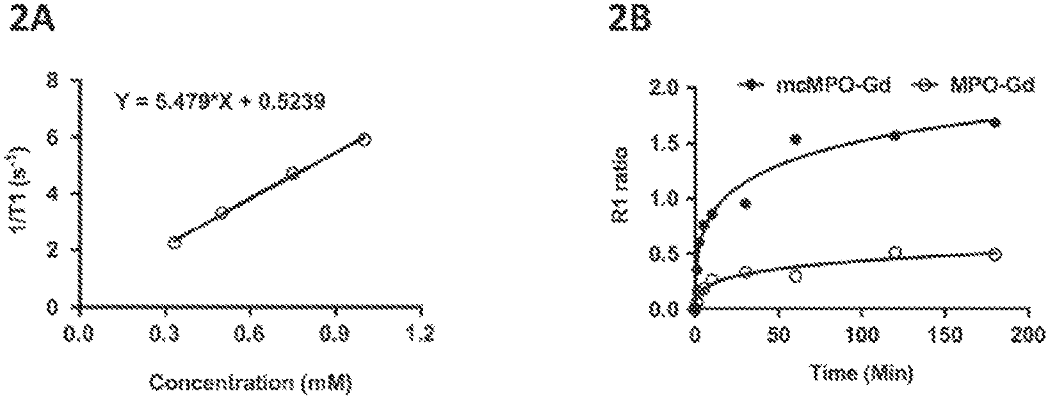
FIG. 2A shows T1 relaxation rates of mcMPO-Gd measured at 0.33 mM, 0.5 mM, 0.75 mM and 1 mM at 0.47 T and 40° C. in PBS. The relaxivity was calculated from the 1/T1 values versus mcMPO-Gd concentration data ($R^2$=0.996, n=3).
FIG. 2B shows dynamic R1 ratios of mcMPO-Gd and MPO-Gd after activation by MPO. mcMPO-Gd demonstrated faster activation compared with MPO-Gd when incubated with MPO, GOX, and glucose over 180 min at 40° C.

The relaxivity ($r_1$) of an MRI contrast agent reflects the sensitivity of the agent. The relaxation rates of mcMPO-Gd in PBS at concentrations of 0.33 mM, 0.5 mM, 0.75 mM, and 1 mM were measured at 40° C. The 1/T1-values were plotted against mcMPO-Gd concentrations and fitted with linear regression. The slope value of the linear function is defined as the relaxivity of mcMPO-Gd (see e.g., Rohrer et al, *Invest. Radiol.* 2005, 40:715-724) (see e.g., Rohrer et al, *Invest. Radiol.* 2005, 40:715-724). The relaxivity of mcMPO-Gd was 5.4 $mM^{-1}s^{-1}$ at 0.47 T (PBS, 40° C.), as shown in FIG. 2A, which is slightly higher than the 4.3

$mM^{-1}s^{-1}$ determined previously for MPO-Gd under the same conditions (see e.g., Querol et al, *Org. Lett.* 2005, 7:1719-1722).

Example 8. In Vitro Activity of mcMPO-Gd after Activation by MPO

To compare the reactivity of mcMPO-Gd and MPO-Gd with MPO, a solution of mcMPO-Gd or MPO-Gd in PBS (0.5 mM, 150 μL total volume) was incubated with glucose (as $H_2O_2$ donor; 6 μL, 1M), glucose oxidase (GOX; 4 μL, 1 mg/mL) and MPO (10 μL, 2 mg/mL) at 40° C. The reaction was stopped by adding sodium azide (1 μL, 250 mg/ml) and the T1 relaxation time measured at 0 (before MPO added), 1 min, 2 min, 5 min, 10 min, 30 min, 60 min, 120 min, and 180 min as above at 40° C. The R1 ratio was expressed as $(R1_{(t)}-R1_{(t=0)})/R1_{(t=0)}$.

As shown in FIG. 2B, the T1 change of mcMPO-Gd was more than 3-fold greater than that of MPO-Gd over 3 h, indicating a more efficient activation of mcMPO-Gd compared with MPO-Gd.

Example 9. Binding to Proteins

The capability of mcMPO-Gd and MPO-Gd to bind to bovine serum albumin (BSA) after activation by MPO was evaluated. A solution of mcMPO-Gd/MPO-Gd (0.5 mM) in PBS (150 μL total volume) with/without BSA was incubated with glucose (6 μL, 1M), GOX (4 μL, 1 mg/mL) and MPO (10 μL, 2 mg/mL) at 40° C. for 1 h. The relaxation rates were measured as described above.

As shown in Table 2, MPO-Gd demonstrated a modest 22% improvement in T1 shortening (32% to 54%) in the presence of BSA. However, mcMPO-Gd showed a 41% improvement with BSA (80-121%). Overall, MPO-mediated activation of mcMPO-Gd demonstrated a 2.2-fold higher binding efficacy in the presence of BSA compared to MPO-Gd. These data indicate the mcMPO-Gd is more responsive to MPO activation than MPO-Gd.

TABLE 2

| Incubation | MPO—Gd/ MPO/GOX | | mcMPO—Gd/ MPO/GOX | |
|---|---|---|---|---|
| Conditions | NoBSA | BSA | NoBSA | BSA |
| T1 (Before activation, ms) | 375 | 381 | 328 | 328 |
| T1 (After activation, ms) | 283 | 246 | 182 | 148 |
| T1 change(%) | 32 | 54 | 80 | 121 |

Example 10. Cytotoxicity MTT Assay

Figure 3:
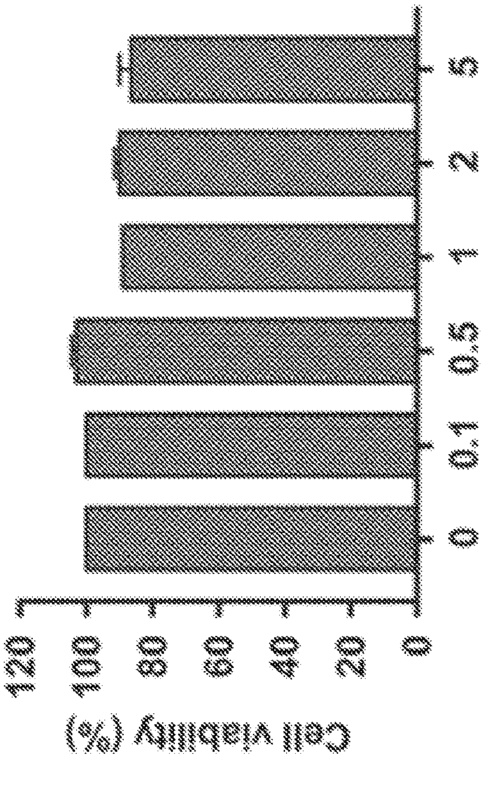
FIG. 3 shows results of an MTT assay with RAW 264.7 cells. No significant toxicity of mcMPO-Gd was observed up to 5 mM.

The cytotoxicity of mcMPO-Gd was evaluated using RAW 264.7 cells and measured using the 3-(4,5-dimethylthiazol-2-yl) 2,5-diphenyl-tetrazoilum bromide (MTT) reduction assay as previously described (see e.g., Rodriguez et al, *J. Am. Chem. Soc.,* 2010, 132:168-177). About $1.5\times10^4$ cells per well in a 96-well plate were cultured at 37° C. for 16 h in solutions of mcMPO-Gd in DMEM containing 10% FBS and 5% DMSO at 0 mM, 0.1 mM, 0.5 mM, 1 mM, 2 mM, and 5 mM. Following culture, cells were treated with 100 μL of 0.5 mg/mL MTT for 2 h at 37° C. before 100 L of DMSO was added to each well, the plates incubated overnight at 37° C., and optical density was measured at 570 nm using a microplate reader (Tecan Safire2, Tecan, Mannedorf, Switzerland). No significant cytotoxicity was observed up to 5 mM, as shown in FIG. 3, which is well above the expected in vivo concentration.

Example 11. Magnetic Resonance (MR) Imaging of Complete Freund's Adjuvant (CFA) Inflammation The efficacy of mcMPO-Gd was validated in a well-established mouse model of subcutaneous inflammation induced by complete Freund's adjuvant (CFA). Six to ten weeks old female C57BL/6J mice (Jackson Laboratories, Bar Harbor, ME) and MPO-deficient mice were used for this experiment. The mice were injected subcutaneously with a 1:1 (v:v) emulsion of CFA:PBS (40 μL of total volume) on one forearm under isoflurane anesthesia. PBS (40 μL) was injected on the other side as control. After 24 h, gadolinium agents (mcMPO-Gd in PBS containing 10% DMSO and 20% N,N-dimethylacetamide, or MPO-Gd in PBS containing 5% DMSO, or Dotarem in PBS) were administered through tail vein injection and the mice imaged at 0 min, 15 min, 30 min, 45 min, and 60 min using serial T1-weighted imaging (TR:900 ms, TE: 13.59 ms, 0.156×0.156×0.5 mm Voxels) with chemical fat suppression and respiratory gating on a 4.7 T small animal MR scanner (Bruker, Cambridge, MA) with a 3-cm quadrature volume coil (Rapid MR International, Germany). Regions of interest (ROI) were drawn manually by a person blinded to the identity of the mice or imaging agent used, and the contrast-to-noise ratios (CNRs) were calculated as $CNR=(SI_{lesion}-SI_{skeletal\ muscle})/SD_{background}$.

Figures 4A, 4B, 4C, 4D, 4E, 4F:
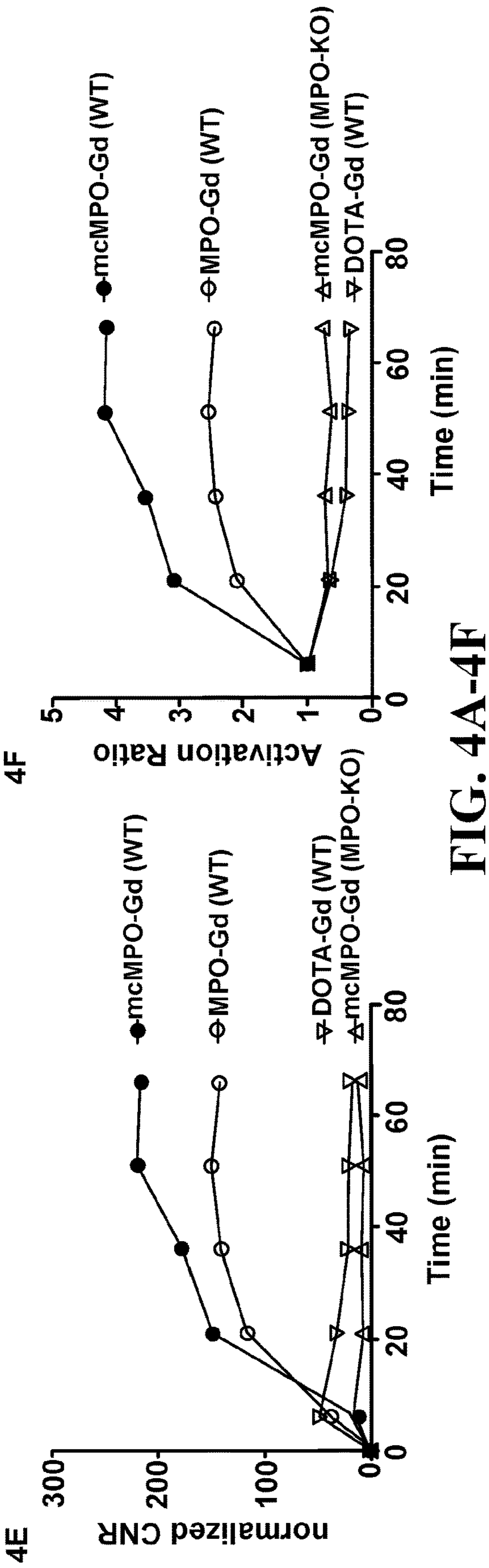
FIGS. 4A-4D show representative images from pre-contrast and at −60 min for mcMPO-Gd, DOTA-Gd, and MPO-Gd in wild type mice, and mcMPO-Gd in $Mpo^{-/-}$ mouse.
FIG. 4E shows normalized contrast-to-noise ratio (CNR) of the MR imaging over time period of about 60 min.
FIG. 4F shows activation ratio of the MR imaging over time period of −60 min demonstrated approximately two-fold higher activation ratio for mcMPO-Gd compared to MPO-Gd at −60 min. Both compounds exhibited an activation ratio much higher than DOTA-Gd, and that of $Mpo^{-/-}$ mouse.

24 h after injection of a CFA emulsion into the shoulder of mice, contrast agents (0.3 mol/kg) were injected via the tail vein and the animals imaged. FIGS. 4A-4D show representative images obtained pre-contrast and 60 min after administration of the contrast agent for mcMPO-Gd, Dotarem and MPO-Gd in wild-type mice and for mcMPO-Gd in MPO gene-deficient ($Mpo^{-/-}$) mice, respectively. In wild-type mice, the contrast-to-noise ratio (CNR) observed with mcMPO-Gd increased over 60 min, while the CNR observed with Dotarem decreased rapidly over time, as shown in FIG. 4E, demonstrating that mcMPO-Gd but not Dotarem was retained in the inflamed tissue, likely as a result of activation of the former by inflammation-associated MPO activity and subsequent binding to protein tyrosine residues. In contrast, MR imaging of $Mpo^{-/-}$ mice with mcMPO-Gd showed little signal increase, as shown in FIGS. 4C and 4E, demonstrating the specificity for MPO of the signal observed with mcMPO-Gd in this model. mcMPO-Gd demonstrated a >4-fold increase in the activation ratio (AR=CNR(post-contrast)/CNR(first post-contrast)) (see e.g., Breckwoldt et al, *Proc. Natl. Acad. Sci. U.S.A* 2008, 105:18584-18589) compared with a 2-fold increase seen with MPO-Gd, as shown in FIG. 4F, indicating a higher sensitivity of mcMPO-Gd compared with MPO-Gd for MPO activity.

Example 12. MR Imaging of Tandem Stenosis (TS) and Intervention with AZM198

MPO activity has been reported to be elevated in unstable plaques compared with stable plaques in the tandem stenosis (TS) mouse model, as assessed by both MPO-Gd MRI and LC-MS/MS determination of the conversion of hydroethidine to 2-chloroethidium (see e.g., Rashid et al, *Eur. Heart J.,* 2018, 39:3301-3310).

Male apolipoprotein E gene-deficient ($Apoe^{-/-}$) mice (6 weeks of age) were fed Western Diet (WD) containing 22% fat and 0.15% cholesterol (SF00-219, Specialty Feeds, Western Australia) for a total of 13 weeks. Six weeks after commencement of WD, tandem stenosis (TS) was introduced into the mice as previously described (see e.g., Rashid et al, *Eur. Heart J.,* 2018, 39:3301-3310). Male $Apoe^{-/-}$ mice were anesthetized with 4% isoflurane. The right common carotid artery was dissected from circumferential connective tissues. Two stenoses were placed by tying a 6-0 blue-braided polyester fiber suture (TICRON 0.7 Metric) around the exposed artery, with the distal stenosis 1 mm from the carotid artery bifurcation and the proximal stenosis 3 mm from the distal stenosis. Blood flow was measured before and after the addition of each ligature using a perivascular flow module (Transonic, TS420) and a 0.7 mm perivascular flow probe (Transonic MA0.7PSB). Flow for each ligature in the TS was defined as 70% of baseline flow after addition of the distal ligature and 20% of baseline flow after addition of the proximal ligature. Alterations in the flow predispose the right carotid artery to developing atherosclerotic plaque with an unstable phenotype in the segment proximal to the proximal suture, characterized by consistent thinning of the fibrous cap, abundant inflammatory cells, occasional neovessels, cap disruption and intraplaque hemorrhage, as well as luminal thrombus with fibrin and platelets depositions (see e.g., Chen et al, *Circ. Res.* 2013, 113:252-265). By comparison, the atheroma in the brachiocephalic trunk contains a thick cap and abundance of collagen, features of a stable plaque phenotype (see e.g., Rashid et al, *Eur. Heart J.,* 2018, 39:3301-3310).

Before surgery, and at 1 week, 2 weeks, 4 weeks, and 7 weeks following TS surgery, isoflurane-anesthetized mice were imaged in the prone position using a 9.4 T Bruker Biospec 94/20 Avance III system (Bruker, Ettlingen, Germany) with a 35-mm quadrature radiofrequency coil and respiratory-gated image acquisition as described previously before and after intravenous administration of 0.3 mmol/kg of MPO-Gd via a tail vein catheter. A T1-weighted fast spin echo (TurboRARE, T1-TSE) was acquired with the following parameters: TR 1500 ms, TE 8.5 ms, ETL 8, slice thickness 1 mm, FOV 20×20 mm, matrix size 192×192, in-plane resolution 104×104 μm. This T1-TSE protocol was then repeated in a scan series covering a period of one hour following contrast injection to assess contrast agent inflow and retention. OsiriX (Version 10.0.2, Pixmeo, Switzerland) was used for image analysis. In T1-TSE images, separate regions of interest were assigned to the vessel wall, skeletal muscle (reference) and background (air). The contrast-to-noise ratio (CNR) was calculated as follows: $CNR=(SI_{vessel\ wall}-SI_{skeletal\ muscle})/SD_{background}$. The mean CNRs of three consecutive slices in plaque with unstable phenotype and corresponding segments of the left carotid artery (plaque-free), in addition to 1-2 consecutive slices in the brachiocephalic trunk (stable plaque), were calculated. Segmental enhancement attributable to MPO was assessed by calculating the $\Delta CNR=CNR_{post\text{-}contrast}-CNR_{pre\text{-}contrast}$.

For pharmacological inhibition of MPO, AZM198 (AstraZeneca, Sweden) was administered by incorporation into WD at a daily dose of 500 μmol/kg bodyweight based on an average daily food consumption of ~3.7 g per mouse as previously described (see e.g., Rashid et al, *Eur. Heart J.,* 2018, 39:3301-3310). Treatment with AZM198 commenced 1 week post-TS surgery and continued for 6 weeks until MRI at 7 weeks post-TS surgery, before and after intravenous administration of 0.1 mmol/kg of mcMPO-Gd as per the protocol described above.

Figures 5A, 5B, 5C, 5D, 5E:
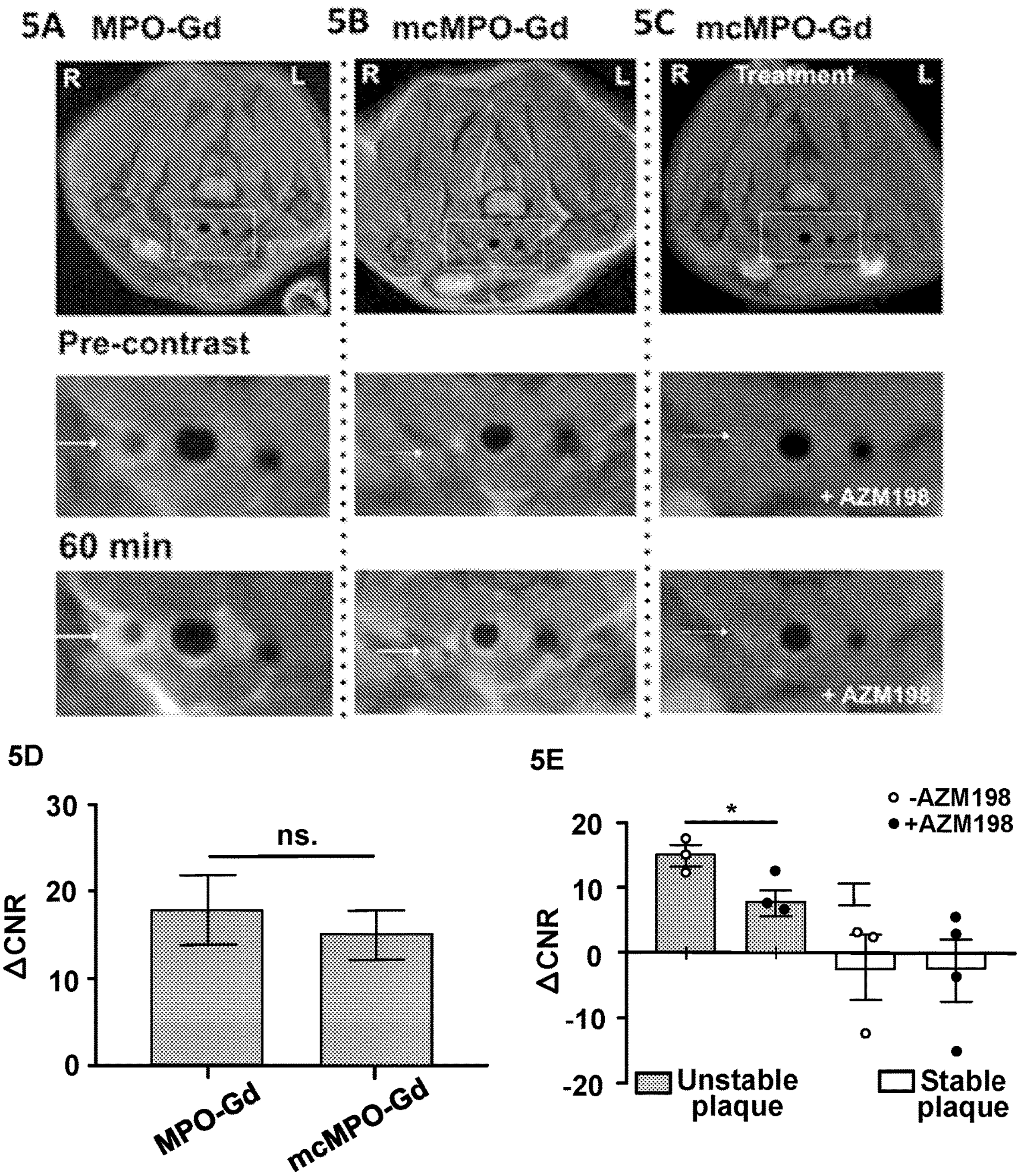
FIGS. 5A-5C show representative MR imaging of MPO-Gd and mcMPO-Gd AZM198 treatment in the tandem stenosis model of atherosclerotic plaque instability.
FIG. 5D shows contrast-to-noise ratios (CNRs) of unstable plaque for MPO-Gd (0.3 mmol/kg) and mcMPO-Gd (0.1 mmol/kg) (n=3 mice for each probe), showing no significant difference even though mcMPO-Gd was used at 3 times lower dose compared to MPO-Gd (p=0.368, ns., not significant, determined by Mann-Whitney test).
FIG. 5E shows ΔCNRs of unstable and stable plaque (brachiocephalic trunc) in control and AZM198-treated TS mice. Signal in unstable plaque of AZM198-treated mice decreased ~50% compared to that of no drug control (*p=0.039, determined by un-paired t-test). $\Delta CNR=CNR_{post-contrast}-CNR_{pre-contrast}$.

The imaging was performed 7 weeks after the TS surgery, administering 0.3 mmol/kg of MPO-Gd or 0.1 mmol/kg of mcMPO-Gd via the tail veins. As shown in FIGS. 5A, 5B, and 5D, signal enhancement in unstable plaque (arrows) was comparable for mcMPO-Gd and MPO-Gd (ΔCNR 17.8 vs. 15.0, P=0.368), though the dosage of mcMPO-Gd was three-fold lower.

Figure 6:
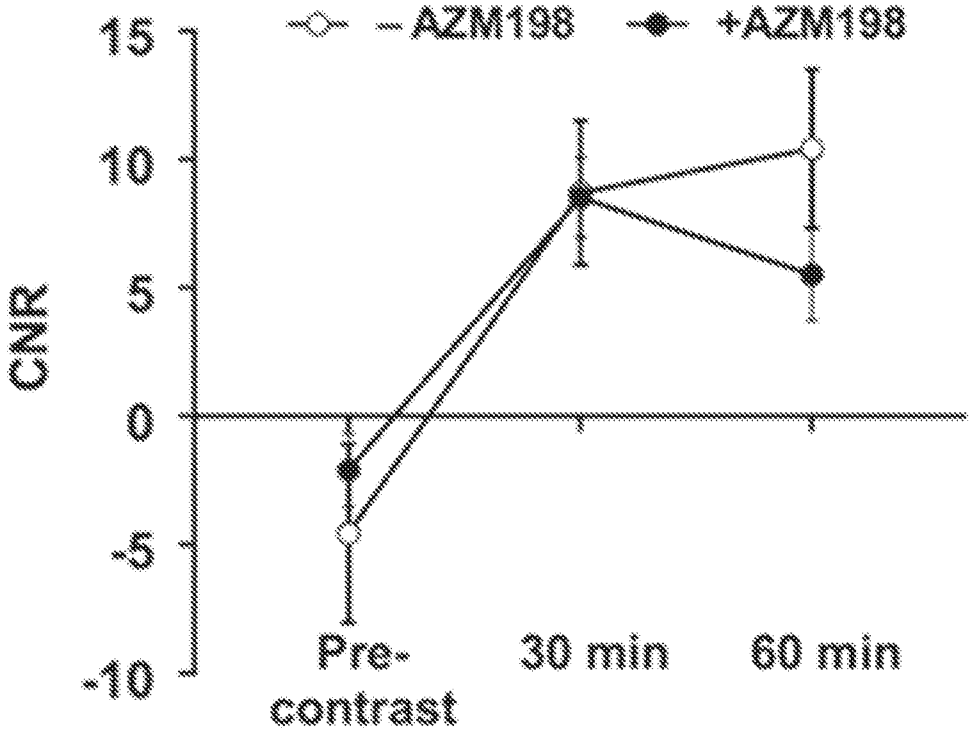
FIG. 6 shows CNR changes of AZM198-treated mice and control mice over 60 min. Signal from the control mice increased from 30 to 60 min, while that of AZM198-treated mice decreased over this time period.

To confirm that MR imaging of mcMPO-Gd can reflect MPO activity, TS mice were treated with the MPO inhibitor AZM198 1 week post-TS surgery and subjected the mice to MRI after an additional 6-week treatment period (a total of 7 weeks post TS). Following the administration of mcMPO-Gd, the CNRs for stable and unstable plaques increased at 30 min post-contrast administration, but thereafter (60 min) decreased in mice treated with AZM198 but not in control animals, as shown in FIG. 6. As a result, the ΔCNR in the region corresponding to unstable plaque decreased by ~50% in AZM198-treated mice compared with that seen in control mice, as shown in FIGS. 5C and 5E, indicating effective inhibition of MPO activity by AZM198.

The results described in the Examples show that mcMPO-Gd has superior sensitivity and efficacy both in vitro and in vivo compared to MPO-Gd. Because the activation moieties are similar, and without being bound by theory, this difference is likely the result of the closer proximity and the rigidity of the two activation moieties. In MPO-Gd, each activation moiety is linked to one side of the DTPA, which can result in binding to two proteins or to itself after MPO-oxidation. However, in mcMPO-Gd, the close proximity of the two activation moieties prevents self-binding and likely forces the agent to bind to the same protein. This improves efficiency for protein binding (as shown in Table 2) and further decreases segmental motion from having multiple proteins bound to the agent. It is believed that mcMPO-Gd will be capable of detecting and mapping damaging inflammation in many diseases, including, but not limited to, multiple sclerosis, nonalcoholic fatty steatohepatitis (NASH), rheumatoid arthritis, and atherosclerosis, at lower dosage, due to increased stability and ability of mcMPO-Gd to image damaging inflammation. These data suggest that mcMPO-Gd is a candidate molecular imaging agent for translational into human use.

Example 13. Molecular Docking Experiments

To explore why mcMPO-Gd was found to be more effective than MPO-Gd at detecting MPO activity, a molecular docking study was performed using AutoDock Vina (see e.g., Trott et al, *J. Comput. Chem.* 2010, 31 (2), 455-61) and visualized by PyMol. Gandolinium (Gd) was replaced with Iron (Fe) for the docking experiments since the parameters of Gd are not included in AutoDock Vina (see e.g., Wu et al, *J. Mol. Model* 2016, 22 (7), 161). Gd and Fe have the same positive charges; without being bound by theory, as Gd is 'buried' inside the chelating moiety of the agent without direct interaction with the docking protein, it was hypothesized that the replacement of Gd with Fe should not affect the docking results.

Unlike MPO inhibitors that block the active site, the 5-hydroxyindole moieties of mcMPO-Gd are MPO substrates that undergo one-electron transfer with the Compound I form of MPO in the MPO catalytic cycle, and do not remain at the active site (see e.g., Rodriguez et al., *J. Am. Chem. Soc.* 2010, 132 (1), 168-77). The MPO-cyanide (MPO-CN) complex has been suggested as a useful surrogate to study Compound I which is short-lived since both Compound I and MPO-CN complex contain six-coordinated low-spin s=1 iron centers; therefore, the co-crystal structure of MPO-CN complex from human MPO-cyanide-thiocyanate (MPO-CN-SCN, PDB database: 1DNW) was chosen as a model to perform the docking experiments (see e.g., Malle et al, *Br. J. Pharmacol.* 2007, 152 (6), 838-54; Blair-Johnson et al, *Biochemistry* 2001, 40 (46), 13990-7; Hallingback et al, *Biochemistry* 2006, 45 (9), 2940-50).

Figure 7:
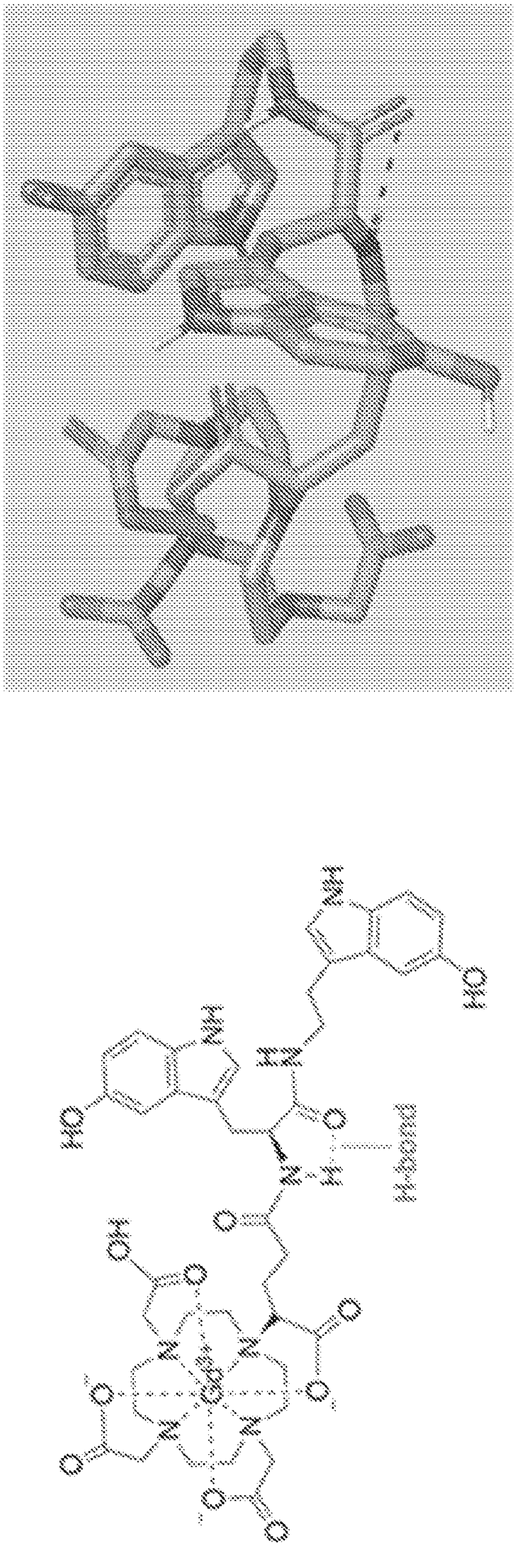
FIG. 7 shows that intramolecular hydrogen bond formed between the two amide bonds increases the rigidity of mcMPO-Gd, as shown in the molecular docking of mcMPO-Gd binding to MPO.

In this study, twenty docking conformations were generated for each agent. As shown in FIG. 7, the optimal conformation of mcMPO-Gd binding to MPO revealed hydrogen-bond formation between the two amide bonds which constrains the rotation of mcMPO-Gd by forming a five-membered ring, increasing the agent's rigidity. As shown in FIG. 8, the binding affinities generated from 20 modes of mcMPO-Gd to MPO from docking simulations were found to be lower overall than those of MPO-Gd (11.7-9.5 kcal/mol vs. 9.9-7.9 kcal/mol). Without being bound by theory, these effects could explain the higher efficacy of mcMPO-Gd when activated by MPO.

Visualization of MPO-Gd and mcMPO-Gd binding to MPO showed that for both agents, one of the 5-hydroxyindole moieties was parallel to the MPO heme forming π-π stacking interaction, consistent with the previous docking study of serotonin and MPO (see e.g., Hallingback et al, *Biochemistry* 2006, 45 (9), 2940-50). However, in mcMPO-Gd, the hydroxy group pointing to the heme center formed a hydrogen bond with cyanide (in purple and blue) and the imine group electrostatically interacted with the carbonyl group from the heme propionate (NH—O═C, 3.7 Å). The other 5-hydroxyindole moiety was perpendicular to the heme with the imine forming two hydrogen bonds with $Pro^{101}$ and $Thr^{100}$, respectively (see FIG. 9, left).

Figure 9:
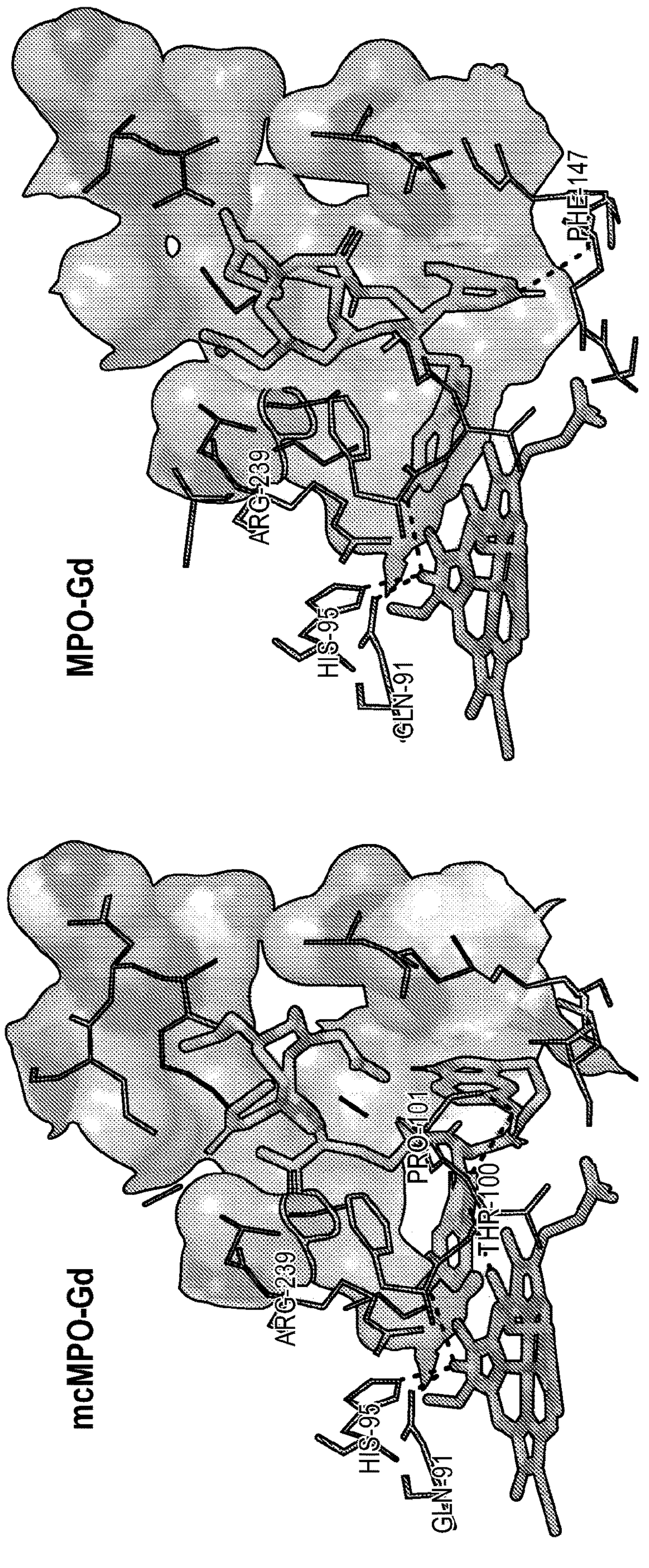
FIG. 9 shows molecular docking representations of mcMPO-Gd (left) and MPO-Gd (right) binding to the MPO-CN complex using PyMol. Amino acid residues Q91, H95 and R239 (shown as lines) together with heme (in sticks) form the active site of MPO. All the other amino acid residues (as lines) shown are within 4 Å to mcMPO-Gd and MPO-Gd. The hydrogen bonds and the electrostatic interaction are shown as dashes.

In contrast, as shown in FIG. 9 (right), for MPO-Gd, one of the 5-hydroxyindole moieties interacted with the MPO heme without the electrostatic interaction while the other 5-hydroxyindole moiety only formed one hydrogen-bond with $Phe^{147}$. These differences resulted in improved binding affinity of mcMPO-Gd compared to that of MPO-Gd. Thus, the mechanism for the improvement seen in mcMPO-Gd over MPO-Gd was also identified through molecular docking experiments.

Detection and differentiation of detrimental from beneficial inflammation is challenging, but useful given the different roles they play in disease pathogenesis. MPO has been found to be an important marker for damaging inflammation and the Examples provided herein describe an activatable macrocyclic gadolinium-based MPO-specific agent, mcMPO-Gd, which is significantly more stable than the linear MPO-Gd agent and up to threefold more responsive to MPO activity compared to prior MPO-sensing MRI agents.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A compound of Formula I:

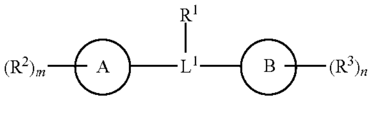

I or a pharmaceutically acceptable salt thereof, wherein:

Ring A is selected from the group consisting of:

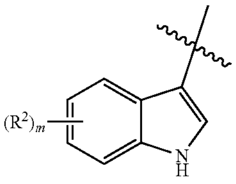

and

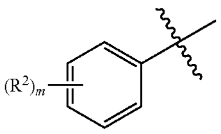

, wherein  indicates the bond between Ring A and $L^1$;

Ring B is selected from the group consisting of:

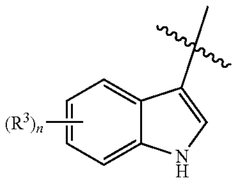

and

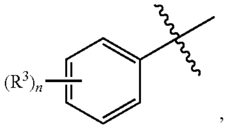

, wherein  indicates the bond between Ring B and $L^1$;

$L^1$ is:

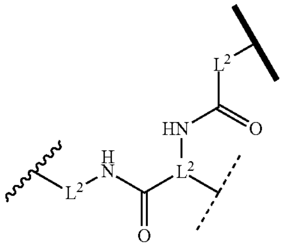

wherein:

each $L^2$ is an independently selected $C_{1-4}$ alkylene;

indicates the bond between $L^1$ and Ring A;

------ indicates the bond between $L^1$ and Ring B; and indicates the bond between $L^1$ and $R^1$;

$R^1$ is selected from the group consisting of:

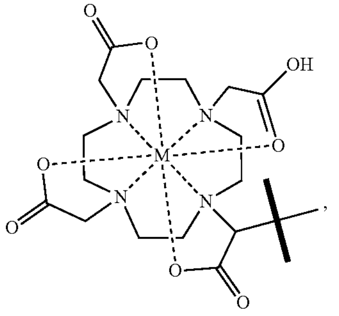

-continued

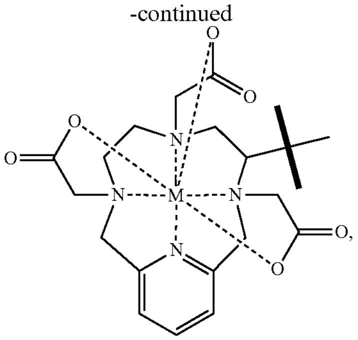

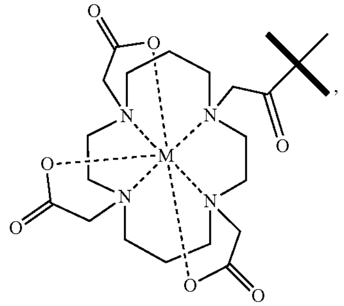

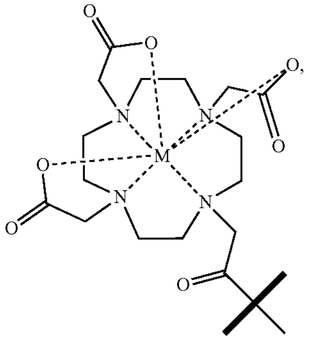

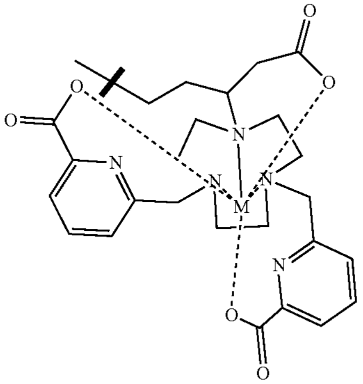

, and

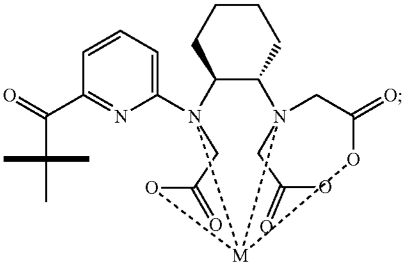

M is a metal selected from the group consisting of $Gd^{3+}$, $Mn^{2+}$, $^{68}Ga$, $^{64}Cu$, and $^{111}In$;

$R^2$ are $R^3$ are each independently selected from the group consisting of $OR^a$, $C(O)R^a$, and $OC(O)R^a$;

each $R^a$ is independently selected from the group consisting of H and $C_{1-4}$ alkyl;

m is 0, 1, 2, 3, or 4; and n is 0, 1, 2, 3, or 4.

2. The compound of claim 1, or a pharmaceutically acceptable salt thereof, wherein m is 1 or 2, and wherein each $R^2$ is independently selected from the group consisting of OH, $OCH_3$, $C(O)CH_3$, and $OC(O)CH_3$.

3. The compound of claim 1, or a pharmaceutically acceptable salt thereof, wherein m is 1, and wherein each $R^2$ is OH.

4. The compound of claim 1, or a pharmaceutically acceptable salt thereof, wherein Ring A is selected from the group consisting of:

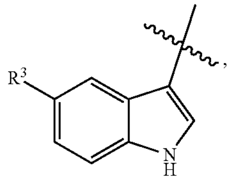

,

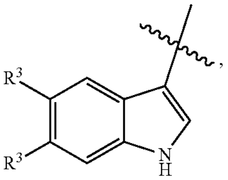

,

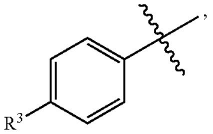

, and

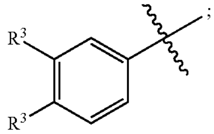

;

wherein 〰 indicates the bond between Ring A and $L^1$.

5. The compound of claim 1, or a pharmaceutically acceptable salt thereof, wherein Ring A is selected from the group consisting of:

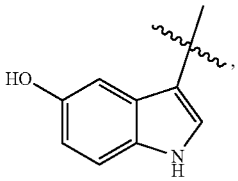

,

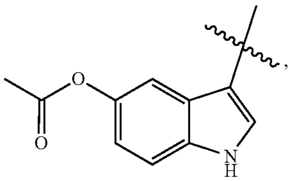

,

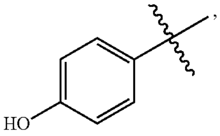

,

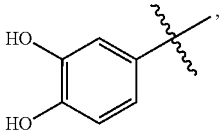

, and

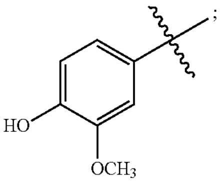

;

wherein 〰 indicates the bond between Ring A and $L^1$.

6. The compound of claim 1, or a pharmaceutically acceptable salt thereof, wherein n is 1 or 2, and wherein each $R^3$ is independently selected from the group consisting of OH, $OCH_3$, $C(O)CH_3$, and $OC(O)CH_3$.

7. The compound of claim 1, or a pharmaceutically acceptable salt thereof, wherein n is 1, and wherein each $R^3$ is OH.

8. The compound of claim 1, or a pharmaceutically acceptable salt thereof, wherein Ring B is selected from the group consisting of:

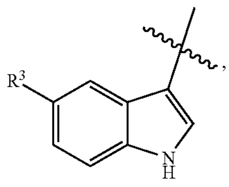,
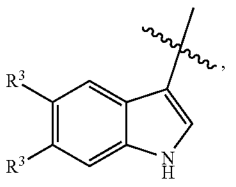,

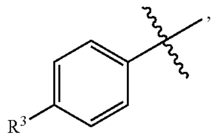, and 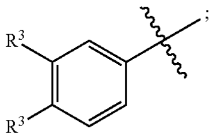;

wherein 〰 indicates the bond between Ring B and $L^1$.

9. The compound of claim 1, or a pharmaceutically acceptable salt thereof, wherein Ring B is selected from the group consisting of:

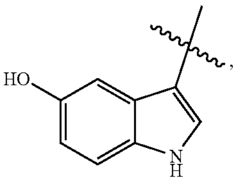,
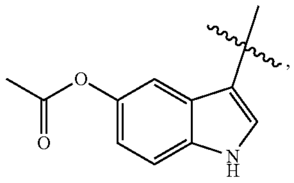,
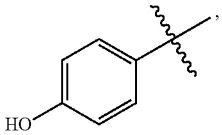,
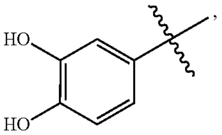, and
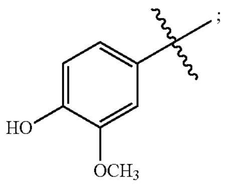;

wherein 〰 indicates the bond between Ring B and $L^1$.

10. The compound of claim 1, or a pharmaceutically acceptable salt thereof, wherein Ring A and Ring B are each

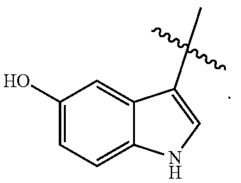 [SMILES: *c1c[nH]c2ccc(O)cc12].

11. The compound of claim 1, or a pharmaceutically acceptable salt thereof, wherein $L^1$ is:

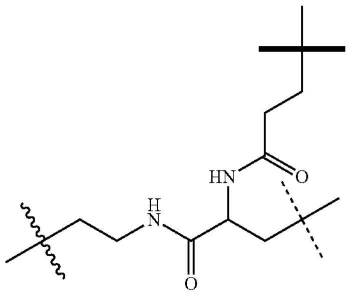

wherein:

〰 indicates the bond between $L^1$ and Ring A;

------ indicates the bond between $L^1$ and Ring B; and

▬ indicates the bond between $L^1$ and $R^1$.

12. The compound of claim 1, or a pharmaceutically acceptable salt thereof, wherein M is $Gd^{3+}$.

13. The compound of claim 1, or a pharmaceutically acceptable salt thereof, wherein $R^1$ is:

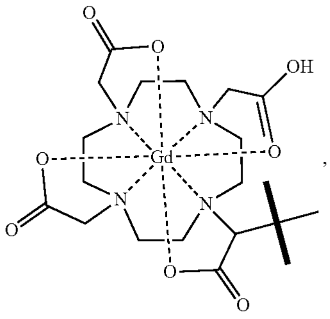, wherein ▬ indicates the bond between $R^1$ and $L^1$.

14. The compound of claim 1, or a pharmaceutically acceptable salt thereof, wherein the compound of Formula I is a compound of Formula II:

II

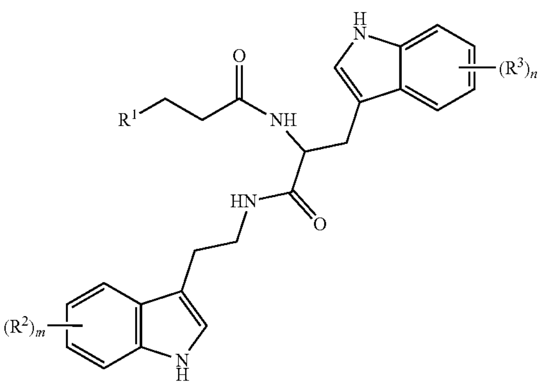

or a pharmaceutically acceptable salt thereof.

15. The compound of claim 1, or a pharmaceutically acceptable salt thereof, wherein the compound of Formula I is a compound of Formula III:

III

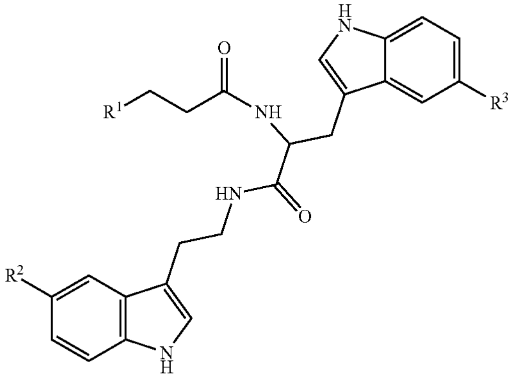

or a pharmaceutically acceptable salt thereof.

16. The compound of claim 1, or a pharmaceutically acceptable salt thereof, wherein the compound of Formula I is a compound of Formula IV:

IV

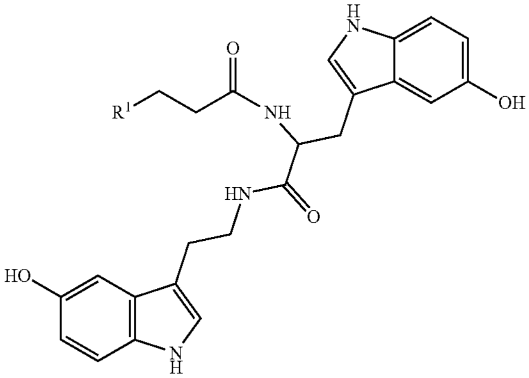

or a pharmaceutically acceptable salt thereof.

17. The compound of claim 1, or a pharmaceutically acceptable salt thereof, wherein the compound of Formula I is a compound of Formula Vb:

Vb

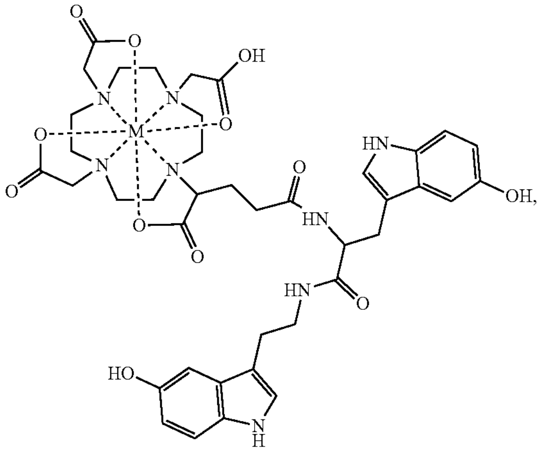

or a pharmaceutically acceptable salt thereof, wherein M is the metal.

18. The compound of claim 1, which is:

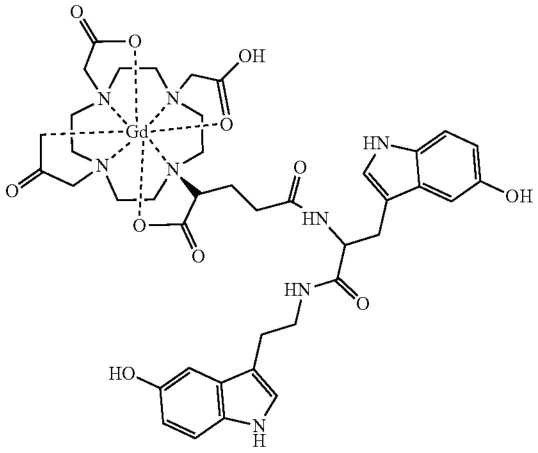

or a pharmaceutically acceptable salt thereof.

19. A pharmaceutical composition comprising a compound of claim 1, or a pharmaceutically acceptable salt thereof, and at least one pharmaceutically acceptable carrier.

20. A method of imaging a cell or tissue sample, the method comprising:

i) administering to the subject a compound of claim 1, or a pharmaceutically acceptable salt thereof;

ii) waiting a time sufficient to allow the compound to accumulate at the cell or tissue sample; and iii) imaging the cell or tissue sample with an imaging technique.

21. A method of imaging the liver of a subject, the method comprising:

i) administering to the subject a compound of claim 1, or a pharmaceutically acceptable salt thereof;

ii) waiting a time sufficient to allow the compound to accumulate at the liver; and iii) imaging the cell or tissue sample with an imaging technique.

22. A method of diagnosing a disease or disorder associated with abnormal myeloperoxidase activity in a subject, comprising:

i) administering to the subject a compound of claim 1, or a pharmaceutically acceptable salt thereof;

ii) waiting a time sufficient to allow the compound to accumulate at a cell or tissue site associated with the disease; and iii) imaging the cell or tissue with an imaging technique.

23. A method of imaging myeloperoxidase activity in a cell, the method comprising:

i) contacting the cell with a compound of claim 1, or a pharmaceutically acceptable salt thereof; and ii) imaging the cell with an imaging technique.

24. A method of detecting myeloperoxidase activity in a cell or tissue sample, the method comprising:

i) contacting the cell or tissue sample with a compound of claim 1, or a pharmaceutically acceptable salt thereof; and ii) imaging the cell or tissue sample with an imaging technique.

25. A method of detecting myeloperoxidase activity in a subject, the method comprising:

i) administering to the subject a compound of claim 1, or a pharmaceutically acceptable salt thereof; and ii) imaging the subject with an imaging technique.

26. A method of monitoring treatment of a disease or disorder associated with abnormal myeloperoxidase activity in a subject, the method comprising:

i) administering to the subject a compound of claim 1, or a pharmaceutically acceptable salt thereof;

ii) imaging the subject with an imaging technique;

iii) administering to the subject a therapeutically effective amount of a therapeutic compound to treat the disease or disorder;

iv) imaging the cell or tissue in the subject with an imaging technique; and v) comparing the image of step i) and the image of step iv).

27. The compound of claim 1, or a pharmaceutically acceptable salt thereof, wherein each $R^2$ is independently selected from the group consisting of OH, $OCH_3$, $C(O)CH_3$, and $OC(O)CH_3$.

28. The compound of claim 1, or a pharmaceutically acceptable salt thereof, wherein each $R^2$ is OH.

29. The compound of claim 1, or a pharmaceutically acceptable salt thereof, wherein each $R^3$ is independently selected from the group consisting of OH, $OCH_3$, $C(O)CH_3$, and $OC(O)CH_3$.

30. The compound of claim 1, or a pharmaceutically acceptable salt thereof, wherein each $R^3$ is OH.

31. The compound of claim 4, or a pharmaceutically acceptable salt thereof, wherein Ring B is selected from the group consisting of:

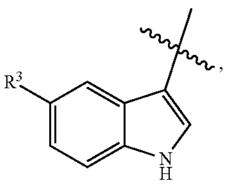,
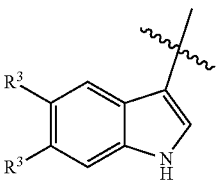,

-continued

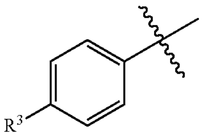, and
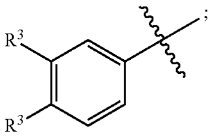;

wherein ~~~~ indicates the bond between Ring B and $L^1$.

32. The compound of claim 5, or a pharmaceutically acceptable salt thereof, wherein Ring B is selected from the group consisting of:

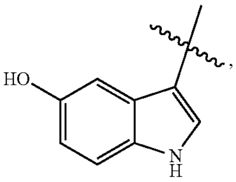,
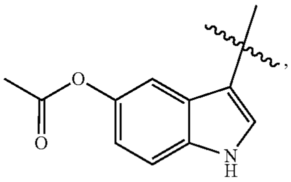,
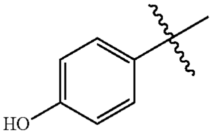, and
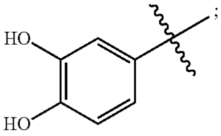;

wherein ~~~~ indicates the bond between Ring B and $L^1$.

* * * * *